(12) United States Patent
Fukuda et al.

(10) Patent No.: US 7,606,474 B2
(45) Date of Patent: Oct. 20, 2009

(54) INFORMATION RECORDING MEDIUM, INFORMATION RECORDING APPARATUS AND METHOD, INFORMATION REPRODUCTION DEVICE AND METHOD, INFORMATION RECORDING/REPRODUCTION DEVICE AND METHOD, RECORDING OR REPRODUCTION CONTROL COMPUTER PROGRAM, AND DATA STRUCTURE CONTAINING A CONTROL SIGNAL

(75) Inventors: Yasuko Fukuda, Saitama (JP); Nobuyuki Takakuwa, Saitama (JP); Takao Sawabe, Saitama (JP); Tohru Kanegae, Saitama (JP); Masanori Nakahara, Saitama (JP); Takeshi Koda, Saitama (JP)

(73) Assignee: Pioneer Corporation, Tokyo (JP)

( * ) Notice: Subject to any disclaimer, the term of this patent is extended or adjusted under 35 U.S.C. 154(b) by 578 days.

(21) Appl. No.: 10/542,752

(22) PCT Filed: Jan. 20, 2004

(86) PCT No.: PCT/JP2004/000402

§ 371 (c)(1),
(2), (4) Date: Jan. 12, 2006

(87) PCT Pub. No.: WO2004/066621

PCT Pub. Date: Aug. 5, 2004

(65) Prior Publication Data

US 2006/0239167 A1  Oct. 26, 2006

(30) Foreign Application Priority Data

Jan. 20, 2003 (JP) .............................. 2003-011619

(51) Int. Cl.
*H04N 5/00* (2006.01)
(52) U.S. Cl. ........................... 386/126; 386/46; 386/95; 386/124; 386/125
(58) Field of Classification Search ..................... 386/1, 386/46, 98, 124–126
See application file for complete search history.

(56) References Cited

U.S. PATENT DOCUMENTS 6,748,159 B2 * 6/2004 Wilson et al. ................. 386/70
6,907,190 B2 * 6/2005 Kashiwagi et al. .......... 386/125

FOREIGN PATENT DOCUMENTS

| JP | 2002-171472 | 6/2002 |
|---|---|---|
| JP | 2003-242753 | 8/2003 |
| JP | 2003-317439 | 11/2003 |

* cited by examiner

*Primary Examiner*—Marsha D Banks Harold
*Assistant Examiner*—Marc Dazenski
(74) *Attorney, Agent, or Firm*—Young & Thompson

(57) ABSTRACT

An information record medium includes a file for storing object data composing of a plurality of packets and further includes an object information file for storing corresponding definition information to control reproduction of the object data. The object data is interleaved in an angle block and the object information file further stores unit address information to indicate an address of each interleaved unit.

19 Claims, 38 Drawing Sheets

| CONTENT | ES CONTENTS | ES_PID |
|---|---|---|
| CONTENT #0 | Video0 | 101 |
| | Audio 0 | 102 |
| | Sub-picture0 | 103 |
| CONTENT #1 | Video1 | 104 |
| | Audio 0 | 102 |
| | Sub-picture1 | 105 |
| CONTENT #2 | Video2 | 106 |
| | Audio 0 | 102 |
| | Sub-picture2 | 107 |
| CONTENT #3 | Video3 | 108 |
| | Audio 0 | 102 |
| | Sub-picture3 | 109 |
| CONTENT #4 | Video4 | 110 |
| | Audio 0 | 102 |
| | Sub-picture4 | 111 |

FIG. 12

| DISC | | | | | | | | | |
|---|---|---|---|---|---|---|---|---|---|
| TITLE #1 | | | | | | | | | |
| P LIST #1 | | | | | | | | | |
| Item #1 | | | Item #2 | | | Item #3 | | | |
| TS #1 OBJECT | | | | | | | | | |
| AU#1 | PU#1 | Video0 | AU#2 | PU#1 | Video1 | AU#3 | PU#1 | Video4 | |
| | | Audio0 | | | Audio1 | | | Audio4 | |
| | | Sub-picture0 | | | Sub-picture1 | | | Sub-picture4 | |
| | | | | PU#2 | Video2 | | | | |
| | | | | | Audio2 | | | | |
| | | | | | Sub-picture2 | | | | |
| | | | | PU#3 | Video3 | | | | |
| | | | | | Audio3 | | | | |
| | | | | | Sub-picture3 | | | | |

CONTENT #0　　　　　CONTENT #1~3　　　　CONTENT #4
(USUAL BLOCK)　　　(ANGLE·BLOCK)　　　(USUAL BLOCK)

FIG. 13

| FIELD NAME | | CONTENTS |
|---|---|---|
| DISC GENERAL INFORMATION | | DISC VOLUME INFORMATION, TOTAL TITLE QUANTITY etc. |
| TITLE INFORMATION TABLE | TITLE POINTER | STORAGE ADDRESS OF TITLE #1 INFORMATION, OTHER INFORMATION OF TITLE #1 (e.g. ANGLE INFORMATION) |
| | | -------- |
| | TITLE #1 INFORMATION | HEAD P LIST NUMBER OF TITLE #1, OTHER INFORMATION OF P LIST |
| | | OTHER P LIST NUMBER OF TITLE #1, OTHER INFORMATION OF P LIST |
| | | --------------------- |
| | | -------------------- |
| OTHER INFORMATION | | |

| FIELD NAME | CONTENTS |
|---|---|
| TITLE POINTER | STORAGE ADDRESS OF TITLE #1 INFORMATION, MAX ANGLE QUANTITY=3, OTHER INFORMATION |
| TITLE #1 INFORMATION | HEAD P LIST NUMBER=1, OTHER INFORMATION OF P LIST (e.g. CHAPTER INFORMATION) |

FIG. 15

| FIELD NAME | | | CONTENTS |
|---|---|---|---|
| P LIST GENERAL INFORMATION | | | P LIST SIZE, TOTAL P LIST QUANTITY, etc. |
| P LIST POINTER TABLE | P LIST #1 POINTER | | P LIST #1 INFORMATION STORAGE ADDRESS |
| P LIST #1 INFORMATION TABLE | P LIST #1 GENERAL INFORAMTION | | TOTAL QUANTITY OF ITEM CONSTITUTING P LIST #1 = 3, OTHER INFORMATION |
| | P LIST #1 ITEM INFORMATION TABLE | Item#1 INFORMATION | AU NUMBER & PU NUMBER IN AU TABLE IN OBJECT INFORMATION FILE, etc. |
| | | Item#2 INFORMATION | AU NUMBER & PU NUMBER IN AU TABLE IN OBJECT INFORMATION FILE, etc. |
| | | Item#3 INFORMATION | AU NUMBER & PU NUMBER IN AU TABLE IN OBJECT INFORMATION FILE, etc. |
| | | Item#4 INFORMATION | AU NUMBER & PU NUMBER IN AU TABLE IN OBJECT INFORMATION FILE, etc. |
| | OTHER INFORMATION | | COMMAND CONTENTS, etc. |

FIG. 21(A)

(Index#13 Stream)

|  | Display Start Time Point | Packet Number (Offset from ILV Block Head) | ILVU Head Flag |
|---|---|---|---|
| ILV Group#1 | T1_0 | 1 2 | 1 |
|  | T1_1 | 1 5 | 0 |
|  | T1_2 | 1 9 | 0 |
|  | T1_3 | 2 3 | 0 |
| ILV Group#2 | T1_4 | 4 8 (not started in Video) | 1 |
|  | T1_5 | 5 2 | 0 |
|  | T1_6 | 5 5 | 0 |
| ILV Group#3 | T1_7 | 7 8 | 1 |
|  | T1_8 | 8 3 | 0 |
|  | T1_9 | 8 6 | 0 |

FIG. 21(B)

(Index#13 Stream)

|  | Display Start Time Point | Packet Number (Offset from ILV Block Head) | ILV Group Number |
|---|---|---|---|
| ILV Group#1 | T1_0 | 1 2 | 1 |
|  | T1_1 | 1 5 | 1 |
|  | T1_2 | 1 9 | 1 |
|  | T1_3 | 2 3 | 1 |
| ILV Group#2 | T1_4 | 4 8 (not started in Video) | 2 |
|  | T1_5 | 5 2 | 2 |
|  | T1_6 | 5 5 | 2 |
| ILV Group#3 | T1_7 | 7 8 | 3 |
|  | T1_8 | 8 3 | 3 |
|  | T1_9 | 8 6 | 3 |

FIG. 22

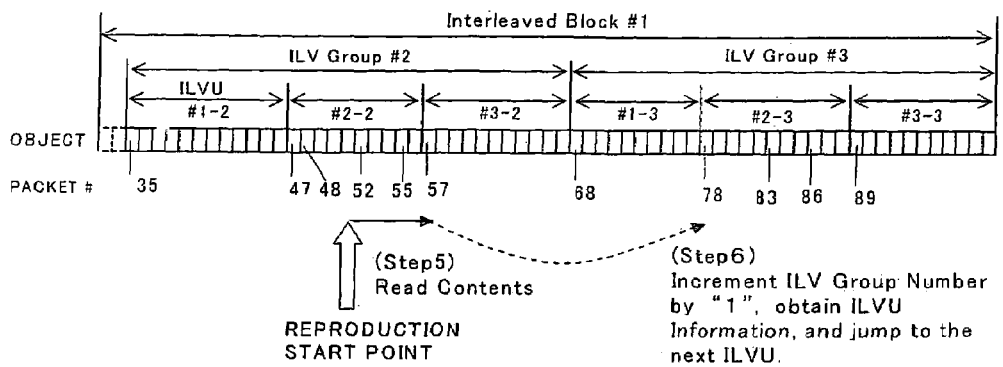

ILVU Table (Excerption)

| ILV Block Information Table | ILV Block #1 | ILV Group Information Table. | ILV Group#1 | ILV_Element_ID#1 | Address=0 |
|---|---|---|---|---|---|
| | | | | ILV_Element_ID#2 | Address=12 |
| | | | | ILV_Element_ID#3 | Address=25 |
| | | | ILV Group#2 | ILV_Element_ID#1 | Address=35 |
| | | | | ILV_Element_ID#2 | Address=47 |
| | | | | ILV_Element_ID#3 | Address=57 |
| | | | ILV Group#3 | ILV_Element_ID#1 | Address=68 |
| | | | | ILV_Element_ID#2 | Address=78 |
| | | | | ILV_Element_ID#3 | Address=89 |

(Step 4)
Obtain ILVU Information from ILV Block Number, ILV Group Number and ILV Element ID, and determine ILVU Length in ILVU Table.

(ES Address Information of Index#13 in ES Map Table)
ILV Block Number= 1   ILV Element ID=2

(Step 1)
Obtain ES Address Information, ILV Block Number and ILV Element ID.

| | Display Start Time Point | Packet Number (Offset from Interleaved Block Head) | ILVU Head Flag |
|---|---|---|---|
| | T1_0 | 1 2 | 1 |
| ILV Group#1 | T1_1 | 1 5 | 0 |
| | T1_2 | 1 9 | 0 |
| | T1_3 | 2 3 | 0 |
| ILV Group#2 | T1_4 | 4 8 | 1 |
| | T1_5 | 5 2 | 0 |
| | T1_6 | 5 5 | 0 |
| ILV Group#3 | T1_7 | 7 8 | 1 |
| | T1_8 | 8 3 | 0 |

Start Entry ←
First
Second ←
Entry of Display Start Time Point ↓

(Step 2)
Obtain Packet Number of Display Start Time Point (Step3)
Count Entries having "ILVU Head Flag=1" among Entries from Start to Display Start Time Point.
The Counted Number is ILV Group Number.

FIG. 23

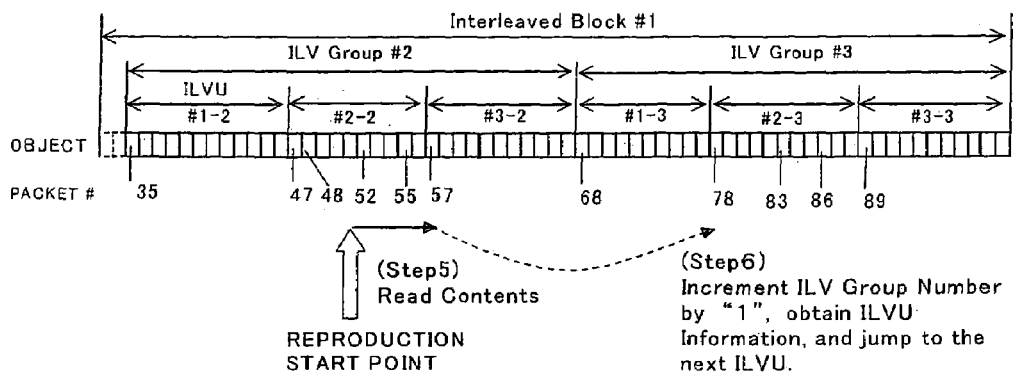

ILVU Table (Excerption)

| ILV Block Information Table | ILV Block #1 | ILV Group Information Table | ILV Group#1 | ILV_Element_ID#1 | Address=0 |
|---|---|---|---|---|---|
| | | | | ILV_Element_ID#2 | Address=12 |
| | | | | ILV_Element_ID#3 | Address=25 |
| | | | ILV Group#2 | ILV_Element_ID#1 | Address=35 |
| | | | | ILV_Element_ID#2 | Address=47 |
| | | | | ILV_Element_ID#3 | Address=57 |
| | | | ILV Group#3 | ILV_Element_ID#1 | Address=68 |
| | | | | ILV_Element_ID#2 | Address=78 |
| | | | | ILV_Element_ID#3 | Address=89 |

(ES Address Information of Index#13 in ES Map Table)   ILV Block Number=1、ILV Element ID=2
(Step 1)
Obtain ES Address Information, ILV Block Number and ILV Element ID.

| Display Start Time Point | Packet Number (Offset from Interleaved Block Head) | ILV Group Number |
|---|---|---|
| T1_0 | 1 2 | 1 |
| T1_1 | 1 5 | 1 |
| T1_2 | 1 9 | 1 |
| T1_3 | 2 3 | 1 |
| T1_4 | 4 8 | 2 |
| T1_5 | 5 2 | 2 |
| T1_6 | 5 5 | 2 |
| T1_7 | 7 8 | 3 |
| T1_8 | 8 3 | 3 |

ILV Group#1 { T1_0, T1_1, T1_2, T1_3 }
ILV Group#2 { T1_4, T1_5, T1_6 }
ILV Group#3 { T1_7, T1_8 }

Entry of Display Start Time Point (Step 2)
Obtain Packet Number of Display Start Time Point (Step 3)
Obtain ILV Group Number of Display Start Time Point.

ILVU Table (Excerption)

| ILV Block Information Table | ILV Block #1 | ILV Group Information Table | ILV Group#1 | ILV_Element_ID#1 | Address=0 |
|---|---|---|---|---|---|
| | | | | ILV_Element_ID#2 | Address=12 |
| | | | | ILV_Element_ID#3 | Address=25 |
| | | | ILV Group#2 | ILV_Element_ID#1 | Address=35 |
| | | | | ILV_Element_ID#2 | Address=47 |
| | | | | ILV_Element_ID#3 | Address=57 |
| | | | ILV Group#3 | ILV_Element_ID#1 | Address=68 |
| | | | | ILV_Element_ID#2 | Address=78 |
| | | | | ILV_Element_ID#3 | Address=89 |

FIG. 26

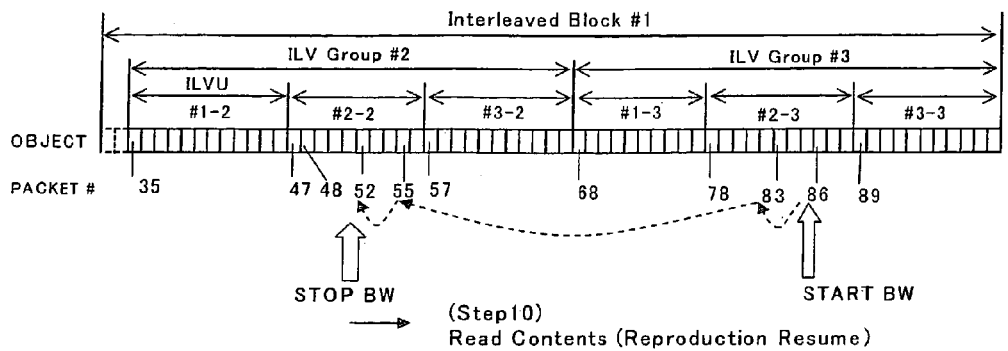

ILVU Table (Exception)

| | | ILV Group#1 | ILV_Element_ID#1 | Address=0 |
|---|---|---|---|---|
| ILV Block Information Table | ILV Block #1 | | ILV_Element_ID#2 | Address=12 |
| | ILV Group Information Table | | ILV_Element_ID#3 | Address=25 |
| | | ILV Group#2 | ILV_Element_ID#1 | Address=35 |
| | | | ILV_Element_ID#2 | Address=47 |
| | | | ILV_Element_ID#3 | Address=57 |
| | | ILV Group#3 | ILV_Element_ID#1 | Address=68 |
| | | | ILV_Element_ID#2 | Address=78 |
| | | | ILV_Element_ID#3 | Address=89 |

(Step9) Obtain ILVU Information from ILV Block Number, ILV Group Number, and ILV Element ID, and determine ILVU Length, in ILVU Table.

(ES Address Information of Index#13 in ES Map Table)  ILV Block Number = 1 , ILV Element ID=2

| | Display Start Time Point | Packet Number (Offset from Interleaved Block Head) | ILVU Head Flag |
|---|---|---|---|
| ILV Group#1 | T1_0 | 1 2 | 1 |
| | T1_1 | 1 5 | 0 |
| | T1_2 | 1 9 | 0 |
| | T1_3 | 2 3 | 0 |
| ILV Group#2 | T1_4 | 4 8 | 1 |
| | T1_5 | 5 2 | 0 |
| | T1_6 | 5 5 | 0 |
| ILV Group#3 | T1_7 | 7 8 | 1 |
| | T1_8 | 8 3 | 0 |

(Step8) Decrement ILV Group Number by "1", if "ILVU Head Flag =1" is found

← Stop BW (Step 7) Perform BW Operation. When stopped, obtain Packet Number of the Entry.

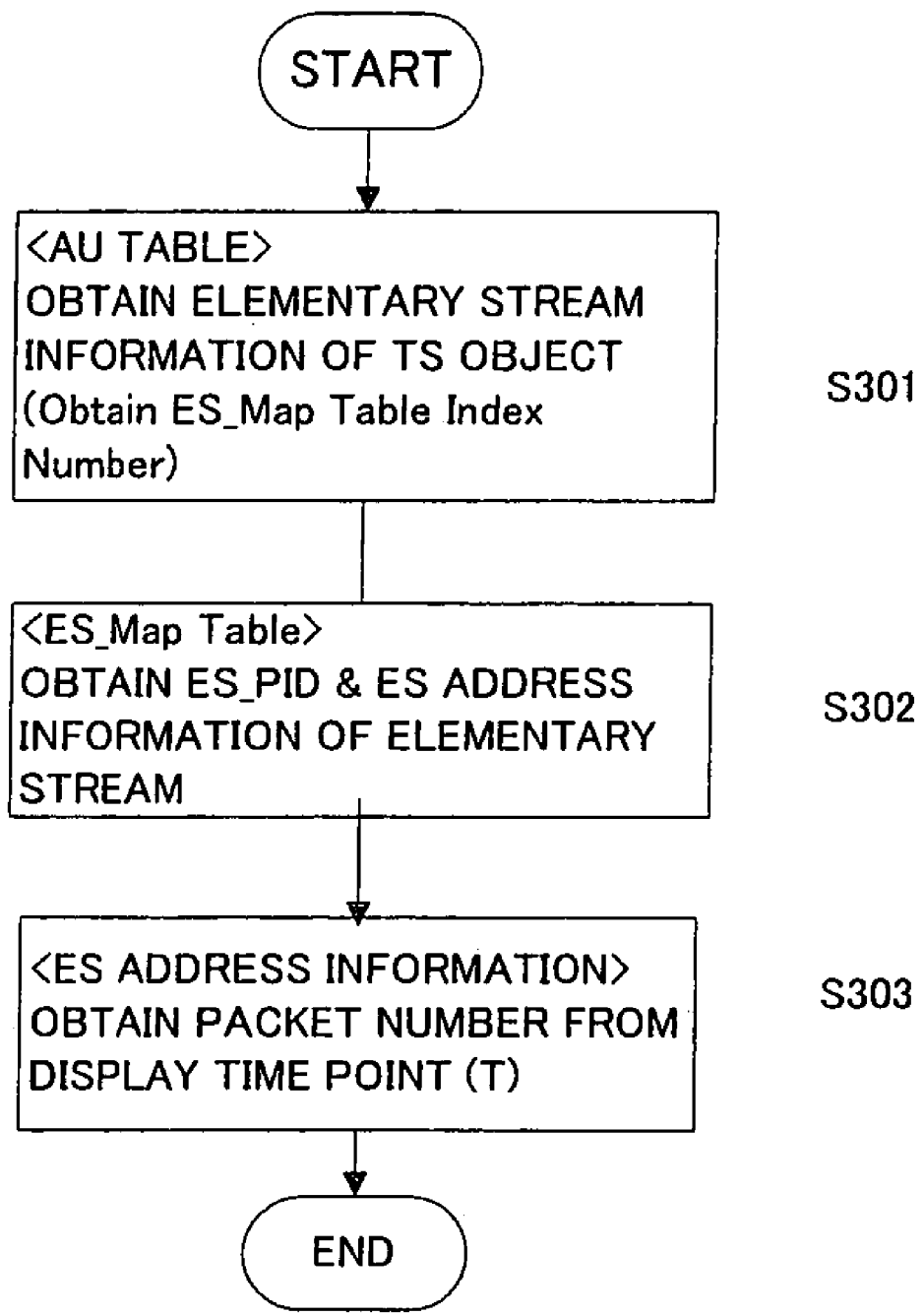

INFORMATION RECORDING MEDIUM, INFORMATION RECORDING APPARATUS AND METHOD, INFORMATION REPRODUCTION DEVICE AND METHOD, INFORMATION RECORDING/REPRODUCTION DEVICE AND METHOD, RECORDING OR REPRODUCTION CONTROL COMPUTER PROGRAM, AND DATA STRUCTURE CONTAINING A CONTROL SIGNAL

TECHNICAL FIELD

The present invention relates to: an information record medium, such as a high density optical disc, capable of recording various information such as video information or video information, audio information, sub-picture information, reproduction control information, and so on, at high density; an apparatus for and a method of recording the information onto the information record medium; an apparatus for and a method of reproducing the information from the information record medium; an apparatus and a method capable of both recording and reproducing the information and capable of editing contents such as the main picture (or video), the audio and so on; a computer program for controlling the recording or reproduction; and a data structure including a control signal for controlling the reproduction.

BACKGROUND ART

DVDs become common as optical discs onto which various information including content information such as video (i.e. main picture information), audio information and sub-picture information, and reproduction control information and so on is recorded. According to a DVD standard, the video information (video data), the audio information (audio data) and the sub-picture information (sub-picture data) are packetized each with the reproduction control information (navigation data) and multi-recorded onto a disc in a program stream format of MPEG 2(Moving Picture Experts Group phase 2), which is a high performance encoding technology. Among them, the video information has data, which is compressed in a MPEG video format (ISO 13818-2), for one stream in one program stream. On the other hand, the audio information is recorded in a plurality of formats (i.e. linear PCM, AC-3, MPEG audio and so on) and has data for up to 8 streams in one program stream. The sub-picture information is defined by a bitmap, and is compressed and recorded in a run length method, and has data for up to 32 streams in one program stream. In the case of the DVD, as described above, a plurality of streams of the selectable audio information (e.g. streams of a stereo sound, a surrounding sound, an original English sound, a dubbed Japanese sound, and the like) and a plurality of streams of the selectable sub-picture information (e.g. streams of Japanese caption, English caption, and the like) are multiplexed and recorded in the program stream format, for one stream of the video information in one movie or film, for example.

In this type of DVD, furthermore, it is possible to achieve an "angle reproduction" in which a plurality of video information relating to images or scenes from a plurality of viewpoints (hereinafter referred to as an "angle", as appropriate) is recorded onto a same disc, and a user select a desired angle to be reproduced. Thereby, according to this type of DVD, the plurality of video information corresponding to each angle is interleaved with each other, by an interleaved unit (ILVU). Furthermore, a navigation packet (NV_PCK) disposed at a head of a video object unit (VOBU) composing each interleaved unit stores therein angle information (SML_AGLI) indicating an address and size of the interleaved unit to be nextly reproduced for each angle.

DISCLOSURE OF INVENTION

In the above-described DVD, an address map (VTS_VOBU_ADMAPI) storing therein address information for the video object unit (VOBU) is used to access the video information. Therefore, even if a reproduction entry point is in the interleaved block, the head of the interleaved unit is always accessed to reproduce the navigation packet, and then the video information in the interleaved unit is reproduced.

However, in a record format for a large storage capacity and high record density optical disc under development by the present applicant, a time map (referred to as ES address information in the present embodiment) storing therein a packet number corresponding to each display start time point is used to access the video information. Therefore, if the reproduction entry point is in the interleaved block, an access is made to a "half way point" within the interleaved unit. As the result, the video information is reproduced without reproducing the navigation packet, and the interleaved unit to be nextly reproduced cannot be identified, which is a technical problem.

The present invention has been accomplished in view of the above problems. It is therefore an object of the present invention to provide an information record medium, an information record apparatus and method, an information reproduction apparatus and method, an information record reproduction apparatus and method, a computer program for a record or reproduction control, and a data structure including a control signal for a reproduction control, for allowing an efficient recording and reproduction of the object data having an interleave structure without using any navigation packet.

Hereinafter, the information record medium, the information record apparatus and method, the information reproduction apparatus and method, the information record reproduction apparatus and method, and the computer program according to the present invention will be discussed, in this order.

(Information Record Medium)

The information record medium according to the present invention is an information record medium onto which a whole stream (e.g. a transport stream) including a plurality of partial streams (e.g. elementary streams) each composed of a series of content information is multi-recorded by a packet unit (e.g. a TS packet unit) that is a physically accessible unit, the information record medium including: an object data file for storing object data composed of a plurality of packets each storing pieces of the content information and being a logically accessible unit; and an object information file for storing, as reproduction control information to control a reproduction of the object data file, relationship definition information (e.g. an elementary stream (ES) map table) to define a relationship between a plurality of packets to be multiplexed on a time axis and the plurality of partial streams, wherein the object data is interleaved in at least a part (e.g. an interleaved (ILV) block) of a reproduction range by an interleaved unit composed of a plurality of packets, and the object information file further stores, as the reproduction control information, unit address information (e.g. an interleaved unit (ILVU) table) to indicate an address of each interleaved unit.

According to the information record medium of the present invention, the whole stream such as at least a part of the transport stream in a MPEG2 or MPEG4 format includes a plurality of partial streams such as elementary streams. Each partial stream is composed of a series of content information reproducible by the information reproduction apparatus, such as the video information (video data), the audio information (audio data), and the sub-picture information (sub-picture data). That is, one "partial stream" herein means one data array or information array, such as a video stream, an audio stream, a sub-picture stream or the like, all of which are elementary streams and compose together a series of contents. On the other hand, one "whole stream" herein means a data array or information array in which a plurality of partial streams is bundled. The whole stream may be a transport stream itself bundling "m" (m is natural number equal to or more than 2) elementary streams in the MPEG2 or MPEG4 format, or may be a data array or information array bundling "n" (n is natural number equal to or more than 2 and less than "m") elementary streams thereamong. Such a whole stream is multi-recorded onto the information record medium, by a packet unit (e.g. a TS packet as mentioned below) that is a physically accessible unit by the information reproduction apparatus. Particularly, the object data file stores the object data composed of the plurality of packets each storing pieces of the content information and being the logically accessible unit by the information reproduction apparatus. The object information file stores the relationship definition information (e.g. an ES map table, as mentioned below, including an elementary stream packet ID (ES_PID) and the like), as the reproduction control information to control the reproduction of the object data file by the information reproduction apparatus.

Especially, the object data is interleaved in at least a part (e.g. an interleaved (ILV) block) of a reproduction range, by an interleaved unit composed of a plurality of packets. In other words, a plurality of interleaved unit is disposed alternately.

A length of the interleaved unit (data volume) corresponds to the reproduction time period in the order of less than 1 second to a few seconds. It has a length so as not to empty a buffer for the seamless reproduction, during a time period of a jump among reproduction positions on the reproduction such as the angle reproduction implemented with the information reproduction apparatus. The length of the interleaved unit can vary depending on the contents of the content information (e.g. motion level in a motion picture indicated by the video information). However, the length may be fixed.

Furthermore, the object information file stores therein, as the reproduction control information, the unit address information (e.g. an interleaved unit (ILVU) table) to indicate an address of each interleaved unit.

Therefore, in a normal reproduction or a special reproduction (e.g. fast forward, rewind and so on), it is possible to obtain quickly and easily addresses of interleaved units (e.g. a head address of each interleaved unit), on the basis of the unit address information. Then, in the interleaved unit after accessed, a sequential array of the plurality of packets can be reproduced. Thereby, it is possible to complete the access to the interleaved unit in a short time and reproduce packets included therein quickly. A continuation of these operations provides a continuous or sequential reproduction of a series of content information. Furthermore, even in a reproduction involving a switching among a plurality of video information, such as an angle switching as mentioned below, it is possible to access the appropriate interleaved unit without any problem.

Consequently, according to the information record medium of the present invention, in the reproduction, it is possible to refer to the relationship definition information and the unit address information stored in the object information file and thereby reproduce, in an appropriate sequence, an interleaved unit composing a series of content information from among a plurality of interleaved units, while the object data being interleaved. In this case, for example, there is no necessity of storing the address information about the next interleaved unit into an interleaved unit header, or into a packet for storing the control information, such as a navigation packet (NV_PCK) of the conventional DVD and the like. Alternatively, there is no necessity of preparing the address information for all packets in the relationship definition information (e.g. ES map table).

In addition, for example, if the content information for a relatively short time is reproduced via a buffer for a seamless reproduction, the seamless reproduction, i.e. a reproduction without any seam among the reproduced images (e.g. a seamless angle reproduction or the like) can be achieved. Furthermore, a seamless reproduction with high quality of image can be achieved, while retaining a relatively large amount of data for switchable video information (e.g. a transfer rate in the order of a few Mbps is maintained for each video information), due to interleaving. In order to shorten a response time for the switching in such a seamless reproduction, a length of the interleaved unit may be shortened, in practice, to about 1.5 seconds or less.

Incidentally, various informations stored in the object information file of the present invention are not preferably multiplexed by a packet unit, in contrast to the case of the object data file. Therefore, in the information reproduction apparatus, it is possible to perform efficiently the reproduction of the multi-recorded object data, on the basis of the collectively read reproduction control information. Although the packet address according to the present invention may be a physical address, it is typically a logic address. The physical address in practice is identified uniquely from the logic address through a management of the file system.

In an aspect of the information record medium according to the present invention, the unit address information (e.g. an ILVU table) includes a head address of each interleaved unit.

According to this aspect, in the reproduction, it is possible to obtain the head address of each interleaved unit quickly and easily, on the basis of the unit address information. Then, a sequential array of the plurality of packets can be reproduced in the interleaved unit after accessed.

Incidentally, the "head address" according to the present invention may be a serial number or a consecutive number (e.g. an offset address or relative address) in an interleaved reproduction range (e.g. interleaved block). Alternatively, it may be a serial number or a consecutive number (e.g. an absolute address) in a larger data unit, such as one object data file or all object data files.

In another aspect of the information record medium according to the present invention, the unit address information is stored in the object information file, as an interleaved unit table (e.g. an ILVU table) which is tabled for some of the interleaved units, and the relationship definition information is stored in the object information file, as a relationship definition information table (e.g. an ES map table) which is tabled for some of the partial streams.

According to this aspect, in the reproduction, referring to the relationship definition table and the interleaved unit table which are stored in the object information file makes it possible to reproduce the interleaved unit composing a series of content information more efficiently and in an appropriate sequence, from among the plurality of interleaved units.

In another aspect of the information record medium according to the present invention, the relationship definition information (e.g. an ES map table) includes block number information (e.g. an ILV block number) to indicate an identification number of the interleaved reproduction range (e.g. an interleaved block).

According to this aspect, referring to the block number information in the relationship definition information makes it possible to identify the reproduction range, as well as whether or not the content information has the interleaved reproduction range, in the reproduction. Furthermore, storing the unit address information in advance in a manner that the unit address information corresponds to the block number information makes it possible to associate the interleaved reproduction range with the unit address information easily and quickly. The "block number information" according to the present invention may be a serial number or a consecutive number assigned to a plurality of reproduction ranges in the object data file.

Incidentally, if the content information is not interleaved, it may be indicated by setting the value of the block number information to a predetermined value such as "0".

In another aspect of the information record medium according to the present invention, the content information includes a plurality of video information (e.g. angle video information relating to a plurality of angles corresponding to a plurality of view points) switchable to each other during a reproduction of the content information and each of which composes the partial streams, and the relationship definition information includes interleaved element identification information (e.g. ILVU element identification information) to identify, as a specific interleaved element (e.g. an array of a plurality of interleaved units relating to only one angle), each array of a plurality of the interleaved units corresponding to the plurality of video information.

According to this aspect, storing the unit address information in advance in a manner that the unit address information corresponds to such interleaved element identification information allows referring to the interleaved element identification information included in the relationship definition information (e.g. an ES map table), in the reproduction, and thereby finding quickly and easily the interleaved unit belonging to the interleaved element. Therefore, it becomes possible to perform a display switching such as a seamless angle switching, on the basis of the plurality of interleaved video information.

Incidentally, if the content information is not interleaved, it may be indicated by setting the value of the interleaved element identification information to a predetermined value such as "0".

In this aspect, the unit address information is stored for each interleaved block which indicates the interleaved reproduction range, the unit address information is stored for each interleaved group in which a plurality of interleaved units switchable to each other is classified, in each interleaved block, and the unit address information is stored further for each interleaved element in each interleaved group.

In this arrangement, in the reproduction, it is possible to quickly and easily refer to an address of the interleaved unit belonging to the interleaved element to be reproduced from among the interleaved group in the interleaved block to be reproduced.

Furthermore in this case, the relationship definition information (e.g. an ES map table) may include group judgement information (e.g. an ILVU head flag or an ILVU group number) to judge as to that each packet belongs to which interleaved group, for at least a part of packets in each partial stream.

In this arrangement, not only in the normal reproduction but also in the special reproduction (e.g. fast forward, rewind and so on), referring to the group judgement information included in the relationship definition information makes it possible to judge easily and quickly as to that a packet relating to a partial stream to be reproduced belongs to which interleaved stream, before an actual reproduction of each packet. Therefore, also in the special reproduction in addition to the normal reproduction, it is possible to start quickly the reproduction of the content information relating to the desired partial stream.

Further in this case, the group judgement information may include group number information (e.g. an ILVU group number as an example of ILVU group judgement information) to indicate an identification number of an interleaved group to which each packet belongs.

In this arrangement, even in the special reproduction, referring to the group number information included in the relationship definition information (e.g. an ES map table) makes it possible to judge easily and quickly as to that a packet relating to a partial stream to be reproduced belongs to which interleaved group, before an actual reproduction of each packet.

For example, a serial number or a consecutive number may be assigned to each interleaved group, so that the "group number information" according to the present invention includes number information indicating the serial number or the consecutive number.

Incidentally, a packet relating to the information other than the video information, such as the audio information and the sub-picture information, does not need such group number information. For example, once a group to which a packet relating to the video information belongs is identified, a packet relating to the audio information or the sub-picture information can be identified, on the basis of the relationship among the packet as for the video information and the group. However, a packet relating to the audio information or the sub-picture information may be provided with such group number information.

Alternatively in this case, the group judgement information may includes head flag information (e.g. an ILVU head flag as another example of the ILVU group judgement information) to indicate whether or not each packet is a head packet in the interleaved unit.

In this arrangement, even in the special reproduction, referring to the head flag information included in the relationship definition information (e.g. an ES map table) makes it possible to judge easily and quickly as to that a packet relating to a partial stream to be reproduced belongs to which interleaved group, before an actual reproduction of each packet.

For example, a serial number or a consecutive number is assigned to each interleaved group, so that the serial number or the consecutive number can be obtained by counting the "head flag information" according to the present invention.

Incidentally, a packet relating to the information other than the video information, such as the audio information or the sub-picture information, does not need the head flag information, as in the case of the group number information.

Alternatively, in another aspect of the information record medium according to the present invention, the relationship definition information (e.g. an ES map table) includes: partial stream packet identification information (e.g. an ES_PID) to identify the plurality of packets for each of the partial streams; and partial stream address information (e.g. an ES address information) to indicate each packet address of at least a part of packets in each of the partial streams.

According to this aspect, in the reproduction, a plurality of packets multi-recorded on the time axis can be distinguished from each other, on the basis of the partial stream packet identification information included in the relationship definition information. For example, it is possible to judge a plurality of packets, which is multiplexed on the time axis such as a recording time axis or a reproduction time axis and which exists in a number corresponding to the number of the partial streams relative to each time point, belongs to which partial stream, by referring to the partial stream packet identification information. Furthermore, it is possible to obtain an address of each packet identified as such, by referring to the partial stream address information included in the relationship definition information.

In an aspect in which the aforementioned relationship definition information includes the group judgement information, the relationship definition information (an ES map table) may include: partial stream packet identification information (e.g. an ES_PID) to identify each of the plurality of packets in each of the partial streams; and partial stream address information (e.g. an ES address information) to indicate each packet address of at least a part of packets in each of the partial streams, wherein the group judgement information is included in the partial stream address information.

In this arrangement, since the group judgement information such as the group number information or the head flag information is included in the partial stream address information included in the relationship definition information, it is possible to judge easily and quickly as to that a packet corresponding to each partial stream belongs to which interleaved group.

In an aspect relating to the partial stream address information, the partial stream address information (e.g. an ES address information) may include packet address information to indicate each packet address of at least a part of packets in each of the partial streams, in a manner corresponding to each reproduction start time point.

In this arrangement, referring to the packet address information which may be consist of the serial number or the consecutive number (e.g. an offset address or relative address) in the interleaved block makes it possible to obtain an address of each packet corresponding to a partial stream to be reproduced.

In an aspect in which the content information includes a plurality of video information and which relates to the interleaved block, the plurality of video information may be a plurality of angle video information corresponding to a plurality of view points, and the object data may be interleaved in such a manner that a reproduction start time points of the interleaved units for the plurality of angle video information correspond in the same interleaved block and a reproduction end time points of the interleaved units for the plurality of angle video information correspond in the same interleaved block.

In this arrangement, the object data is interleaved in such a manner that reproduction start time points and reproduction end time points are aligned among interleaved units relative to the plurality of angle video information, in the same interleaved group. Therefore, when an angle switching is performed by the information reproduction apparatus, the switching can be completed in a short time by making an access to a packet corresponding to the video information to be reproduced after the angle switching in accordance with the unit address information. Therefore, a seamless angle reproduction can be achieved easily by reproducing the contents information in a relatively short time via a buffer for a seamless reproduction.

The interleaved block for such an angle switching may be provided in its plural number at a plurality of positions separated from each other on the reproduction time axis for one title (such as a movie). In this case, the number of angles may be the same or may be different in the same title or among different titles. In the angle switching, the audio information or the sub-picture information may be the same regardless of the switching of the video information (main picture information), or may be switched in response to the switching of the video information.

The angle switching according to the present invention includes a case that the video information after the switching is started to be reproduced from a time point going back a predetermined time on the reproduction time axis of the video information before the switching, in addition to the switching among the video information at the same time points on the reproduction time axis.

Furthermore, in an aspect relating to such an angle, the address information of the interleaved unit stored in the unit address information (e.g. an ILVU table) may be a packet number (a serial number of packets) in the interleaved block for the angle switching. That is, if there is a plurality of interleaved blocks for the angle switching, a serial number independently defined for each block starts from a basic value such as "0" or "1". Therefore, even if an editing is done in any block other than the block of interest and thereby a serial number of packets is changed in the object data file, a serial number of packets is maintained on the address information in the block of interest. That is, it is advantageously possible to avoid a change of a serial number of packets and the accompanying change in the address information. Incidentally, in the interleaved block for the angle switching, since it has a complex data structure in which a plurality of switchable video information is interleaved, an editing inside of it is usually difficult.

Incidentally, in such a construction, the object information file may further store, as the reproduction control information, the angle number information to indicate an angle number relating to each interleaved unit or the angle quantity information to indicate a quantity of switchable angles.

In another aspect of the information record medium according to the present invention, the object information file further stores unit size information to indicate a size of the each interleaved unit.

According to this aspect, in the reproduction, referring to the unit size information stored in the object information file makes it possible to identify easily and quickly, for example, a data length of the interleaved unit, which is variable depending on statistical multiplicity of the transport stream. However, such an interleaved unit size may be identified from a calculation of spaces or the like between head positions of each interleaved unit, on the basis of the head flag or the like.

Incidentally, in another aspect of the information record medium according to the present invention, the information record medium further includes a reproduction sequence information file (e.g. a playlist information file) for storing reproduction sequence information (e.g. playlist information as mentioned below) to define a reproduction sequence of the object data stored in the object data file.

According to this aspect, since the reproduction sequence information is not multiplexed by a packet unit on the information record medium, differently from the case of the object data file, it is possible to reproduce the object data with the information reproduction apparatus as intended or expected, on the basis of the reproduction control information and the reproduction sequence information as mentioned above.

(Information Record Apparatus and Method)

The information record apparatus according to the present invention is an information record apparatus for recording a whole stream including a plurality of partial streams each composed of a series of content information onto an information record medium by a packet unit that is a physically accessible unit, the information record apparatus being provided with: a first record device for recording an object data file for storing object data composed of a plurality of packets each storing pieces of the content information and being a logically accessible unit; and a second record device for recording an object information file for storing, as reproduction control information to control a reproduction of the object data file, relationship definition information to define a relationship between a plurality of packets to be multiplexed on a time axis and the plurality of partial streams, wherein the object data is interleaved in at least a part of a reproduction range by an interleaved unit composed of a plurality of packets, and the object information file further stores, as the reproduction control information, unit address information to indicate an address of each interleaved unit.

According to the information record apparatus of the present invention, the first record device such as a system controller, an encoder, an optical pickup or the like, records the object data file for storing the object data, and the second record device such as a system controller, an encoder, a TS object generator as mentioned below, an optical pickup or the like, records the object information file for storing the relationship definition information. Furthermore, the object data is interleaved, and the object information file further stores therein the unit address information to indicate an address of each interleaved unit, as the reproduction control information. Therefore, a whole stream such as at least a part of MPEG2 transport streams can be interleaved by an interleaved unit and multi-recorded onto the information record medium according to the present invention.

Incidentally, the information record apparatus according to the present invention may also take various aspects, correspondingly to various aspects of the information record medium according to the present invention as mentioned above.

The information record method according to the present invention is an information record method of recording a whole stream including a plurality of partial streams each composed of a series of content information onto an information record medium by a packet unit that is a physically accessible unit, the information record method being provided with: a first record process of recording an object data file for storing object data composed of a plurality of packets each storing pieces of the content information and being a logically accessible unit; and a second record process of recording an object information file for storing, as reproduction control information to control a reproduction of the object data file, relationship definition information to define a relationship between a plurality of packets to be multiplexed on a time axis and the plurality of partial streams, wherein the object data is interleaved in at least a part of a reproduction range by an interleaved unit composed of a plurality of packets, and the object information file further stores, as the reproduction control information, unit address information to indicate an address of each interleaved unit.

According to the information record method of the present invention, the first record process is for recording the object data file for storing the object data, the second record process is for recording the object information file for storing the relationship definition information. Furthermore, the object data is interleaved, and the object information file further stores therein the unit address information to indicate an address of each interleaved unit, as the reproduction control information. Therefore, a whole stream such as at least a part of MPEG2 transport streams can be interleaved by an interleaved unit and multi-recorded onto the information record medium according to the present invention.

Incidentally, the information record method according to the present invention may also take various aspects, correspondingly to various aspects of the information record medium according to the present invention.

(Information Reproduction Apparatus and Method)

The information reproduction apparatus according to the present invention is an information reproduction apparatus for reproducing the recorded content information from the information record medium according to the present invention (including various aspects), the information reproduction apparatus being provided with: a read device for reading information physically from the information record medium; and a reproduction device for reproducing the object data for each of the partial streams, while de-interleaving the interleaved unit, on the basis of the relationship definition information and the unit address information included in the information read by the read device.

According to the information reproduction apparatus of the present invention, the read device such as an optical pickup and a decoder reads physically the information from the information record medium by the packet unit. The reproduction device such as a system controller, a demultiplexer and a decoder reproduces the object data for each partial stream, while de-interleaving the interleaved unit, on the basis of the relationship definition information and the unit address information included in the read information. Therefore, it is possible to reproduce appropriately the information on the information record medium according to the present invention (including various aspects).

Incidentally, the information reproduction apparatus according to the present invention may also take various aspects, correspondingly to various aspects of the information record medium according to the present invention.

The information reproduction method according to the present invention is an information reproduction method of reproducing the recorded content information from the information record medium according to the present invention mentioned above (including various aspects thereof), the information reproduction method being provided with: a read process of reading information physically from the information record medium; and a reproduction process of reproducing the object data for each of the partial streams, while de-interleaving the interleaved unit, on the basis of the relationship definition information and the unit address information included in the information read at the read process.

According to the information reproduction method of the present invention, the information is physically read from the information record medium by a packet unit or the like. Then, the object data is reproduced for each partial stream, while de-interleaving the interleaved unit, on the basis of the relationship definition information and the unit address information included in the read information. Therefore, it is possible to reproduce appropriately the information on the information record medium according to the present invention (including various aspects thereof).

Incidentally, the information reproduction method according to the present invention may also take various aspects, correspondingly to various aspects of the information record medium according to the present invention as mentioned above.

(Information Record Reproduction Apparatus and Method)

The information record reproduction apparatus according to the present invention is an information record reproduction apparatus for recording the content information onto the information record medium according to the present invention mentioned above (including various aspects thereof) and reproducing the recorded content information, the information record reproduction apparatus being provided with: a first record device for recording the object data file; a second record device for recording the object information file; a read device for reading information physically from the information record medium; and a reproduction device for reproducing the object data for each of the partial streams, while de-interleaving the interleaved unit, on the basis of the relationship definition information and the unit address information included in the information read by the read device.

According to the information record reproduction apparatus of the present invention, as in the case of the information record apparatus of the present invention, the first record device records the object data file, and the second record device records the object information file. Then, as in the case of the information reproduction apparatus of the present invention, the read device physically reads the information from the information record medium, and the reproduction device reproduces the object data for each partial stream, while de-interleaving the interleaved unit, on the basis of the relationship definition information and the unit address information included in the read information. Therefore, it is possible to reproducibly multi-record the content information onto the information record medium of the present invention, while the content information is interleaved by an interleaved unit, and it is possible further to reproduce it appropriately.

Incidentally, the information record reproduction apparatus according to the present invention may also take various aspects, correspondingly to various aspects of the information record medium according to the present invention.

The information record reproduction method according to the present invention is an information record reproduction method of recording the content information onto the information record medium according to the present invention (including various aspects thereof) and reproducing the recorded content information, the information record reproduction method being provided with: a first record process of recording the object data file; a second record process of recording the object information file; a read process of reading information physically from the information record medium; and a reproduction process of reproducing the object data for each of the partial streams, while de-interleaving the interleaved unit, on the basis of the relationship definition information and the unit address information included in the information read at the read process.

According to the information record reproduction method of the present invention, as in the case of the information record method of the present invention, the first record process is for recording the object data file, and the second record process is for recording the object information file. Then, as in the case of the information reproduction method of the present invention, the read process is for physically reading the information from the information record medium, and the reproduction device is for reproducing the object data for each partial stream, while de-interleaving the interleaved unit, on the basis of the relationship definition information and the unit address information included in the read information. Therefore, it is possible to reproducibly multi-record the content information onto the information record medium of the invention, while the content information is interleaved by an interleaved unit, and it is possible further to reproduce appropriately it.

Incidentally, the information record reproduction method according to the present invention may also take various aspects, correspondingly to various aspects of the information record medium according to the present invention.

(Computer Program)

The first computer program according to the present invention is a computer program for a record control to control a computer disposed at the information record apparatus according to the present invention mentioned above (including various aspects thereof), the computer program making the computer function as at least a part of the first record device and the second record device.

According to the first computer program for a record control of the present invention, the information record apparatus according to the present invention mentioned above may be embodied relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

The second computer program according to the present invention is a computer program for a reproduction control to control a computer disposed at the information reproduction apparatus according to the present invention mentioned above (including various aspects thereof), the computer program making the computer function as at least a part of the read device and the reproduction device.

According to the second computer program for a reproduction control of the present invention, the information reproduction apparatus according to the present invention mentioned above may be embodied relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

The third computer program according to the present invention is a computer program for a record reproduction control to control a computer disposed at the information record reproduction apparatus according to the present invention mentioned above (including various aspects thereof), the computer program making the computer function as at least a part of the first record device, the second record device, the read device and the reproduction device.

According to the third computer program for a record reproduction control of the present invention, the information record reproduction apparatus according to the present invention mentioned above may be embodied relatively easily, by reading and running the computer program from a record medium, such as a ROM, a CD-ROM, a DVD-ROM, a hard disk and so on, storing the computer program therein/thereon, or by downloading the computer program to the computer via the communication device and running it.

The above object of the present invention is achieved by a computer program product for a record control in a computer-readable medium for tangibly embodying a program of instructions executable by a computer disposed at the aforementioned information record apparatus according to the present invention (including various aspects), the computer program product making the computer function as at least a part of the first record device and the second record device.

The above object of the present invention is achieved by a computer program product for a reproduction control in a computer-readable medium for tangibly embodying a program of instructions executable by a computer disposed at the information reproduction apparatus according to the present invention (including various aspects), the computer program product making the computer function as at least a part of the read device and the reproduction device.

The above object of the present invention is achieved by a computer program product for a record reproduction control in a computer-readable medium for tangibly embodying a program of instructions executable by a computer disposed at the information record reproduction apparatus according to the present invention (including various aspects), the computer program product making the computer function as at least a part of the first record device, the second record device, the read device and the reproduction device.

According to the computer program product for the record control, the reproduction control, or the record reproduction control of the present invention, at least a part of the first record device, the second record device, the read device and the reproduction device according to the present invention mentioned above may be embodied relatively easily, by reading and running the computer program product from a record medium, such as a ROM, a CD-ROM, a DVD-ROM, a hard disk and so on, storing the computer program therein/thereon, or by downloading the computer program product to the computer via the communication device and running it. More specifically, the computer program product may be made of computer readable codes (or computer readable commands) to make the computer function as at least a part of the first record device, the second record device, the read device and the reproduction device.

(Data Structure including Control Signal)

The data structure including a control signal according to the present invention is a data structure including a control signal in which a whole stream including a plurality of partial streams each composed of a series of content information is multi-recorded by a packet unit that is a physically accessible unit, the data structure being provided with: an object data file for storing object data composed of a plurality of packets each storing pieces of the content information and being a logically accessible unit; and an object information file for storing, as reproduction control information to control a reproduction of the object data file, relationship definition information to define a relationship between a plurality of packets to be multiplexed on a time axis and the plurality of partial streams, wherein the object data is interleaved in at least a part of a reproduction range by an interleaved unit composed of a plurality of packets, and the object information file further stores, as the reproduction control information, unit address information to indicate an address of each interleaved unit.

According to the data structure including the control signal of the present invention, as in the case the information record medium of the present invention, it is possible to record or reproduce efficiently the interleaved contents information. Therefore, it is possible to perform the seamless angle reproduction. Furthermore, it is possible to perform the seamless angle reproduction with high quality of image, since a relatively large amount of data of each video information due to interleaving.

These effects and other advantages of the present invention will be more apparent from the following embodiments and examples.

As discussed above, according to the information record medium of the present invention, since the object information file stores the relationship definition information and the unit address information, the interleaved unit can be reproduced in an appropriate sequence in the reproduction, even though it is interleaved. According to the information record apparatus or method of the present invention, since there are provided with the first and second record devices or the first and second record processes, the contents information can be reproducibly multi-recorded while being interleaved. According to the information reproduction apparatus or method of the present invention, since there are provided with the read device and the reproduction device or the read process and the reproduction process, the information on the information record medium of the present invention can be appropriately reproduced. Furthermore, according to the computer program of the present invention, since the computer is functioned as the information record apparatus, the information reproduction apparatus or the information record reproduction apparatus of the invention, the information on the information record medium of the invention can be efficiently recorded or reproduced.

BRIEF DESCRIPTION OF DRAWINGS

FIG. 12 is a schematic diagram showing the data structure of the TS object finally constructed on the optical disc in the specific example.

FIG. 13 is a schematic diagram showing one specific example of the data structure of the disc information file, in one specific example of the embodiment.

FIG. 14 is a schematic diagram showing one specific example of the data structure of the title information table included in the disc information file, in one specific example of the embodiment.

FIG. 15 is a schematic diagram showing one specific example of the data structure of a play list information table constructed in a play list information file in one specific example of the embodiment.

FIG. 21 is a conceptual diagram showing a specific example of ES address information in a video stream of angle #2 in title #1 in an embodiment: a specific example using an "ILVU head flag" as an example of ILV group judgement information (FIG. 21(A)); and a specific example using an "ILV group number" (FIG. 21(B)).

FIG. 22 is a conceptual diagram showing a reproduction principle using interleaving and the ILVU table in the embodiment.

FIG. 23 is a conceptual diagram showing another reproduction principle using interleaving and the ILVU table in the embodiment.

FIG. 26 is a conceptual diagram showing another reproduction principle using interleaving and the ILVU table in the embodiment.

FIG. 35 is a flow chart showing a packet number obtaining process in FIG. 34.

BEST MODE FOR CARRYING OUT THE INVENTION (Information Record Medium)

The information record medium of the present invention is discussed, with reference to its embodiments, as well as FIG. 1 to FIG. 7. In these embodiments, the information record medium of the present invention is applied to an optical disc capable of recording (writing) and reproducing (reading).

Figure 1:
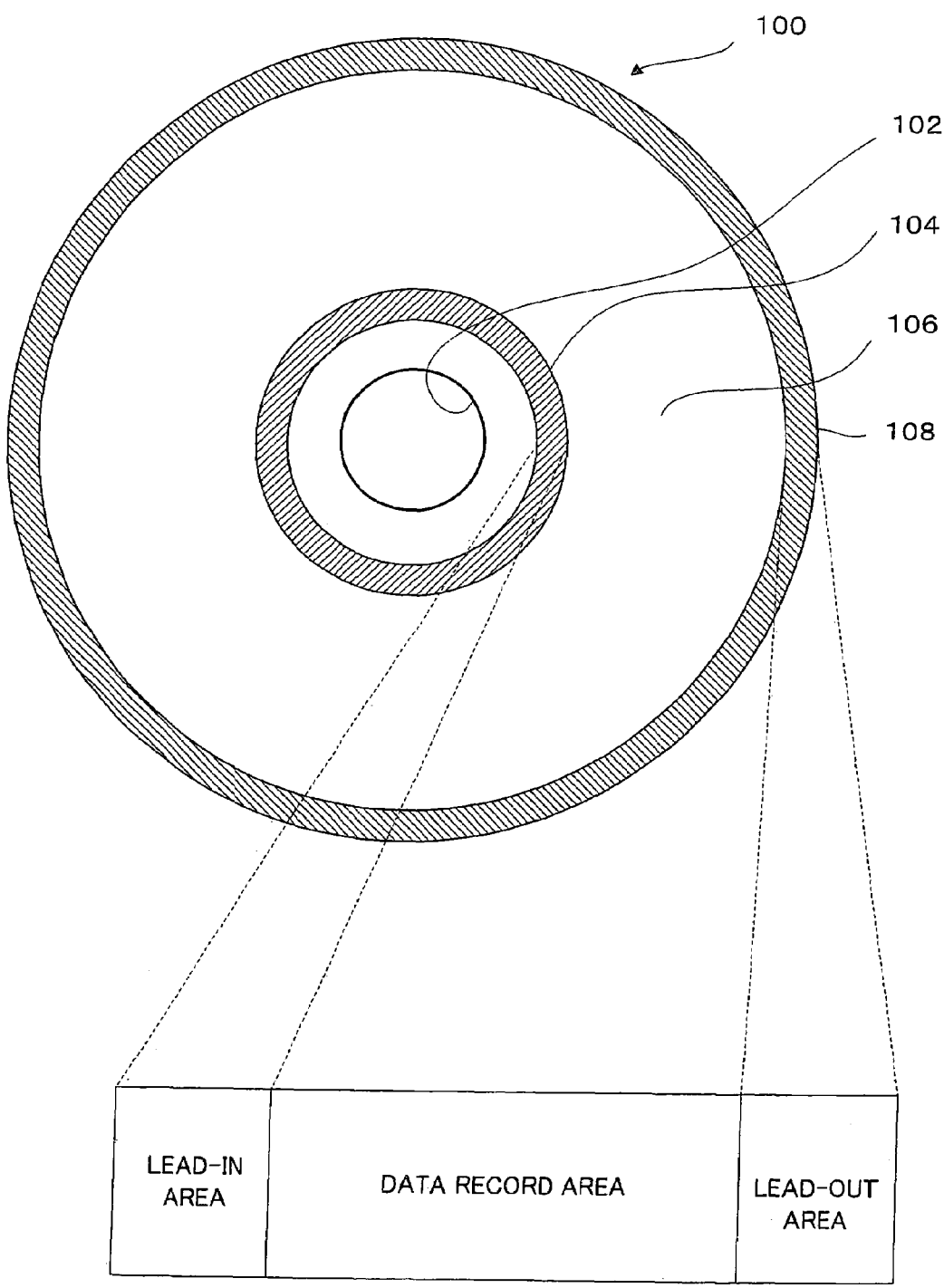
FIG. 1 illustrates, in its upper part, a general plan view of an optical disc as an embodiment of the information record medium of the present invention; and illustrates, in its lower part, a schematic conceptual diagram of an area structure in a radius direction corresponding to the general plan view in the upper part.

Firstly, with reference to FIG. 1, a fundamental structure of the optical disc in an embodiment is discussed. FIG. 1 illustrates, in its upper part, a general plan view of the optical disc structure having a plurality of areas, and illustrates conceptually, in its lower part, an area structure in the radius direction corresponding to the upper part.

As shown in FIG. 1, the optical disc 100 may be recorded by various record methods, such as a magneto-optical method, a phase change method, capable of recording (writing) only once or a plurality of times. Similarly to DVDs, the optical disc 100 has a lead-in area 104, a data area 106 and a lead-out area 108, from the inner circumference around a center hole 102 to the outer circumference, on the record surface of the disc body measuring about 12 cm in diameter. In each area, groove tracks and land tracks may be alternately arranged, concentrically or spirally around the center hole 102. The groove tracks may be wobbled. Furthermore, pre-pits may be formed on one or both of these tracks. Incidentally, the present invention is not exclusively limited to the optical disc having three areas mentioned above.

Figure 2A:
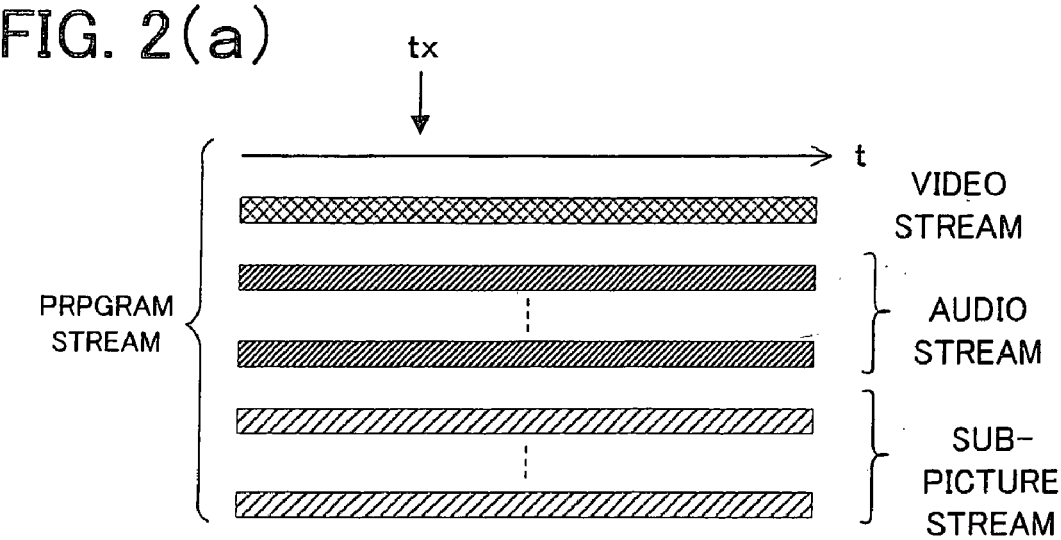
FIG. 2 illustrates a schematic conceptual diagram (FIG. 2($a$)) of a conventional program stream of MPEG2; and a schematic conceptual diagram (FIG. 2($b$)) of a transport stream of MPEG2 used in the embodiment.
Figure 2B:
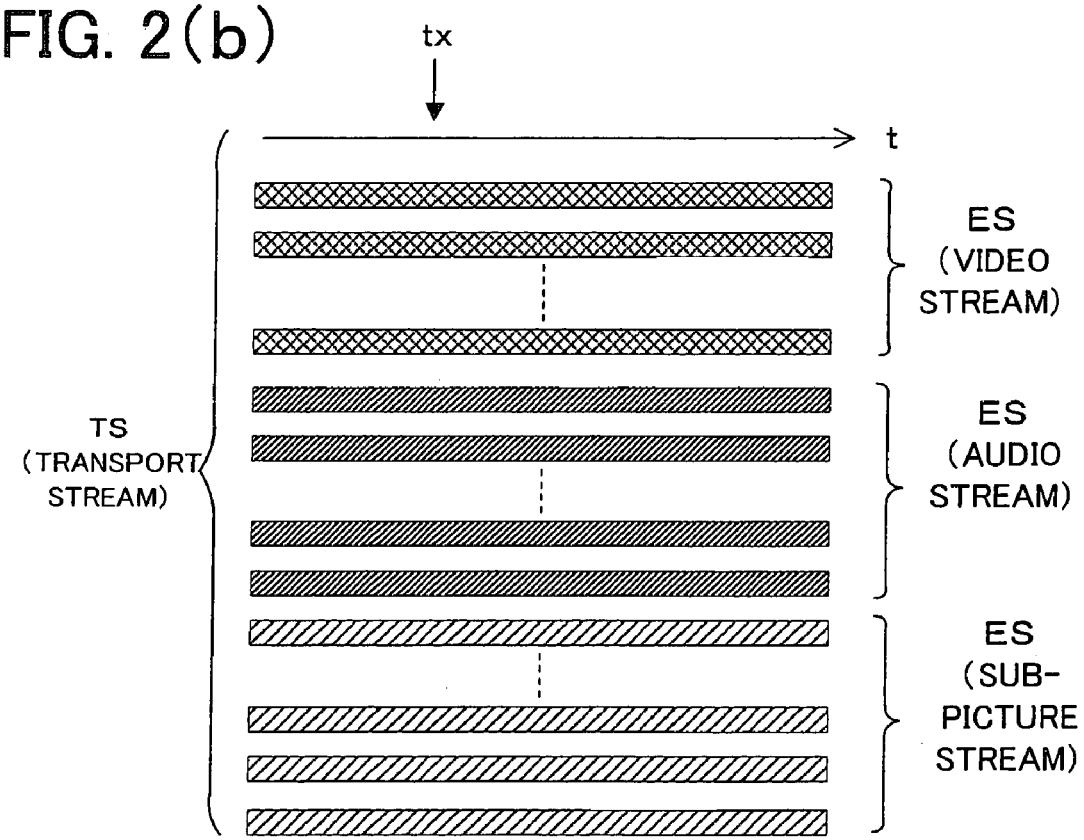

Next, with reference to FIG. 2, the structures of the transport stream (TS) and the program stream (PS) to be recorded onto the optical disc in the embodiment are discussed. FIG. 2(a) schematically illustrates a MPEG2 program stream of a conventional DVD for a comparison, FIG. 2(b) schematically illustrates a MPEG2 transport stream (TS) structure.

In FIG. 2(a), one program stream includes only one video stream for video data as video information (i.e. main picture information), along the time axis t, and further includes up to 8 audio streams of audio data as audio information, up to 32 sub-picture streams for sub-picture data as sub-picture information. That is, the video data to be multiplexed at an arbitrary time point tx relates to only one video stream. For example, a plurality of video stream corresponding to a plurality of TV programs or a plurality of movies can not be included at the same time in the program stream. It is not possible to multiplex a plurality of TV programs and transfer or record them, in a program stream format of a DVD having only one video stream, because at least one video stream is required for each TV program, in order to transfer or record the multiplexed TV program or the like involving a video image.

In FIG. 2(b), one transport stream (TS) includes a plurality of video streams as elementary streams (ES) for video data as video information, and further includes a plurality of audio streams as elementary streams (ES) for audio data as audio information and a plurality of sub-picture streams as elementary streams (ES) for sub-picture as sub-picture information. That is, the video data to be multiplexed at an arbitrary time point tx relates to a plurality of video streams. For example, a plurality of video streams that may correspond to a plurality of TV programs or a plurality of movies can be included at the same time in the transport stream. Thus, it is possible to multiplex a plurality of TV programs and transfer or record them, in the transport stream format having a plurality of video streams. However, the sub-picture stream is not transferred in a digital broadcasting employing the existing transport stream.

Incidentally, for convenience of explanation, the video stream, the audio stream and the sub-picture stream are arranged in this order from the top in FIG. 2(a) to FIG. 2(b). Nevertheless, this order or sequence does not correspond to an order or sequence for multiplexing packet by packet as mentioned below. In the transport stream, conceptually, a set of one video stream, two audio streams and two sub-picture streams corresponds to one program for example.

The optical disc 100 in the aforementioned embodiment is adapted to multi-record the transport stream (TS) including a plurality of elementary streams (ES) as described before, within a limitation of a record rate. That is, the disc 100 is adapted to record a plurality of programs at the same time.

Figure 3:
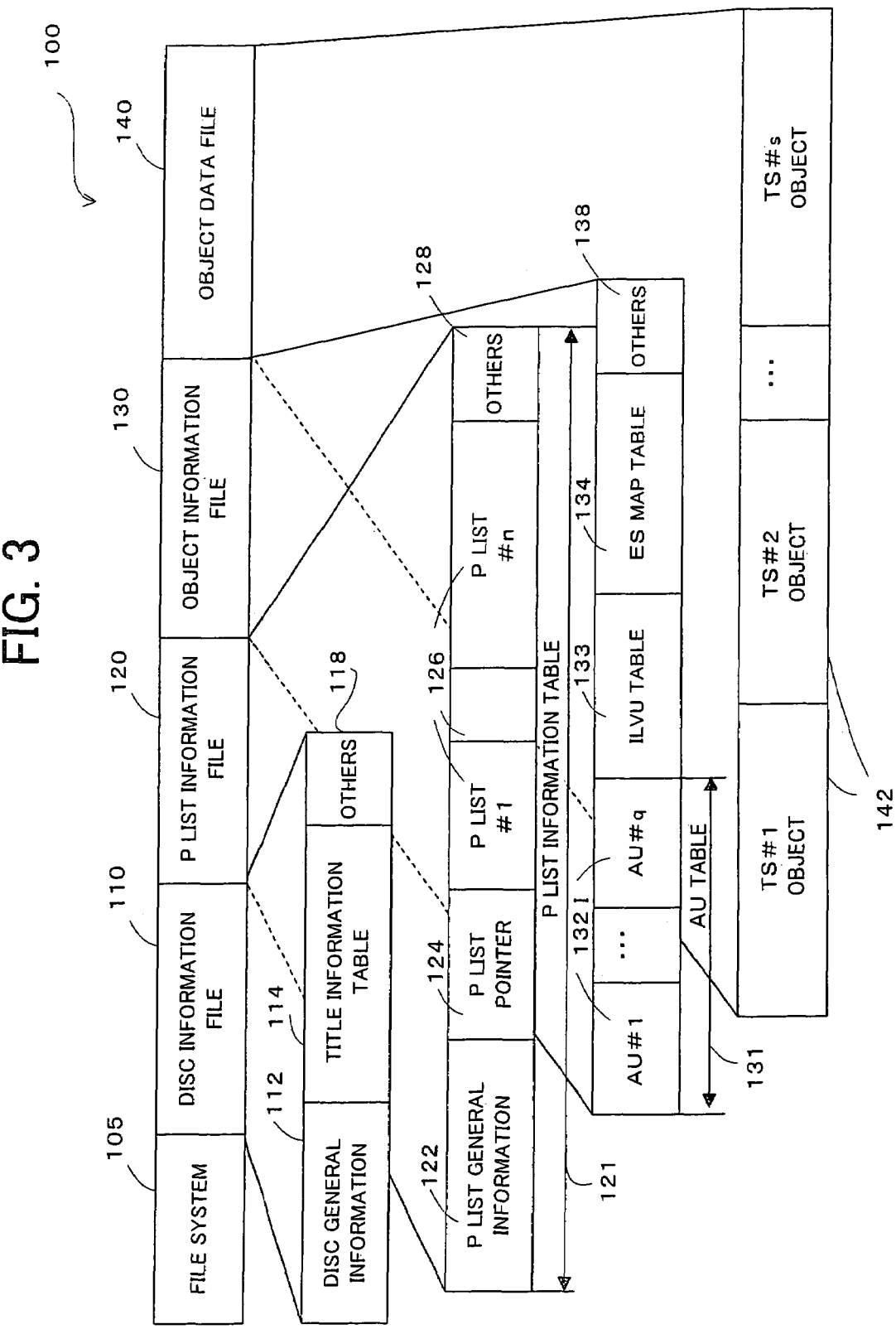
FIG. 3 is a diagram schematically illustrating a data structure recorded onto the optical disc in the embodiment.
Figure 4:
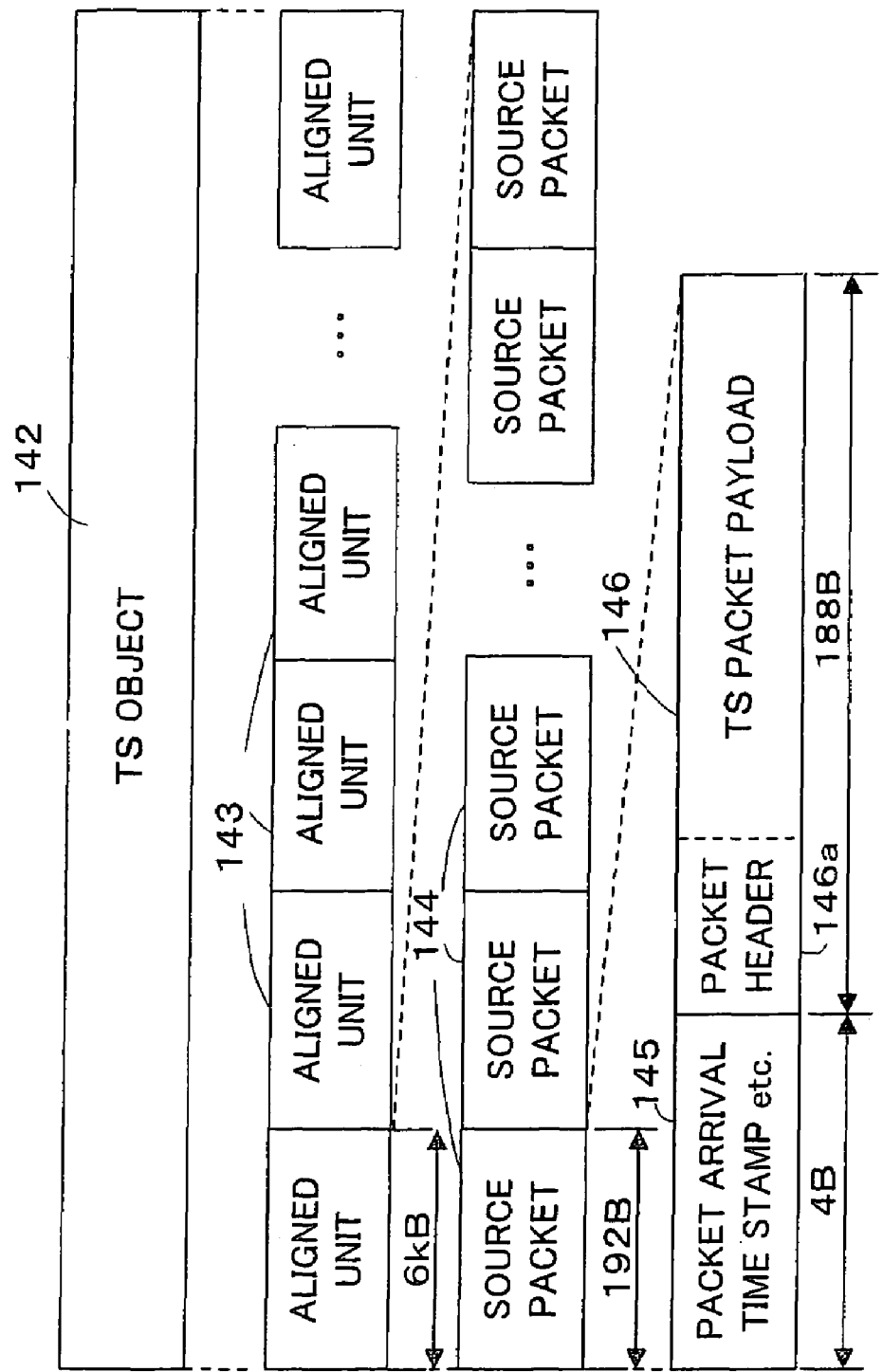
FIG. 4 is a schematic diagram showing a detail of a data structure in each object shown in FIG. 3.

Next, with reference to FIG. 3 and FIG. 4, a structure of data to be recorded onto the optical disc 100 is discussed. FIG. 3 schematically illustrates the data structure to be recorded onto the optical disc 100. FIG. 4 schematically illustrates in detail the data structure in each object shown in FIG. 3.

In the following explanation, the "title" means a reproduction unit, on the basis of which a plurality of "playlists" is executed continuously or sequentially, and which is a logically large grouped unit, such as one movie or one TV program. The "playlist" is information for storing the information required to reproduce the "object" and consists of a plurality of "items" each storing the information about a reproduction range of the object for accessing the object. More, specifically, "in-point information" for indicating a start address of an object and "out-point information" for indicating an end address of the object are described in each item. Incidentally, each of "in-point information" and "out-point information" may indicate addresses directly or indirectly, in the latter case, via time or a time point on the reproduction time axis. The "object" is the entity information of content constructing the aforementioned MPEG2 transport stream.

In FIG. 3, the optical disc 100 is provided with four files as a logical structure: a disc information file 110; a playlist (P list) information file 120; an object information file 130; and an object data file 140. The optical disc 100 is further provided with a file system 105 for managing these files. Incidentally, although FIG. 3 does not show directly the physical data arrangement on the optical disc 100, it is possible to perform the recording in such a manner that the arrangement shown in FIG. 3 corresponds to another arrangement shown in FIG. 1. That is, it is possible to record the file system 105 or the like in the data record area 106 following the lead-in area 104 and further record the object data file 140 or the like in the data record area 106. The file structure shown in FIG. 3 can be constructed, even without the lead-in area 104 or the lead-out area 108 shown in FIG. 1.

The disc information file 110 is a file for storing general information about the entire optical disc 100, and stores the disc general information 112, the title information table 114 and other information 118. The disc general information 112 may store the total quantities of titles or the like in the optical disc 100. The title information table 114 stores, as the logical information, each title type (e.g. sequential reproduction type, branch type and so on), or the playlist (P list) number constructing each title, for each title.

The playlist information file 120 stores the playlist (P list) information table 121 indicating the logical structure of each playlist. This playlist (P list) information table 121 is divided into the playlist (P list) general information 122, the playlist (P list) pointer 124, a plurality of playlist (P list) 126 (P list #1-#n), and other information 128. In this playlist information table 121, the logical information of each playlist 126 is stored in the order of the playlist number. In other words, the order for storing the each playlist 126 is the playlist numbers. Furthermore, in the aforementioned title information table 114, the same playlist 126 can be referred from a plurality of titles. That is, the playlist #p in the playlist information table 121 may be pointed by the title information table 114, even in the case that title #n and title #m use the same playlist #p.

The object information file 130 stores the storage position (i.e. the logical address of the reproduction object) in the object data file 140 for each item constructed in each playlist 126, and/or various attribute information relating to the reproduction of the item. Particularly in this embodiment, the object information file 130 stores the AU table 131 including a plurality of AU (Associate Unit) information 132I (AU#1-AU#n) as mentioned below, the ES (Elementary Stream) map table 134 and other information 135.

Particularly in this embodiment, the object file 130 stores an ILVU (interleaved unit) table, as an example of the "unit address information" according to the present invention.

The object data file 140 stores a plurality of TS objects 142 for each transport stream (TS#1 object-TS#n object), i.e. entity data of content to be actually reproduced.

Incidentally, four kinds of file discussed with reference to FIG. 3 can be further divided into a plurality of files respectively to be stored. All these files may be managed by the file system 105. For example, the object data file 140 can be divided into a plurality of files such as object data file #1, object data file #2 and so on.

As shown in FIG. 4, the TS object 142 shown in FIG. 3, as a logically reproducible unit, may be divided into a plurality of aligned units 143 each having 6 kB of data amount. The head of the aligned units 143 is aligned with the head of the TS object 142. Each aligned unit 143 is further divided into a plurality of source packets 144 each having 192B of data amount. The source packet 144 is a physically reproducible unit, on the basis of which (i.e. packet by packet) at least the video data, the audio data and the sub-picture data from among the data on the optical disc 100 are multiplexed, and other information may be multiplexed in the same manner. Each source packet 144 includes the control information 145 having 4B of data amount to control the reproduction, such as the packet arrival time stamp or the like indicating the reproduction start time point of the TS (Transport Stream) packet on the reproduction time scale, and includes the TS packet 146 having 188B of data amount. The TS packet 146 (also referred to as "TS packet payload") has a packet header 146a at a head portion of a TS packet payload 146b. The video data may be packetized as the "video packet", the audio data may be packetized as the "audio packet", or the sub-picture data may be packetized as the "sub-picture packet", otherwise other data may be packetized.

Figure 5:
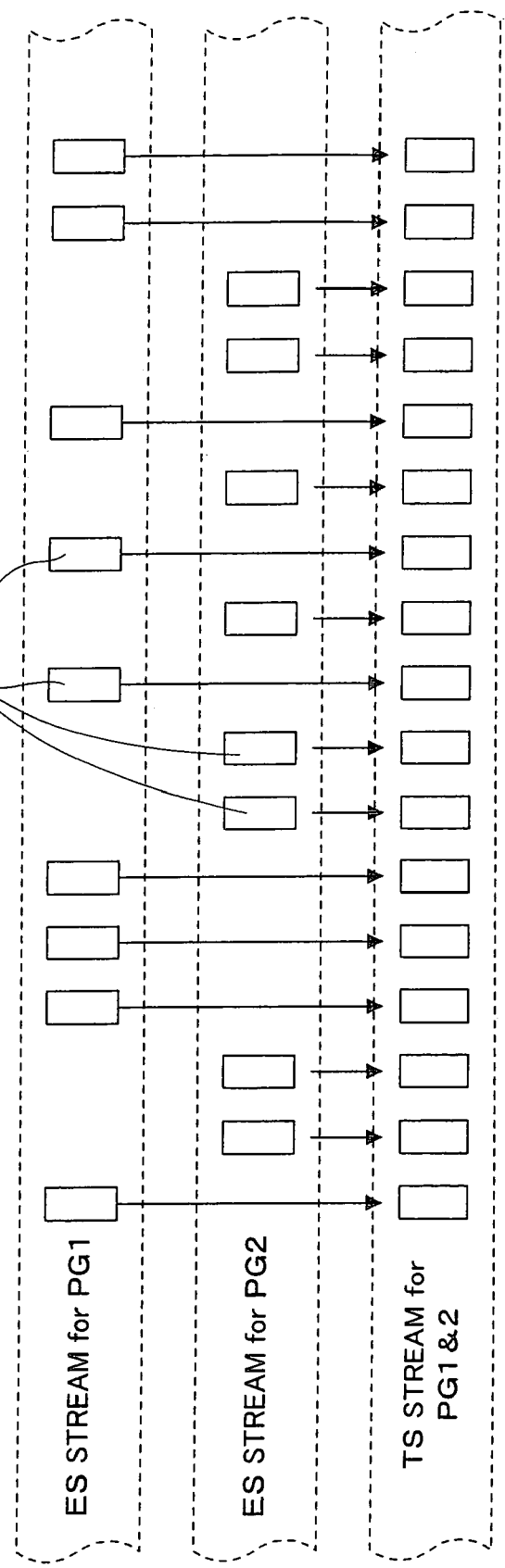
FIG. 5 is a diagram conceptually showing a situation that an elementary stream for a program #1, shown in the upper column, and en elementary stream for a program #2, shown in the middle column, are multiplexed to form a transport stream for these two programs, on the basis of a time scale in a horizontal direction.
Figure 6:
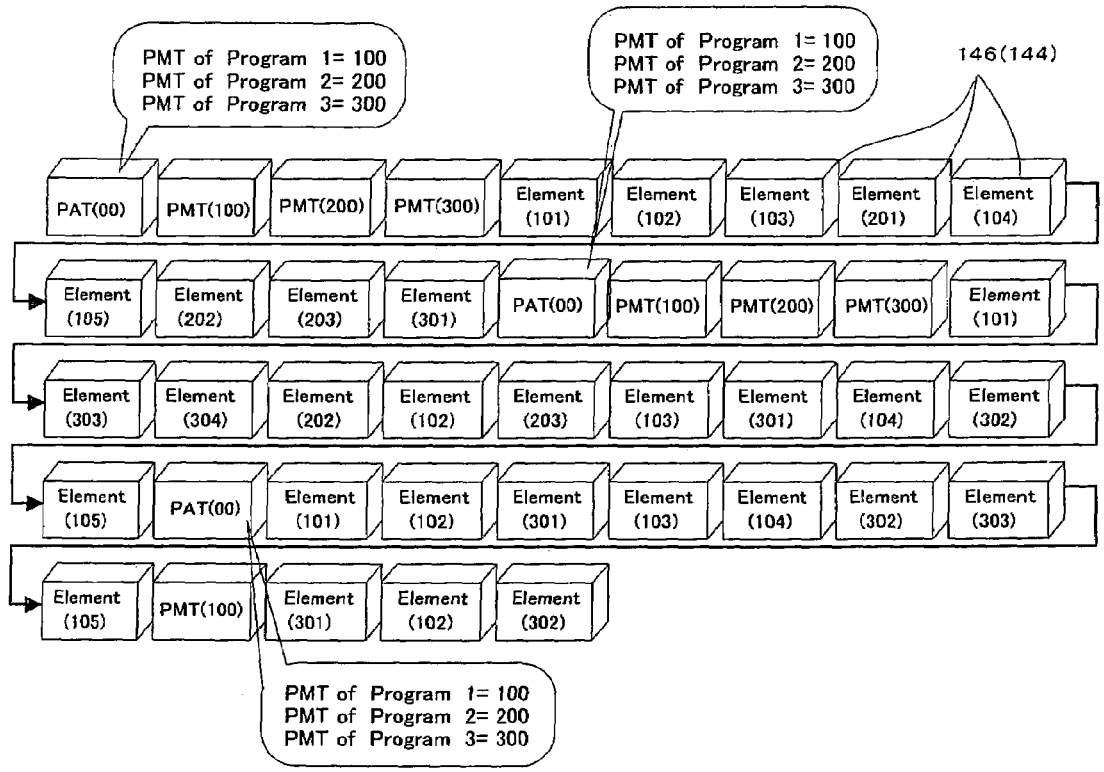
FIG. 6 is a conceptual view conceptually illustrating an image of TS packets multiplexed in one transport stream in the embodiment, as a packet arrangement based on the time scale.

Next, with reference to FIG. 5 and FIG. 6, an explanation is made on the multi-recording of the video data, the audio data, the sub-picture data and the like in the transport stream format as shown in FIG. 2(b), onto the optical disc 100, by the TS packet 146 shown in FIG. 4. FIG. 5 conceptually illustrates that the elementary stream (ES) for program #1 (PG1) in the upper stage and the elementary stream (ES) for program #2 (PG2) in the middle stage are multiplexed, and the transport stream (TS) for these two programs (PG1&2) is formed, under an assumption that a horizontal axis is defined as a time axis. FIG. 6 conceptually illustrates an image of the TS packets multiplexed in one transport stream (TS), as a packet array along the time (sic).

As shown in FIG. 5, the elementary stream for program #1 (in the upper stage) may be formed by discretely arranging TS packets 146 obtained by packetizing the video data for program #1, along the time axis. The elementary stream for program #2 (in the middle stage) may be formed by discretely arranging TS packets obtained by packetizing the video data for program #2, along the time axis. Then, these TS packets 146 are multiplexed so that the transport stream (in the lower stage) for two programs is made. Incidentally, omitted for convenience of explanation in FIG. 5, the elementary stream made of TS packets obtained by packetizing the audio data, and/or the sub-picture stream made of TS packets obtained by packetizing the sub-picture data may be multiplexed similarly as the elementary stream for program #1, in practice, as shown in FIG. 2(b). In addition to this, the elementary stream made of TS packets obtained by packetizing the audio data, and the sub-picture stream made of TS packets obtained by packetizing the sub-picture data may be multiplexed similarly as the elementary stream for program #2.

As shown in FIG. 6, in this embodiment, a plurality of TS packets 146 multiplexed as such forms one TS stream. Then, a plurality of TS packets 146 in the multiplexed form is multi-recorded onto the optical disc 100, with the information such as the packet arrival time stamp 145 and the like being added. Incidentally, in FIG. 6, the TS packet 146 being made of the data forming program #i (i=1, 2, 3) is indicated by "element (i0j)", wherein, j (j=1, 2, ... ) is a sequential number for each stream composing the program. This (i0j) is defined as a packet ID which is an identification number of the TS packet 146 for each elementary stream. This packet ID is fixed at an inherent value for a plurality of TS packets 146 to be multiplexed at the same time point, so that the plurality of TS packets 146 is distinguished from each other even if multiplexed at the same time point.

Furthermore, in FIG. 6, the PAT (Program Association Table) and the PMT (Program Map Table) are also packetized by the TS packet 146 unit and multiplexed. The PAT among them stores a table indicating a plurality of PMT packet ID's. Particularly, the PAT is defined by MPEG2 standard so that (000) is given as a predetermined packet ID, as shown in FIG. 6. That is, from among a plurality of packets multiplexed at the same time point, the TS packet 146 obtained by packetizing the PAT is detected, as the TS packet 146 whose packet ID is (000). The PMT stores a table indicating the packet ID for each elementary stream forming each program in one or more programs. Any packet ID can be given to the PMT, their packet IDs are indicated by the PAT detectable with the packet ID (000) as mentioned above. Therefore, among a plurality of packets multiplexed at the same time point, the TS packets 146 obtained by packetizing the PMT (i.e. TS packets 146 to which packet IDs (100), (200) and (300) are given in FIG. 12) are detected on the basis of the PAT.

In the case that the transport stream as shown in FIG. 6 is transferred digitally, the tuner refers to the PAT and the PMT constructed as such and thereby extracts the multiplexed packets corresponding to the desired elementary stream and decodes the extracted packets.

In this embodiment, these PAT and PMT are included as the TS packets 146 to be stored in the TS object 142 shown in FIG. 4. That is, when the transport stream as shown in FIG. 6 is transferred, the transferred stream can be directly recorded onto the optical disc 100, which is a great advantage.

Furthermore in this embodiment, these PAT and PMT recorded as such are not referred to when the optical disc 100 is reproduced. Instead, referring to the AU table 131 and the ES map table 134, shown in FIG. 3 and mentioned in detail later, makes it possible to perform the reproduction effectively and apply to the complicated multi-vision reproduction or the like. For this, in this embodiment, a relationship between packets and the elementary stream obtained by referring to the PAT and the PMT on decoding or recording for example is stored in the object information file 130, in a form of AU table 131 and ES map table 134, without packetizing or multiplexing.

Figure 7:
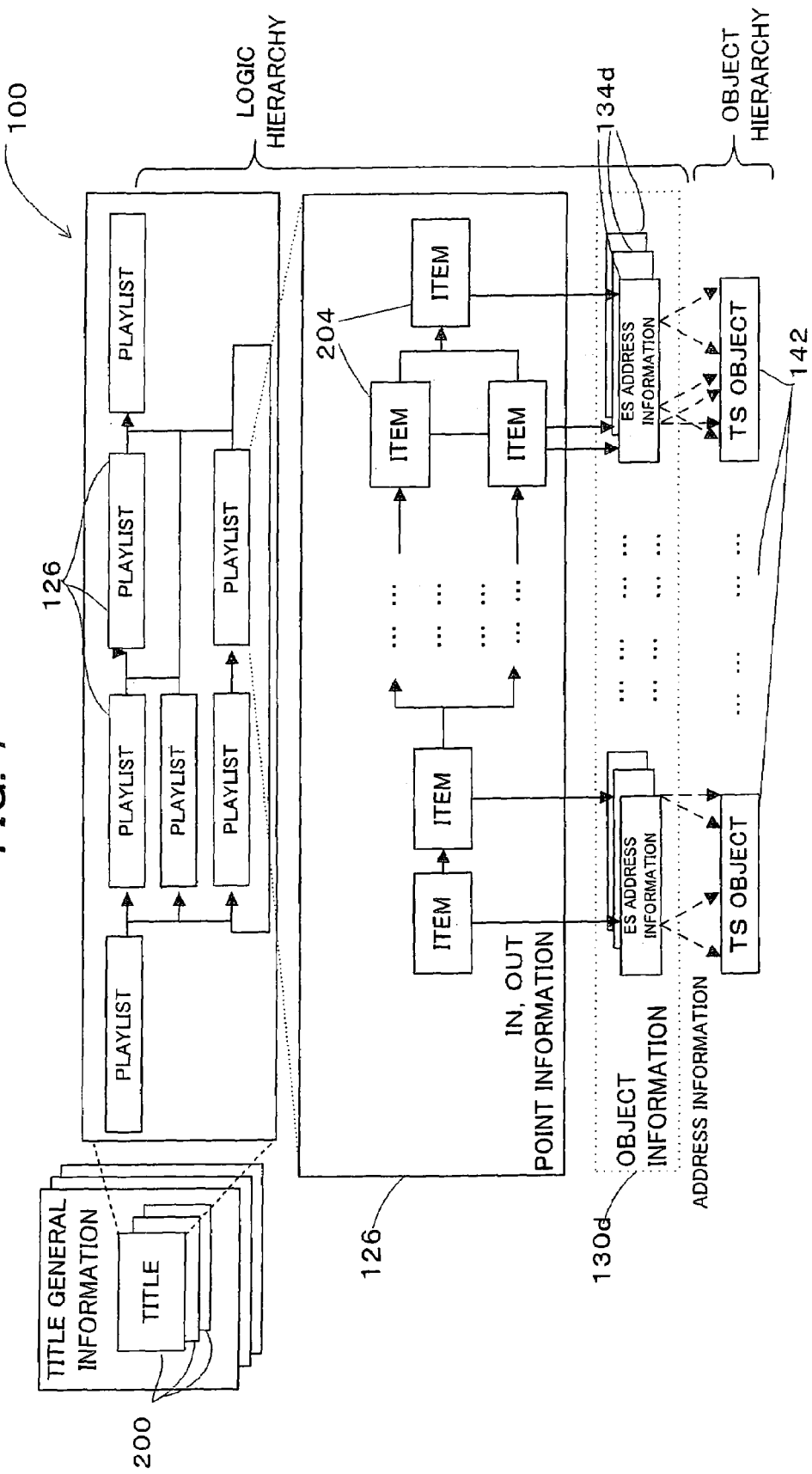
FIG. 7 is a schematic diagram showing a logic structure of data on an optical disc in the embodiment, focusing on development from a logic hierarchy to an object hierarchy or an entity hierarchy.

Next, with reference to FIG. 7, the logical structure of data on the optical disc 100 is discussed. FIG. 7 schematically illustrates the logical structure of data on the optical disc 100, focusing on the development from the logic hierarchy to the object hierarchy or the entity hierarchy.

In FIG. 7, one or more titles 200 that are a logical large unit such as one movie or one TV program are recorded onto the optical disc 100. Each title 200 is logically made of one or more playlists 126. In each title 200, the plurality of playlists 126 may have a sequential structure or may have a branch structure.

Incidentally, in the case of a simple logical structure, one title 200 consists of one playlist 126. On the other hand, it is possible to refer to one playlist 126 by a plurality of titles 200.

Each playlist 126 is logically made of a plurality of items (play items) 204. In each playlist 126, a plurality of items 204 may have the sequential structure or may have the branch structure. On the other hand, it is possible to refer to one item 204 by a plurality of playlists 126. The aforementioned in-point information and out-point information recorded on/in the item 204 logically defines the reproduction range of the TS object 142. Finally, the reproduction range of the TS object 142 is physically defined, via the file system, by referring to the object information 130d about the reproduction range logically defined. Here, the object information 130d includes various information to reproduce the TS object 142, such as the attribute information of the TS object 142, the ES address information 134d required for the data search in the TS object 142 and the like (incidentally, the ES map table 134 shown in FIG. 3 includes a plurality of ES address information 134d).

Then, when the information record and reproduce apparatus reproduces the TS object 142 as mentioned below, a physical address to be reproduced in the TS object 142 is obtained from the item 204 and the object information 130d so that a desired elementary stream is reproduced.

Thus, in this embodiment, the in-point information and out-point information recorded on/in the item 204, as well as the ES address information 134d recorded in the ES map table 134 (see FIG. 3) of the object information 130d make it possible to associate the object hierarchy with the logic hierarchy in the reproduction sequence so that the elementary stream is reproduced.

Particularly in this embodiment, the video packet, the audio packet and the sub-picture packet, which are multiplexed as the TS packet 146 (or as the source packet 144), are united into an ILVU (interleaved unit) which is made of a plurality of packets and usually variable, so that they are interleaved by a unit of ILVU and then recorded onto the optical disc 100. Furthermore, since an address of each ILVU is described in an ILVU table 133 stored in the object information file 130 shown in FIG. 3, it can be identified by referring to the ILVU table 133 on the reproduction. Therefore, it is possible to perform the angle reproduction relatively easily and seamlessly, as mentioned below. In this case, there is no need for a "navigation packet", as a kind of the TS packet 146, for storing the address information of each ILVU. Furthermore, any type of the head packet or any sequence of packets may be used in each ILVU.

Incidentally, in FIG. 5 and FIG. 6, the source packet 144 is obtained by adding a packet arrival time stamp or the like 145 to the TS packet 146 (see FIG. 4). Therefore, the source packet 144 and the TS packet 146 are not required to be distinguished in view of an sequence or arrangement of packets to be multiplexed, or the interleave and so on.

In such a data construction, at least one of the titles 200 shown in FIG. 7 has a reproduction period (hereinafter referred to as an "angle block", as appropriate) during which images or scenes from a plurality of viewpoints, i.e. the plurality of video information relating to the plurality of angles, are reproduced, in addition to a reproduction period (hereinafter referred to as a "usual block", as appropriate) during which the video information relating to an image or scene from a single viewpoints (i.e. only a single angle) is reproduced. This embodiment is arranged to achieve the "angle reproduction (multi-angle reproduction)" in which the user switches seamlessly the plurality of angles in this angle block. The interleaved structure, the composition of the ILVU table 133 and others allowing such a seamless angle switching will be mentioned below in detail.

(Specific example of Data Structure relating to Angle Block)

Next, with reference to FIG. 8 to FIG. 12, a data structure of the TS object 142 relating to the angle block for the angle reproduction in this embodiment will be explained in accordance with the specific example.

Figures 8, 9:
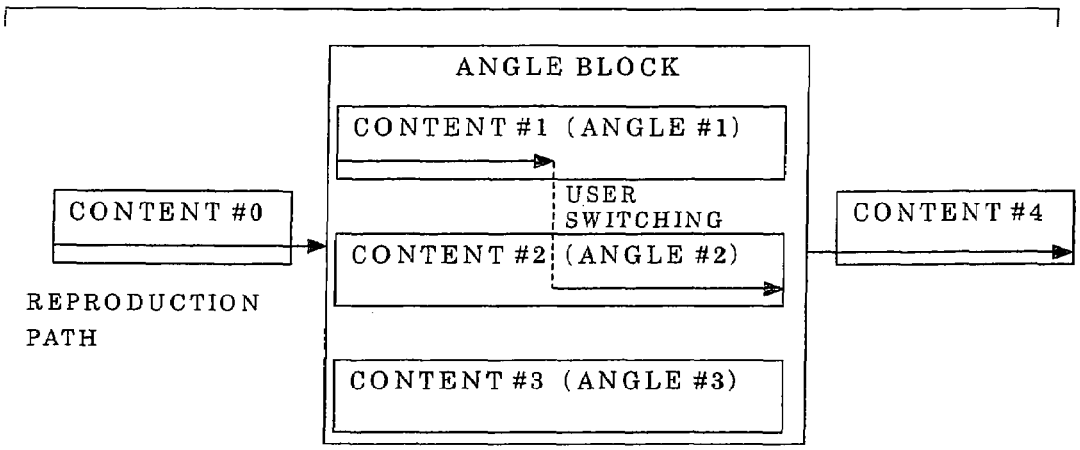
FIG. 8 is a conceptual diagram showing the data structure of the TS object including the angle block and the usual block according to the embodiment, along with the time axis.
FIG. 9 is a conceptual diagram showing a specific example of the data structure of the TS object according to the embodiment.
Figure 10:
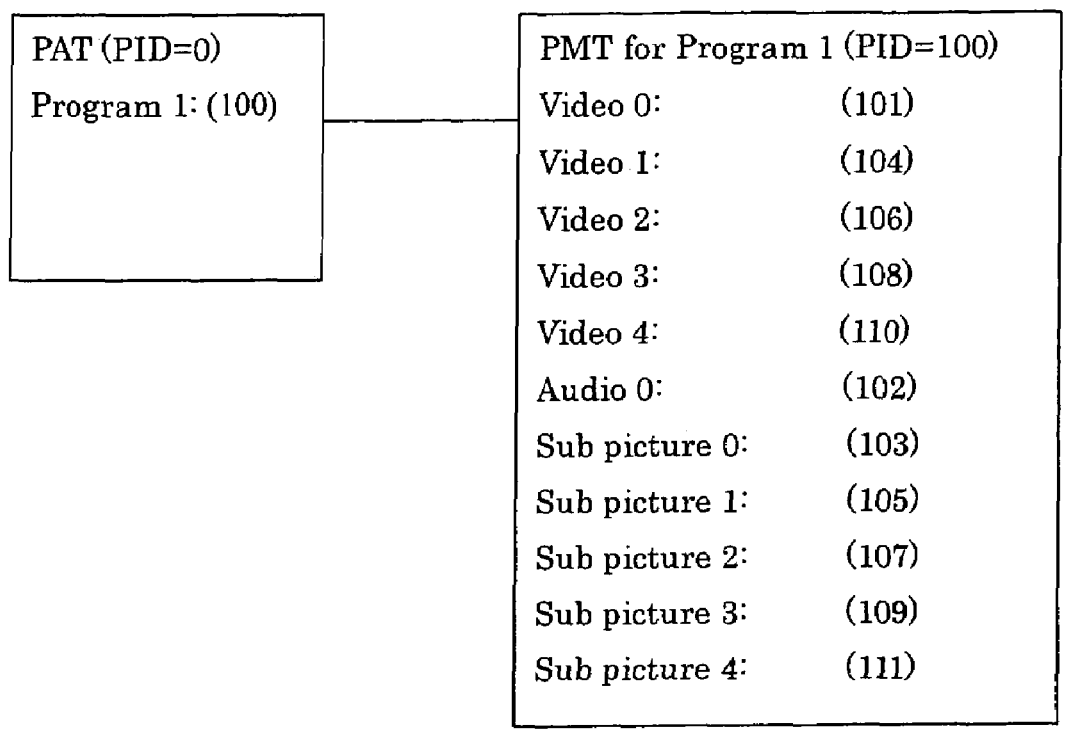
FIG. 10 is a schematic diagram showing the data structure in the case that the TS object is made of one program in the specific example.
Figure 11:
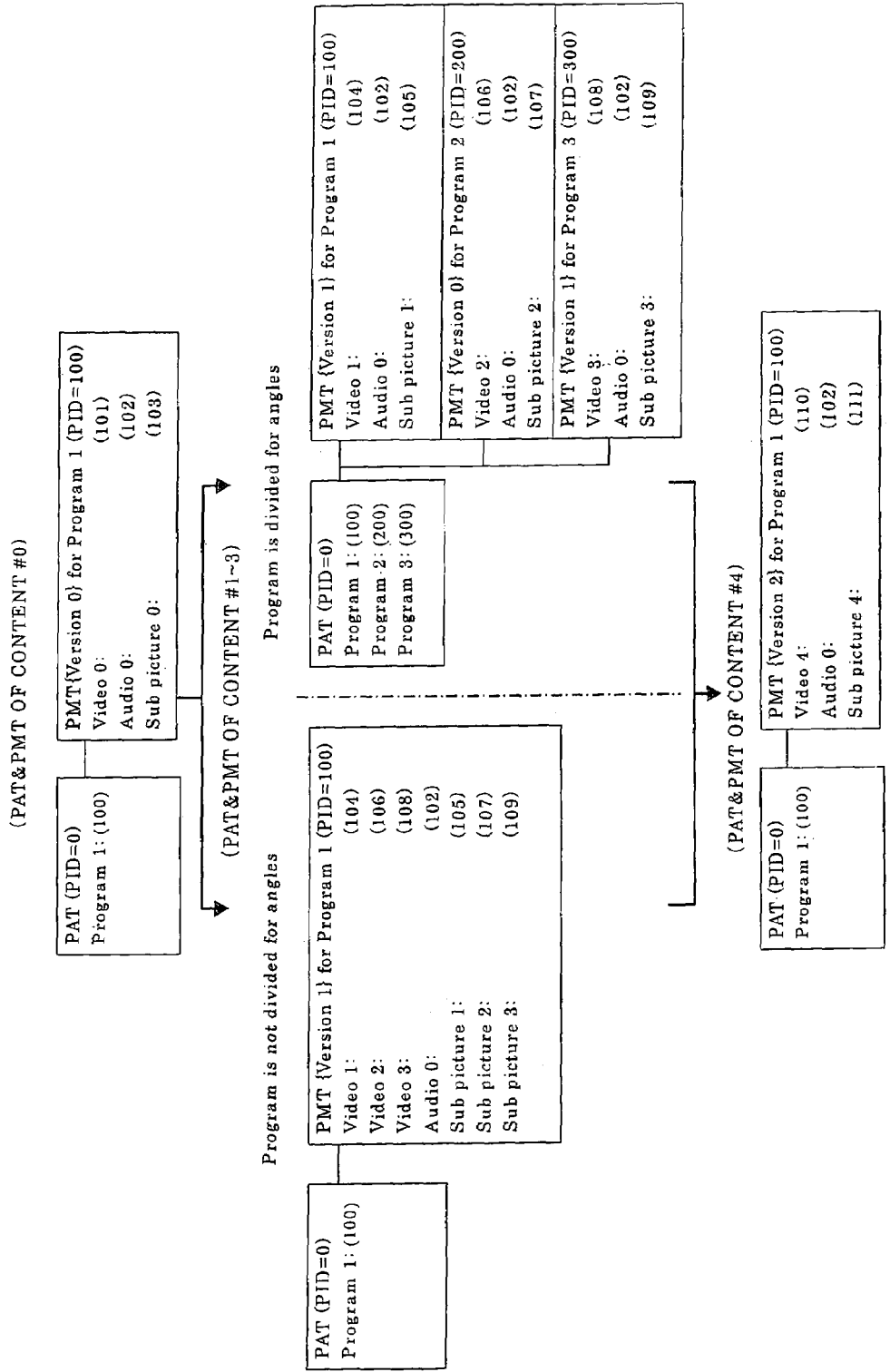
FIG. 11 is a schematic diagram showing the data structure in the case that the TS object is made of three programs in the specific example.

This specific example is a specific example of the data structure relating to the angle block constructed on the optical disc 100, in the case that the TS object 142 consists of five contents #0-#4, the usual block consists of the contents #0 and #4, and the angle block consists of the contents #1-#3 sandwiched by the content #0 and the content #4. Herein, FIG. 8 illustrates conceptually the data structure of the TS object including the angle block and the usual block, along a time axis. FIG. 9 illustrates conceptually the data structure of the TS object. FIG. 10 illustrates schematically the data structure in the case that the TS object consists of one program in this specific example. FIG. 11 illustrates schematically the data structure in the case that the TS object consists of three programs. Furthermore, FIG. 12 schematically the data structure of the TS object finally constructed on the optical disc 100 in this specific example.

As shown in FIG. 8, the TS object 142 is authorized so as to be stored as a ROM content for example, and has three angles selectable by the user during the reproduction, with a common audio elementary stream and a common sub-picture elementary stream for these three angles.

Since the content #0 is positioned within the usual block, it is impossible to perform the angle reproduction during the reproduction of the content #. The content # is reproduced usually and simply as shown by an arrow in the figure.

Within the angle block, the contents #1, #2 or #3 are subjected to the angle reproduction. This reproduction may be started from the head following to the completion of the reproduction of the content #0, or may be started from the head or from the half way point depending on a time search, a fast forward, a fast rewind, or a branch condition and so on. In any case, within the angle block, it is possible for the user to perform the seamless angle switching, such as switching from the content #1 to the content #2 at any interleaved unit start time point as shown by an arrow in the figure.

Since the content #4 is positioned within the usual block, it is impossible to perform the angle reproduction during the reproduction of the content #4. The content #4 is reproduced simply and usually as shown by an arrow in the figure.

As shown in FIG. 9, each of five contents #0 to #4 composing the TS object is made of a video stream (Video 0-4), an audio stream (Audio 0), and a sub-picture stream (sub-picture 0-4). A packet ID (ES_PID) "101", "102" etc. for each elementary stream as mentioned above is assigned to each stream.

The video stream of each content has a different packet ID from each other (i.e. "101", "102", . . . ). Especially in the angle block, the different video stream corresponding to the different angle is reproduced, in response to the angle switching. That is, the angle reproduction is possible. Incidentally, it is also possible to assign the same packet ID (ES_PID) to the video streams of the contents #0 and #4 to use the same video stream for the contents #0 and #4. Furthermore, the video stream same as that of the contents #0 and #4 may be used for either one of the contents #1 to #3 in the angle block.

The audio stream of each content has a common packet ID (i.e. "102"). With regard to the audio, this common stream is reproduced, regardless of the existence of the angle block. Especially in the angle block, the audio stream is not switched, even if the angle is switched. Namely, even if the angle is switched, the sound is not switched. However, it is possible to use a plurality of audio streams and switch the audio stream corresponding to switching the sound (i.e. the different sound may be reproduced), in the angle block.

The sub-picture stream of each content has a different packet ID for the contents #0-#4, so that the different elementary stream is reproduced. However, it is possible to use a common packet ID for the contents #0-#4 in the angle block.

With regard to the TS object 142 shown in FIGS. 8 and 9, two types of MPEG program, as roughly classified, may be applicable.

That is, firstly, as shown in FIG. 10, there is a case that the TS object consists of a single program. In this case, on the transport stream as shown in FIG. 6, one PMT is identified by one PAT, and the packet IDs (ES_PIDs) for all the elementary streams relating to the contents #1-#3 are identified by this identified one PMT.

Alternatively, as shown in FIG. 11, there is a case that the TS object consists of three programs. Namely, three programs are divided into the usual block relating to the content #0, the angle blocks relating to the contents #1-#3, and the usual block relating to the content #4.

Furthermore, in the FIG. 11, there are two cases: one is a case that the program is not divided for each angle block; and the other is a case that the program is divided for each angle block.

In the case that the program is not divided for each angle, as shown at the left side of the mid row in FIG. 11, one PMT (ES_PID=100) is identified by the one PAT (ES_PID=000), on the transport stream in the angle block, and the packet IDs (ES_PID) for all the elementary streams relating to the contents #1-#3 are identified by this identified one PMT.

On the other hand, in the case that the program is divided for each angle, as shown at the right side of the mid row in FIG. 11, a plurality of PMT (ES_PID=100, 200 and 300) are identified by one PAT (ES_PID=000), on the transport stream in the angle block, and the packet IDs (ES_PID) for all the elementary stream relating to the contents #0-#4 are identified by this identified PMTs.

As mentioned above, the data structure of the optical disc 100 explained with reference to FIGS. 8 to 11 are summarized as shown in FIG. 12.

That is, in FIG. 12, the optical disc 100 has a data structure in which a title #1 is constructed. The title #1 is made of a playlist #1 (P list #1) designating three items (Items #1-#3). Furthermore, one TS #1 object including the angle block is associated with the playlist #1, via three items. Especially, the title #1 which may relate to one digitally broadcasted and recorded "program" is logically constructed to be reproduced in the angle reproduction in the angle block.

Furthermore, with regard to the TS object in FIG. 12, a plurality of elementary stream composing content, such as a video stream, an audio stream and a sub-picture stream for one movie, is classified by PU (presentation unit). Furthermore, a plurality of PUs composing sets switchable to each other by an angle switching is classified by AU (association unit). That is, the angle switching can be relatively readily performed by identifying an elementary stream from among elementary streams belonging to the different PUs in the same AU. Incidentally, information indicating which elementary stream belongs to which PU specifically, and which PU belongs to which AU is written within AU information 1321 (see FIG. 3) in an AU table 131. The detail structure of the AU table will be explained later.

(Specific Example of Data Structure Relating to each Information File)

Next, with reference to FIGS. 13 to 18, various information files constructed on the optical disc 100 in this embodiment, i.e. (1) a disc information file 110, (2) a playlist information file 120 and (3) an object information file 130 already explained with reference to FIG. 3 are explained with regard to their data structures, accompanying each specific example.

(1) Disc Information File

Firstly, with reference to FIGS. 13 and 14, the disc information file 110 is explained in detail with a specific example. FIG. 13 schematically illustrates a specific example of the data structure of the disc information file 110. FIG. 14 schematically illustrates a specific example of the data structure of a tile information table 114 included therein.

In this specific example as shown in FIG. 13, the disc information file 110 stores therein disc general information 112, the title information table 114 and other information 118.

The disc general information 112 is comprehensive disc information, such as disc volume information indicating serial numbers for a series of a plurality of optical discs 100, or such as total title quantity information and so on.

The title information table 114 stores therein all playlists consisting of each title, and other information such as chapter information within a title as information for each title, and includes title pointer information, title #1 information, title #2 information, etc. Here the "title pointer information" is storage address information of the title #n information, i.e. storage address information indicating a storage position of the title #n information in the title information table 114, the relationship between them shown by an arrow in FIG. 13, and written by a relative logic address. The relative logic addresses corresponding to a quantity of titles in the optical disc 100 is listed in the order of titles. Incidentally, data volume of each storage address information may be a fixed byte or may be a variable byte.

In this embodiment, especially shown in FIG. 14, angle information relating to angles such as a "max angle quantity" which indicating the quantity of the angles switchable during the angle reproduction of the title #n (#1 in this case) is written in the title pointer, in addition to the storage address information. The max angle number may be set as "1" in the case of the usual reproduction other than the angle reproduction, for identifying the usual reproduction. The max angle number may be fixed in the same title, or may be variable in the same title (i.e. the switchable max angle number is different for each angle block).

Furthermore, other information 118 may be information about each title, such as title classification in sequential or branch, or such as comprehensive playlist and so on.

(2) Playlist Information File

Next, with reference to FIG. 15, the playlist information file 120 is explained in detail, with a specific example. Here FIG. 15 schematically illustrates a specific example of the data structure of the playlist information table 121 constructed within the playlist information file 120.

As shown in FIG. 15, in this specific example, the playlist information file 120 stores therein, for each field, playlist general information 122, a playlist pointer table 124, a playlist #1 information table 126, as a playlist information table 121 (see FIG. 3).

Each field may have a structure to add a required quantity of tables. For example, each field may have a structure in which the existence of four playlists increases a quantity of corresponding fields to four. The same discussion is applicable to the item information table.

Size of the playlist table and others, such as total playlist quantity and so on are written in the playlist general information (P list general information) 122.

The playlist pointer table (P list pointer table) 124 stores therein addresses of positions at which individual playlists are written, as shown by an arrow in FIG. 15, as relative logic addresses in the playlist information table 126.

The playlist #1 information table (P list #1 information table) 126 stores therein general information about the playlist #1, an item information table of the playlist #1 (P list Item information Table) and other information.

The "item information table" is for storing therein item information corresponding to all items consisting of one program list. Here an AU number in the AU (Associate unit) table to be written in the "item #n information", wherein n=1, 2, 3, is an AU number storing therein information to identify each elementary stream (i.e. video stream, audio stream or sub-picture stream) in the TS object to be used for reproducing the item, or to identify an address of the TS object to be used for reproducing the item. Furthermore, the item information stores therein a PU number to be reproduced by default and belonged to this AU.

(3) Object Information File

Figure 16:
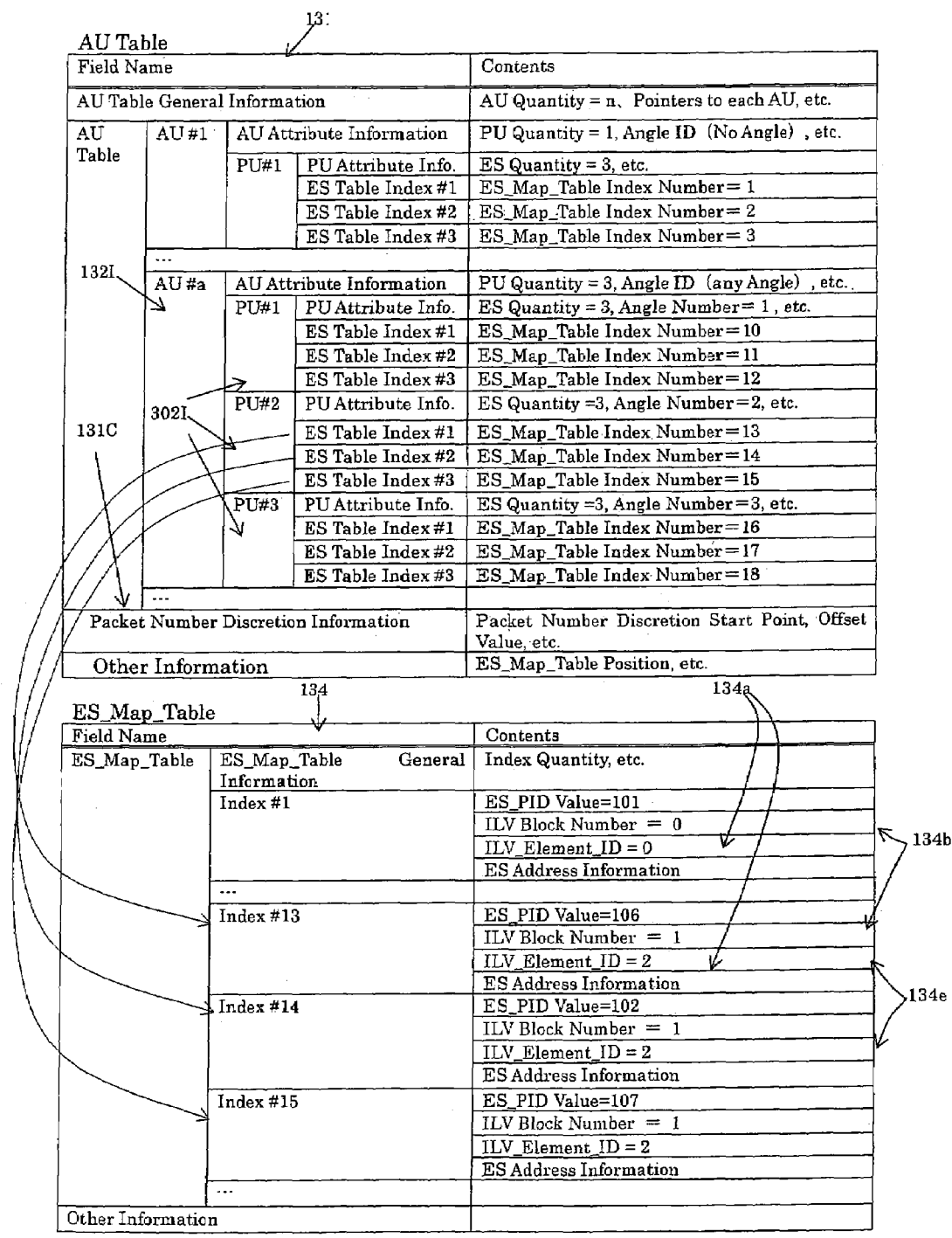
FIG. 16 is a schematic diagram showing one specific example of the data structures of an AU table constructed in an object information file and an ES map table related to the AU table in one specific example of the embodiment.

Next, with reference to FIG. 16, the object information file 130 is explained in detail, with a specific example. Here FIG. 16 schematically illustrates a specific example of the data structure of an AU (Associate Unit) table 131 (see FIG. 3) constructed within the object information file 130 and an ES map table 134 (see FIG. 3) associated with the AU table 131.

In this specific example as shown in FIG. 16, the object information file 130 stores therein an object information table. The object information table consists of an AU table 131 shown in the upper column in the figure, an ES map table 134 shown in the lower column in the figure and ILVU table (see FIG. 20) to adapt the interleaved structure.

In the upper column in FIG. 16, with regard to the AU table 131, each field may have a structure to add a required quantity of tables. For example, each field may have a structure in which the existence of four AU's increases a quantity of the corresponding fields.

The AU table 131 stores therein, in different fields, "AU table general information" in which a quantity of AU, each pointer to each AU and so on are written, "packet number discretion information" and "other information".

In the AU table 131, an index number of the corresponding ES map table 134 is written, as AU information 132I indicating an ES table index #1 (ES_table Index #1) in each PU #m corresponding to each AU #n. Here the "AU" is a unit corresponding to a program which may be reproduced in the angle reproduction as mentioned above. In this AU, one or more PU's as reproduction units are included. Furthermore, the "PU" is an assembly of elementary streams switchable to each other and included in each AU as mentioned above. An ES table index # corresponding to each PU is identified by the PU information 302I. For example, in the case that content which can be reproduced in the angle reproduction is constructed by an AU, a plurality of PU's are stored in the AU, and in each PU, pointers to a plurality of elementary stream packet ID's indicating packets consisting of content of each angle are stored. These pointers indicate index numbers in the ES map table 134, as mentioned below.

Especially in this embodiment, in the AU table 131, discretion information 131C indicating a discrete state of packet numbers, in a case that a packet defect arises in an editing process, is added to a serial numbers of packets in the TS object 142 mentioned above. Using discretion information makes it possible to identify an address of a packet to be accessed, by counting packet numbers (starting from a packet designated in the elementary stream), in view of the discrete state indicated by the discretion information, without assigning a new packet number even in the case that the packet defect arises. The discretion information may include information indicating a discretion start point or defected packet numbers, for example. Thus, the discretion information 131C is described as one information commonly for a plurality of AU's, which is very advantageous in view of saving the storage capacity.

Furthermore, in addition to the packet number, it is preferable in the interleaved block to assign a serial numbers of packets inherent to each interleaved block, as offset numbers from a head packet number set as "0". Thereby, even in the case that an editing process such as a deletion out of the interleaved block, the aforementioned discretion information does not need to be referred in the interleaved block. Because, in the interleaved block of the angle, an access to the optical disc 100 is made by using the address information stored in the ILVU table (see FIG. 20). However, in the case that the editing process such as the deletion in the interleaved block of the angle, individual reproduction time points of individual interleaved units 800 are required to be synchronized. For this, it is preferable to re-make content and re-number the serial numbers within a new interleaved block.

Especially in this embodiment, each AU information 132I includes AU attribute information indicating a total quantity of PU belonging to the AU, an angle identification to identify whether or not the AU is for the angle reproduction.

Furthermore, each PU information 302I includes PU attribute information indicating an elementary stream quantity. This PU attribute information includes angle number information indicating an angle number (e.g. 1, 2, 3, ...) corresponding to the PU, if the PU belongs to the AU for the angle reproduction. Furthermore, in this PU, pointers to the ES_PIDs consisting of content of each angle are stored.

In the lower column of FIG. 16, in the ES map table 134, ES map table general information, a plurality of index #m (m=1, 2, ...) and "other information" are stored for each field.

In the "ES map table general information", an ES map table size, a total index quantity and so on are described.

The "index #1" includes an elementary stream packet ID (ES_PID) of an elementary stream used for the reproduction and address information of the elementary stream.

Particularly in this embodiment, the ES map table 134 of FIG. 16 further stores "ES address information 134a" which is address information of each elementary stream, ILV block number 134b which indicates each angle block number in the TS object 142, and ILV element ID 134e.

Here, the "ILV block number", which is an example of the "block number information" according to the present invention, represents a serial number or consecutive number assigned in a predetermined data range such as an optical disc, each title, each TS object and others, in a form of the identification number of each ILV block which is an interleaved reproduction range. Incidentally, in FIG. 16, the ILV block number 134b which is set to "#0" may indicate that the corresponding elementary stream is not interleaved (i.e. it is not an interleaved block), for example.

On the other hand, the "ILV element ID" 134e, which is an example of the "interleaved element identification information", is identification information to identify a plurality of interleaved unit arrangements corresponding to a plurality of angle video information as separate arrangements from each other. For example, if there are three angles, there are three ILV elements corresponding to them, in which these ILV element ID's are #1, #2 and #3. Incidentally, in FIG. 16, if the corresponding elementary stream is not interleaved, each value of the ILV element ID 134e can be neglected. In this case, it may be represented by "0".

In this embodiment, address information of each ILVU recorded in the ILVU table 133 is referred to as "ILVU address information", respectively. The ILVU address information is address information for indicating each head address of each ILVU, for each ILV group and for each ILV element in the ILV group. In the ILVU table 133, the ILVU address information including such ILV group numbers and ILV element ID's is generally referred to as "ILVU information", as appropriate.

Especially in this embodiment, as the ES address information 134a, the packet number (SPN) and the corresponding display start time point are described. In the case that the elementary stream is a video stream of MPEG2 as mentioned above, only an address of the head TS packet of the I picture is described as the ES address information 134a in the ES map table 134, for saving the data volume.

Owing to this construction, the elementary stream packet ID (ES_PID) of the actual elementary stream can be obtained from the index number of the ES map table 134 designated from the AU table 131. Furthermore, since the address information of the elementary stream corresponding to the elementary stream packet ID can be obtained at the same time, object data can be reproduced on the basis of these informations.

Incidentally, although not shown in FIG. 16, also the ES_PID which is not referred from the AU table 131 shown in the upper column may be described for each index of the map table 134 shown in the lower column. Thus, describing the not-referred ES_PID and thereby generating a more flexible ES map table 134 bring an advantage to eliminate a need to re-construct the ES map table in a case that content is re-edited, such as re-authoring.

(Interleaved Structure and ILVU Table)

Figure 17:
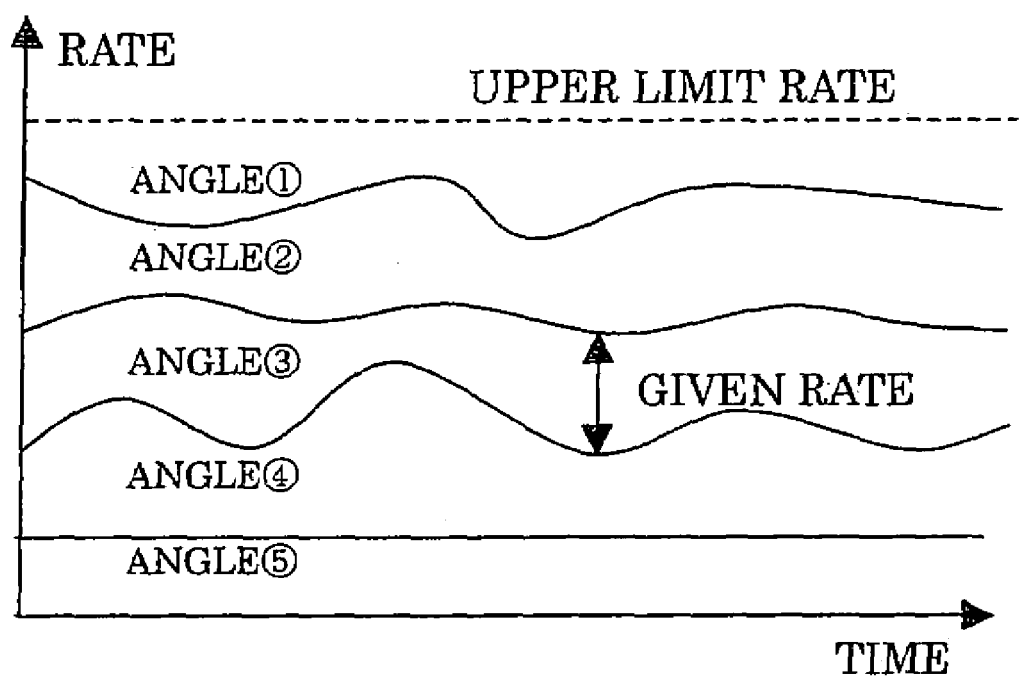
FIG. 17 is a characteristic diagram showing one example of the relationship between the each angle bit rate and the upper limit rate on the time axis, in the statistical multiplexing system used in the embodiment.
Figure 18A:
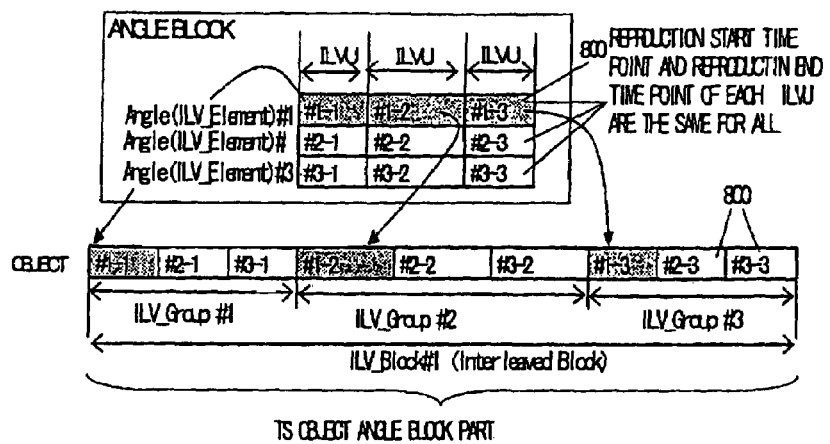
FIG. 18 is a conceptual view schematically showing a data structure of an interleaved block employed in an example (FIG. 18 (A)), and a conceptual view showing an exemplary situation in which a plurality of interleaved blocks exists in the object data (FIG. 18 (B)).
Figure 18B:
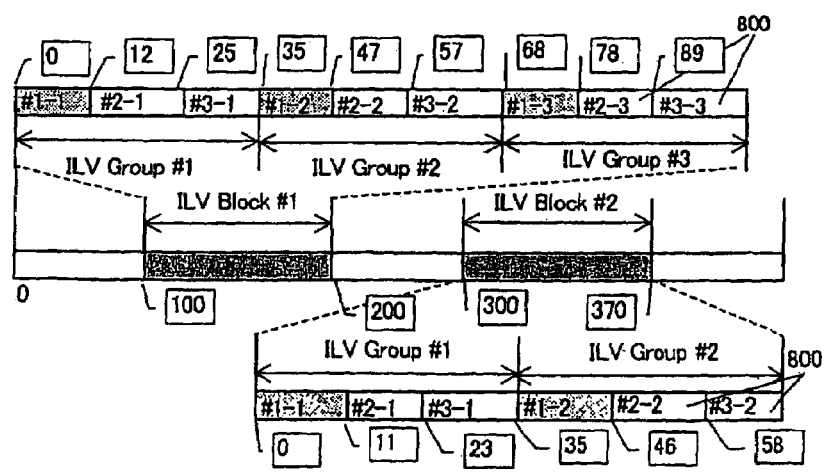
Figure 19:
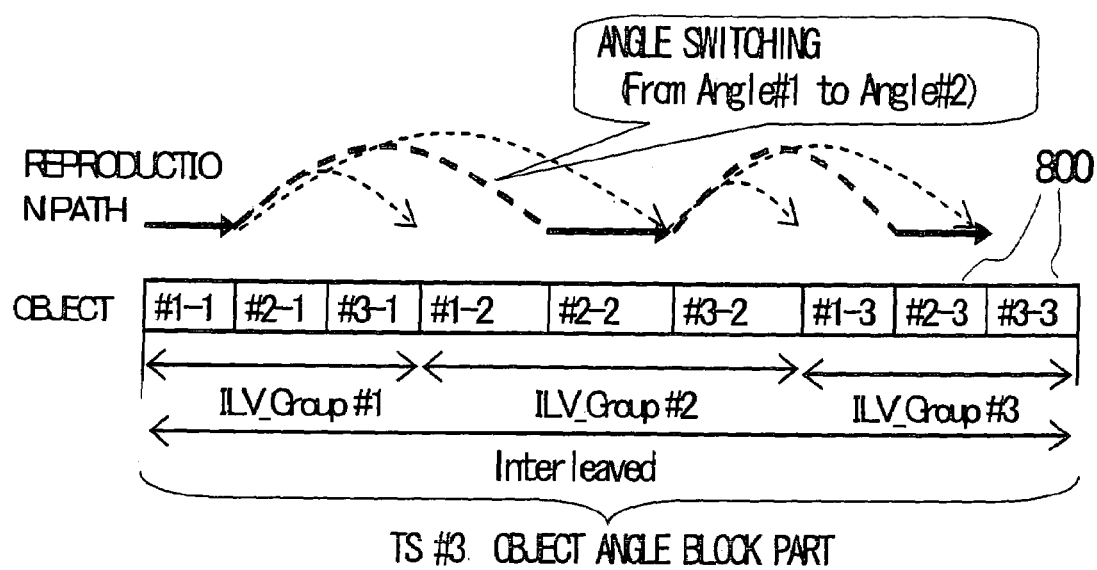
FIG. 19 is a conceptual view schematically showing an angle switching in an interleaved block in an embodiment.
Figure 20:
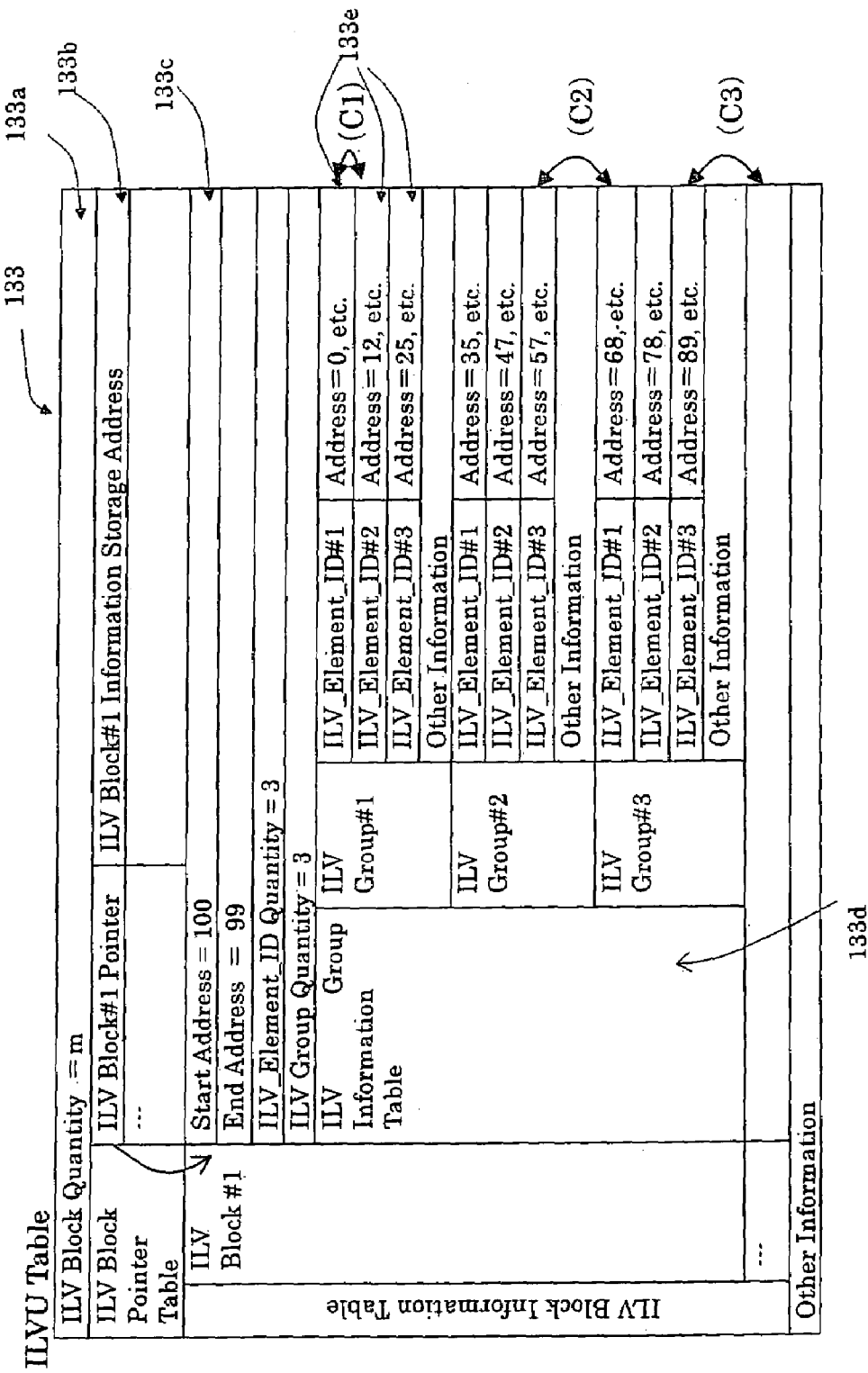
FIG. 20 is a conceptual diagram schematically showing a data structure of an ILVU table in an embodiment.

Next, an interleaved structure and a ILVU table in the TS object 142 mentioned above to perform the angle reproduction mentioned above quickly and seamlessly is explained, with reference to FIG. 17 to FIG. 28. FIG. 17 illustrates an exemplary relationship between a bit rate for each angle on a time axis and the upper limit rate, in a statistical multiplexing system used in this embodiment. FIG. 18(A) and FIG. 18(B) each schematically illustrate a data structure of an ILV block used in this embodiment. FIG. 19 schematically illustrates an angle switching in the ILV block. FIG. 20 schematically illustrates a data structure of an ILVU table. FIG. 21(A) and FIG. 21(B) each illustrate a specific example of ES address information. FIG. 22 to FIG. 27 each conceptually illustrate a reproduction operation using an ILVU table in this embodiment. FIG. 28(A) and FIG. 28(B) each conceptually illustrate an exemplary operation for a special reproduction in an ILV block.

As shown in FIG. 17, since the statistical multiplexing system is used in this embodiment, transfer rates among elementary streams in a plurality of angles (angle #1-#5) may vary. That is, in FIG. 17, insofar as the sum does not excess the upper limit, the transfer rate that is indicated as a distance along the vertical axis can be assigned to each rate curve. Therefore, the transfer rate for a certain angle can be somewhat raised for a moment.

However, if a plurality of angles each of which has a high resolution of a HDTV level is simply multiplexed by the TS packet unit, the transfer rate may be lowered to a level adversely affecting the reproduction. For this reason, especially in this embodiment, the TS object 142 (see FIG. 4) has an interleaved structure by interleaved unit, in which the interleaved unit is defined as an assembly of a plurality of TS packets 146 (or source packets 144), the total number of which is usually variable.

Furthermore, as mentioned above, multiplexing the TS packet makes it possible to perform the angle reproduction by referring to the object information such as the AU table 131 (see FIG. 16 or the like).

Particularly in this embodiment, as an example of the "unit address information" according to the present invention, the ILVU table 133 (see FIG. 3 and FIG. 20), in which the head address of ILVU is stored for all angles which have a possibility to be reproduced after the angle switching, is recorded in the object information 130. On the reproduction, this ILVU table 133 is read into the memory in the information record reproduction apparatus prior to the reproduction of the object data. The seamless angle switching can be achieved by referring to this ILVU table 133 in the memory.

FIG. 18 conceptually illustrates a structure of "ILV block (interleaved block)" which is the angle block part mentioned above made of the plurality of ILVU.

In FIG. 18(A), the elementary stream corresponding to each angle (Angle #1-#3) consisting of an array of TS packets (ILV element #1 to #3) is divided into the unit of the ILVU 800 that has a variable time interval depending on the statistical multiplexing in the transport stream. Each ILVU 800 usually includes the plurality of TS packets. Individual ILVU 800 is disposed alternately with each other for each angle number (#1-#3), as shown by arrows in the figure. That is, they are interleaved.

As shown in FIG. 18(A), in this embodiment, there are three ILV elements (ILV element #1 to #3) in each angle block (ILV block), corresponding to three angle (angle #1 to #3).

ILVU 800 belonging to different ILV elements and switchable to each other at each reproduction time point is grouped as each ILV group. For example, ILVU's 800 #1-1, #1-2, #1-3 and the like belong to the same ILV element. Similarly, ILVU's 800 #2-1, #2-2, #2-3 and the like belong to the same ILV element. On the other hand, for example, ILVU's 800 #1-1, #2-1, #3-1 and the like belong to the same ILV group. Similarly, ILVU's 800 #1-2, #2-2, #3-2 and the like belong to the same ILV group. Thus, in FIG. 18(A), an ILVU 800 which belongs to both an ILV element "i" ("i"=ILV element ID) and an ILV group "j" ("j"=ILV group number) is represented by "#i–j" in each ILV block.

As shown in FIG. 18(B), there may be the plurality of ILV blocks in the TS object as shown in FIG. 18(A).

Furthermore, as shown in FIG. 18(B), numerals encapsulated within rectangles individually indicate address, respectively. In this case, the address is represented as a serial number of packets starting from #0. Furthermore, in this specific example, each ILVU number 800 "#i–j" is reset for each ILV block.

The aforementioned angle block is constructed with these ILV blocks. Furthermore, in the ILV block constructing the angle block, the reproduction start time point and the reproduction end time point of individual interleaved units 800 are synchronized for all angles.

The interleaving mentioned above makes it easy to perform the angle reproduction without lowering the transfer rate. Incidentally, any other than the angle block may be constructed with the ILV block.

As shown in FIG. 19, especially in this embodiment, without a need to acquire the ES address information 134a (see FIG. 16 or the like) of the object information for each angle switching, the angle switching can be performed quickly and seamlessly as mentioned below, by referring to the ILVU address information in the ILVU table (see FIG. 20) read into the memory in advance.

More specifically, in FIG. 19, referring to the ILVU table (see FIG. 20) makes it possible to start the reproduction of any ILVU (#1-2, #2-2, #3-2) corresponding to any angle, as shown by three arrows in the figure, after the reproduction thereof. Incidentally, in this case, starting the reproduction of #1-2 means that the angle switching is not performed, and starting the reproduction of #2-2 or #3-2 means that the angle switching is performed.

For this, in this embodiment, as shown in FIG. 20, the ILVU table 133 includes ILV block quantity (=m) information 133a for indicating how many ILV blocks exist in total, an ILV block pointer table 133b for indicating a storage address of the ILV block information table, and an ILV block information table 133c. From among them, the ILV block information table 133c has, for each ILV block, start address of each ILV block whose packet number may be 100, an end address of each ILV block whose packet number may be 99, an ILV element quantity (ILV element ID quantity) of each ILV block which may be 3, and an ILV group quantity (group total quantity) of each ILV block which may be 3, as well as an ILV group information table 133d. Next, the ILV group information 133d includes head address information 133e of each ILVU 800, for each ILV group and for each ILV element in each ILV group. Incidentally, the "head packet number" herein may be a serial number assigned sequentially to packets in an ILV block or the like as mentioned above (i.e. an offset address from a head of an ILV block), or may be a serial number assigned sequentially to packets in a TS object.

Incidentally, size information for indicating size of each ILVU 800 may be stored in the ILVU table 133. Nevertheless, each size itself is not need to be stored, because it can be obtained from calculation as mentioned below.

In order to perform the seamless angle switching, the first scheme of this embodiment stores a "display start time point", a "packet number" and an "ILVU head flag" of the corresponding packet, as ES address information 134a (see FIG. 16) of an ES map table 134 relating to video information for an angle reproduction, for each ILV group, as shown in FIG. 21(A), in addition to components mentioned above. A value of this flag may be 1 in the case of a head ILVU 800 in each ILV group, or may be 0 in other case. This flag serves to judge relatively easy and quickly that the ILVU 800 to be reproduced belongs to which ILV group (i.e. identify an ILV group number), if the reproduction is started from the mid of the ILV block. Incidentally, a method for judging the ILV group is discussed later. In this case, the ILVU head flag information as an example of the "group judgement information" according to the present invention satisfactorily comprises 1 bit of information.

Alternatively, in order to perform the angle switching seamlessly, the second scheme of this embodiment stores a "display start time point", a "packet number" and an "ILV group number" of the corresponding packet, for each ILV group, as the ES address information 134a (see FIG. 16 or the like) of the ES map table 134 relating to the video information for the angle reproduction, as shown in FIG. 21(B). This ILV group number serves to judge relatively easily and quickly that the ILVU 800 to be reproduced belongs to which ILV group (i.e. identify the ILV group number), if the reproduction is started from the mid of the ILV block. In this case, the information to indicate the ILV group number as an example of the "group judgement information" according to the present invention may satisfactorily have a size of 16 bits or 32 bits of the information.

In the ES address information shown in FIG. 21(A) and the like, a packet number of an I picture and the corresponding display start time point are preferably described, and a packet number of a B picture, P picture, audio information or sub-picture information is not preferably described. Thereby, on the reproduction, the packet address can be identified on the basis of the packet number of the I picture, and the I picture can be reproduced on the basis of the corresponding display start time point. Furthermore, on the basis of this I picture, the B picture and the P picture can be reproduced, and the audio or sub-picture information corresponding to these video information can be reproduced, if exists. Especially in this occasion, since the address information of the packet relating to the B picture and P picture and the address information of the corresponding audio information do not need to be described, the information volume to be recorded into an information record medium can be reduced as a whole.

Now, an explanation is made on a reproduction principle of an angle block, using the ILVU 800, the ILVU table (see FIG. 20), and the ES address information as shown in FIG. 21(A) or FIG. 21(B), with reference to FIG. 22 to FIG. 28. Incidentally, an actual reproduction of the angle block is performed by an information record reproduction apparatus mentioned below, on the basis of the reproduction principle now explained.

With reference to FIGS. 22 and 23, an explanation is made on the reproduction principle for the "usual reproduction of the angle block (without the angle switching)", along the operational flow.

Firstly, with reference to FIG. 22, an explanation is made on the reproduction principle of the first scheme using an "ILVU head flag" (see FIG. 21(A)) as an example of the ILV group judgement information, without any angle switching.

(I) In this case, firstly, as shown by "Step 1" in FIG. 22, on the basis of the AU presented from the playlist and the PU corresponding to the angle designated by the user from among the PU belonging to the AU, the elementary stream packet ID (ES_PID) is obtained from the object information file by using the AU and the PU. The ES address information (see FIG. 21(A) and the like) of the ES map table of the corresponding elementary stream, the ILV block number and the ILV element ID are obtained.

(II) Next, as shown by "Step 2" in FIG. 22, by using the display start time point presented from the playlist, the corresponding entry is retrieved from the ES address information (see FIG. 21(A)), and the packet number corresponding to the display start time point is obtained.

(III) Next, as shown by "Step 3" in FIG. 22, entries of "ILVU head flag=1" are counted, in a direction towards the end of the ES address information (i.e. a direction towards later display start time point), from an entry start line to the entry position searched at the precedent step (II). Thereby, an ILV group number is identified by the count of the entry.

(IV) Next, as shown by "Step 4" in FIG. 22, the ILVU address information (or "ILVU information" as a set of the ILV block number, ILV element ID and ILVU address information) is obtained from the ILV group number of the corresponding entry obtained at the precedent step (III) and the ILV block number and the ILV element ID obtained at the precedent step (I), by referring to the ILVU table 133 (see FIG. 20).

(V) Next, as shown by "Step 5" in FIG. 22, the object data (i.e. content) is read from the position of the packet number of the entry obtained at the precedent step (II).

(VI) Furthermore, as shown by "Step 6" in FIG. 22, the ILV group number is incremented by 1 to read further object data in the angle block, on the basis of ILVU address information of the next ILVU 800 for all angles, which is stored in the ILVU table 133 (see FIG. 20).

Next, with reference to FIG. 23, an explanation is made on the reproduction principle of the second scheme using the "ILV group number (see FIG. 21(B)) as an example of the ILV judgement information, without any angle switching.

(I) & (II): "Step 1" and "Step 2" in FIG. 23 are the same of those in FIG. 22.

(III): Next, as shown in "Step 3" in FIG. 23, an ILV group number is obtained directly from a display start time point on the ES address information (see FIG. 21(B)).

(IV)-(VI): "Step 4" to "Step 6" in FIG. 23 are the same of those in FIG. 22.

Figure 24:
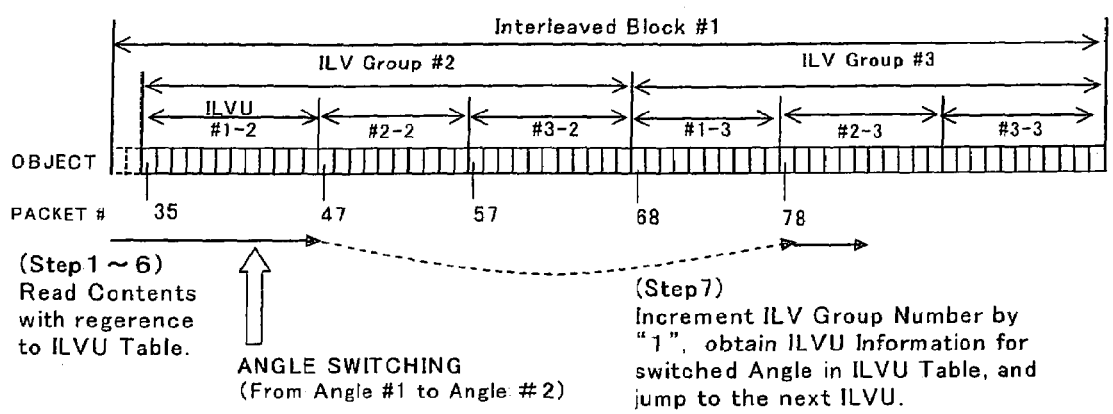
FIG. 24 is a conceptual diagram showing another reproduction principle using interleaving and the ILVU table in the embodiment.

Next, with reference to FIG. 24, an explanation is made on the reproduction principle of the "angle switching (the seamless angle switching)", along the operational flow.

(I)-(VI): Now, firstly, it is assumed that the usual reproduction explained with reference to FIG. 22 or FIG. 23 is performed. That is, it is assumed that the "Step 1" to "Step 6" in FIG. 22 are performed by the first scheme using the "ILVU head flag" (see FIG. 21(A)) as the ILV group judgement information, or the "Step 1" to "Step 6" in FIG. 23 are performed by the second scheme using the "ILV group number" (see FIG. 21(B)).

(VII) In a case that the user switches the angle within the angle block at an arbitrary time point, for example in a case that the angle is switched from angle #1 to angle #2, as shown by "Step 7" in FIG. 24, the ILVU address information of the next ILVU for the after-switched angle (angle #2) is obtained from the ILVU table 133 (see FIG. 20), and the object data of the next ILVU for the after-switched angle is read. More specifically, the ILVU address information is obtained on the basis of the ILV group number incremented by 1 relative to the before-switched ILV group and the ILV element ID for the angle #2, on the ILVU table 133 to read the object data. This seamless angle switching can be performed by the unit of the ILVU (i.e. at a time of a completion of reproduction of an ILVU being reproduced in performing the angle switching, the ILVU of another angle is reproduced seamlessly).

Figure 25:
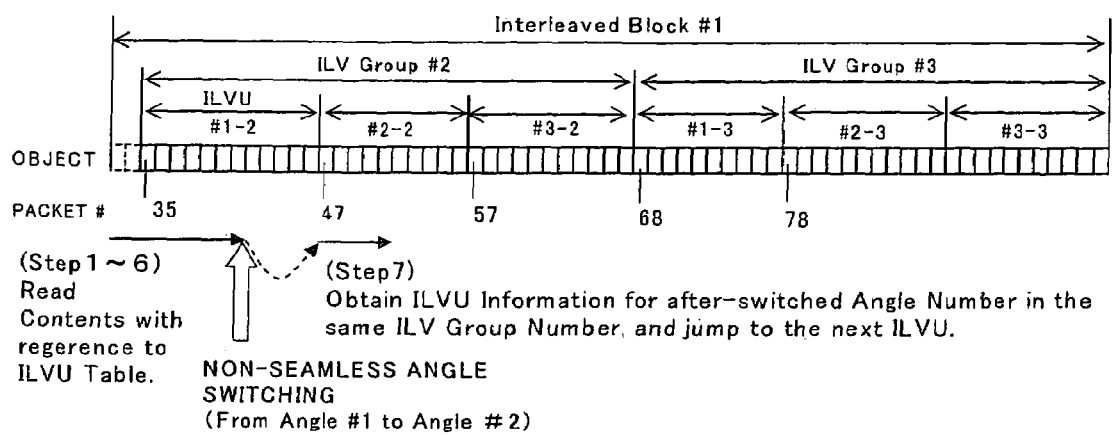
FIG. 25 is a conceptual diagram showing another reproduction principle using interleaving and the ILVU table in the embodiment.

Next, with reference to FIG. 25, an explanation is made on the reproduction principle of the "angle switching (non-seamless angle switching)", along the operational flow.

(I)-(VI): Now, firstly, it is assumed that the usual reproduction explained with reference to FIG. 22 or FIG. 23 is performed. That is, it is assumed that the "Step 1" to "Step 6" in FIG. 22 are performed by the first scheme using the "ILVU head flag" (see FIG. 21(A)) as the ILV group judgement information, or the "Step 1" to "Step 6" in FIG. 23 are performed by the second scheme using the "ILV group number" (see FIG. 21(B)).

(VII): In a case that the user performs the non-seamless angle switching within the angle block at a desired time point, for example in a case that the angle is switched from angle #1 to angle #2, as shown by "Step 7" in FIG. 25, the ILVU head packet number corresponding to the angle number after the angle switching, i.e. the ILVU address information, is obtained from the ILVU table 133 (see FIG. 20). More specifically, it is obtained as the ILVU address information in the same ILV group indicated by the ILV group number before the angle switching on the ILVU table 133.

Then, the object data of the next interleaved unit for the after-switched angle is read, on the basis of the ILVU address information obtained at the precedent step (VII). The "non-seamless angle switching" herein means that the angle is switched at the same time point as the display start time point of the head of the present interleaved unit. However, it is possible to switch the angle non-seamlessly at the time point gone back from the display start time point of the head of the present interleaved unit.

In any case, in this embodiment, although it is possible to perform the seamless angle switching, it may be possible to perform optionally the non-seamless angle switching.

Figure 27:
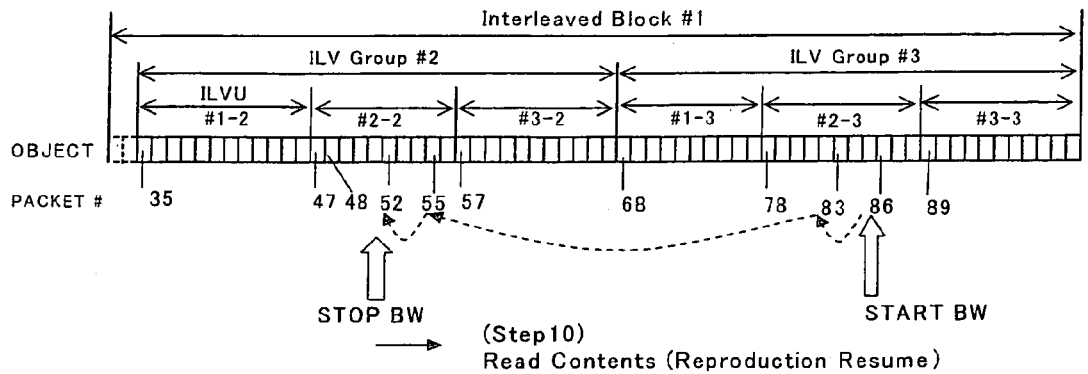
FIG. 27 is a conceptual diagram showing another reproduction principle using interleaving and the ILVU table in the embodiment.

Next, with reference to FIG. 26 to FIG. 28, an explanation is made on the reproduction principle of the "FW/BW".

Firstly, with reference to FIG. 26, an explanation is made on the reproduction principle of the "FW/BW" in the first scheme using the "ILVU head flag" (see FIG. 21 (A)) as an example of the ILV group judgement information.

(I)-(VI): Now, firstly, it is assumed that the usual reproduction explained with reference to FIG. 22 is performed.

(VII): If the user performs the instruction of FW/BW in the angle block, at an arbitrary time point, packet numbers are obtained sequentially forward (in FW) or backward (in BW) from the entry for starting FW/BW, with using the ES address information as shown by "Step 7" in FIG. 26, and the corresponding object data is read and displayed. After the completion of these operations, the packet number of the entry at an position on which these operations completed is obtained.

(VIII): As shown by "Step 8" in FIG. 26, entries of "ILVU head flag=1" are retrieved during "Step 7", from the entry for starting the FW/BW operation to the entry obtained at the precedent step "Step 7". In the case of BW, the ILV number is decremented by 1, every time when an entry of "ILVU head flag=1" is found. On the other hand, in the case of FW, the ILV group number is incremented by 1, every time when an entry of "ILVU head flag=1" is found. Thereby, the ILV group number to which packets relating to the to-be-reproduced content belong is identified, as the number after the initial ILV group number is decremented or incremented.

(IX) Next, as shown by "Step 9" in FIG. 26, the ILVU address information (or the "ILVU information" as a set of the ILV block number, "ILV element ID" and "ILVU address information") is obtained from the ILV group number, the ILV block number and the ILV element ID of the corresponding entry obtained at the precedent step (VIII), by referring to the ILVU table 133 (see FIG. 20).

Then, as shown by "Step 10" in FIG. 26, the object data is read, from the position of the packet number of the corresponding entry obtained at the precedent step (VII).

Now, with reference to FIG. 27, an explanation is made on the reproduction principle of FW/BW in the second scheme using the "ILV group number" (see FIG. 21(B)) as the ILV group judgement information.

(I)-(VI): Now, firstly, it is assumed that the usual reproduction explained with reference to FIG. 23 is performed.

(VII): If the user performs the instruction of FW/BW in the angle block, at an arbitrary time point, packet numbers are obtained sequentially forward (in FW) or backward (in BW) from the entry for starting FW/BW, with using the ES address information as shown by "Step 7" in FIG. 27, and the corresponding object data is read and displayed. After the completion of these operations, the packet number of the entry at a position on which these operations completed is obtained.

(VIII): As shown by "Step 8" in FIG. 27, an ILV group number is obtained directly for the entry obtained at the precedent step (VII), on the ES address information (see FIG. 21(B)).

(IX) Next, "Step 9" and "Step 10" in FIG. 27 are the same of those in FIG. 26.

Figure 28A:
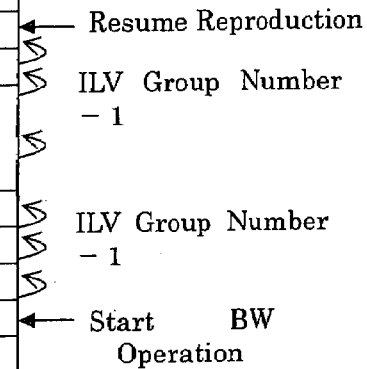
FIG. 28 is a conceptual view showing an exemplary operation for resuming from a fast forward/rewind operation in an ILV block of the ES address information in the embodiment.

For example, in the exemplary operation shown in FIG. 28(A), the BW operation is started when the ILV element #2 of the ILV group #3 is reproduced at the display start time point T1_8, according to the reproduction operation shown in FIG. 26. Then, back to the ILV group #1, where the reproduction is resumed. In this case, the ILV group number is decremented according to the ILVU head flag on the ES address information, so that the ILV group number for resuming the reproduction is identified.

Figure 28B:
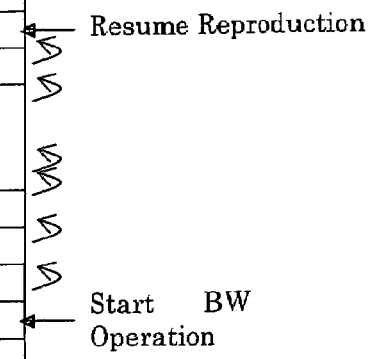

For example, in the exemplary operation shown in FIG. 28(B), the BW operation is started when the ILV element #2 of the ILV group #3 is reproduced at the display start time point T1_8, according to the reproduction operation shown in FIG. 27. Then, back to the ILV group #1, where the reproduction is resumed. In this case, different from the case of FIG. 28(A), the ILV group number is directly identified on the ES address information.

As seen from FIG. 28(A) and FIG. 28(B), in any reproduction operation, although the packet number of video packet relating to the I picture may be recorded in the ES address information as packet number indicating each ILVU address, the BW operation is performable for any video packet other than the I picture, as well.

In this embodiment as discussed above, it is possible to multi-record a transport stream onto an optical disc 100, including a plurality of elementary streams as shown in FIG. 2(b) due to the multi-recording by a unit of TS packet 146 or a unit of source packet 144 onto the optical disc 100. In this embodiment, it is possible to record a plurality of programs and the like in a usual block simultaneously within a limitation of a record rate. Especially in the angle block, it is possible to record a plurality of angles simultaneously within a limitation of a record rate. The optical disc 100 recorded as such can be reproduced by a seamless angle reproduction, especially in the angle block, according to the reproduction principle shown in FIG. 22 to FIG. 28. The following is an explanation about an embodiment of an information record reproduction apparatus for these record and reproduction operation.

(Information Record Reproduction Apparatus)

Figure 29:
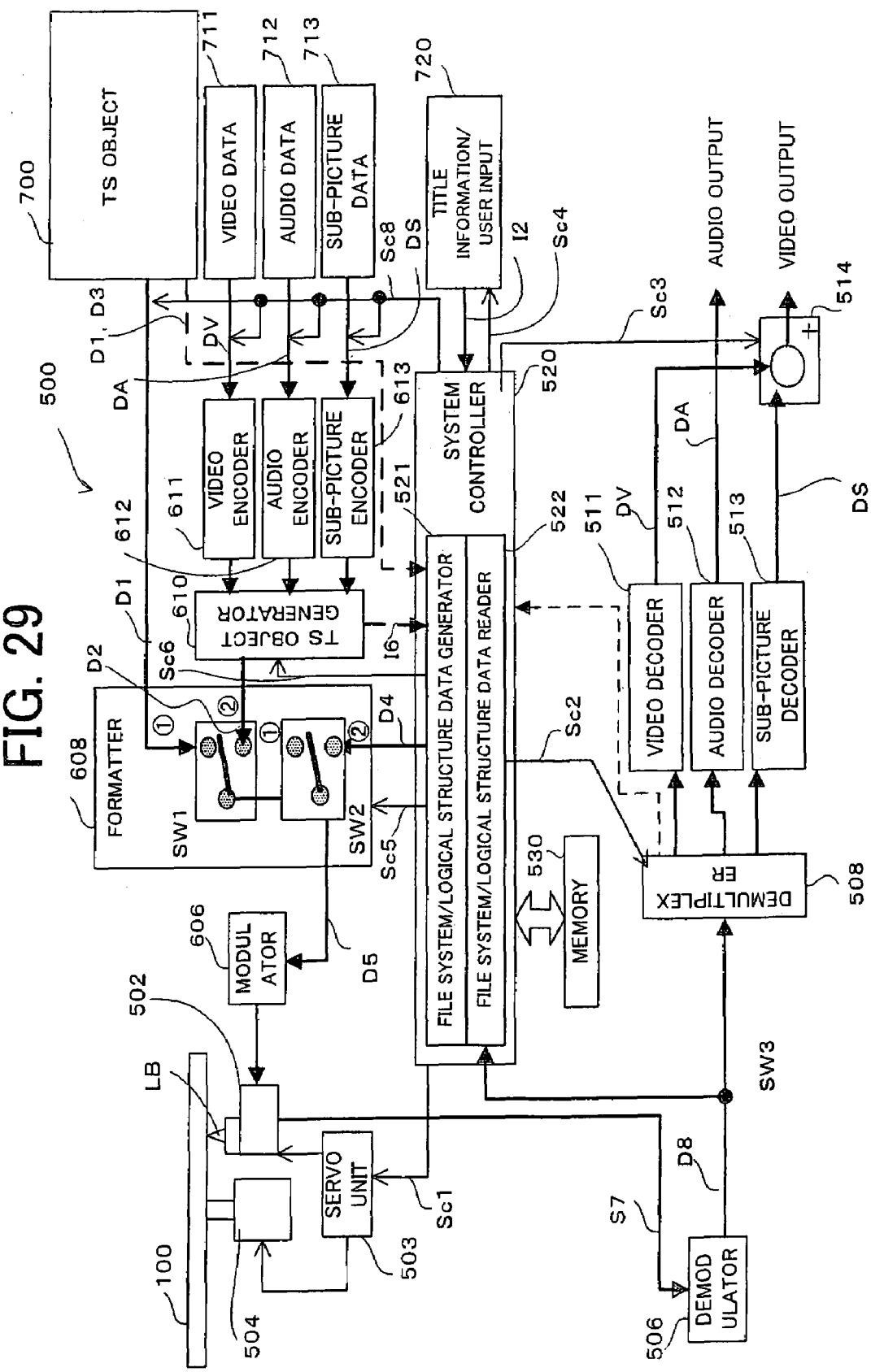
FIG. 29 is a block diagram showing the information record reproduction apparatus in an embodiment of the present invention.

Next, with reference to FIG. 29 to FIG. 39, an embodiment of the information record reproduction apparatus of the present invention is discussed. Here, FIG. 29 is a block diagram of the information record reproduction apparatus, and FIGS. 30 to 39 illustrate the operational flow.

In FIG. 29, the information record reproduction apparatus 500 is roughly divided into a reproduction system and a record system. The information record reproduction apparatus 500 is constructed to record the information onto the optical disc 100 mentioned above and to reproduce the information recorded thereon/therein. In this embodiment, the information record reproduction apparatus 500 is thus for recording and reproduction. Nevertheless, an embodiment of the information record apparatus according to the present invention can be constructed basically with the record system of the information record reproduction apparatus 500 and an embodiment of the information reproduction apparatus according to the present invention can be constructed basically with the reproduction system of the information record reproduction apparatus 500.

The information record reproduction apparatus 500 is provided with: an optical pickup 502; a servo unit 503; a spindle motor 504; a demodulator 506; a demultiplexer 508; a video decoder 511; an audio decoder 512; a sub-picture decoder 513; an adder 514; a system controller 520; a memory 530; a modulator 606; a formatter 608; a TS object generator 610; a video encoder 611; an audio encoder 612; and a sub-picture encoder 613. The system controller 520 includes a file system/logical structure data generator 521 and a file system/logical structure data reader 522. Furthermore, the memory 530 and a user interface 720 to give a user input such as title information are connected to the system controller 520.

Among these constitutional elements, the demodulator 506, the demultiplexer 508, the video decoder 511, the audio decoder 512, the sub-picture decoder 513 and the adder 514 mainly constructs the reproduction system. On the other hand, among these constitutional elements, the modulator 606, the formatter 608, the TS object generator 610, the video encoder 611, the audio encoder 612 and the sub-picture encoder 613 mainly constructs the record system. The optical pickup 502, the servo unit 503, the spindle motor 504, the system controller 520, the memory 530 and the user interface 720 to give the user input such as title information are generally shared for both the reproduction system and the record system. Furthermore, the record system is provide with: a TS object data source 700; a video data source 711; an audio data source 712; and a sub-picture data source 713. Furthermore, the file system/logical structure data generator 521 disposed in the system controller 520 is used mainly in the record system, and the file system/logical structure reader 522 in the system controller 520 is used mainly in the reproduction system.

The optical pickup 502 irradiates the optical disc 100 with a light beam LB such as a laser beam, at the first power as reading light for the reproduction, and at the second power with the light beam LB being modified as writing light for recording. The servo unit 503 performs the focus servo, the tracking servo and the like for the optical pickup 502, as well as the spindle servo for the spindle motor 504, under control of the control signal Sc1 outputted from the system controller 520, during the reproduction and recording. The spindle motor 504 is controlled under the spindle servo by the servo unit 503, for rotating the optical disc 100 at a predetermined speed.

(i) Structure and Operation of Record System

Next, with reference to FIG. 29 to FIG. 33, a specific structure and the operation of each constitutional element constructing the record system of the information record and reproduction system 500 is explained in each case.

(i-1) In the Case that the Already Generated Object is Used

Figure 30:
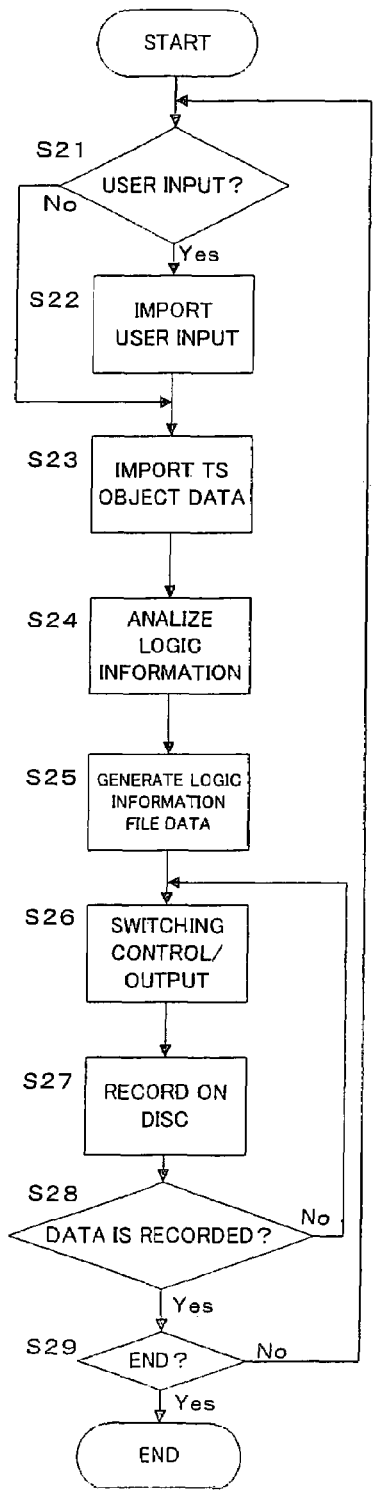
FIG. 30 is a flow chart indicating a recording operation (part 1) of the information record reproduction apparatus in the embodiment.

This case is discussed, with reference to FIG. 29 and FIG. 30.

In FIG. 29, the TS object data source 700 may be made of the memory storage such as a videotape or a memory, for storing the TS object data D1.

Firstly in FIG. 30, each title information (e.g. content of the playlist etc.) to be logically constructed on the optical disc 100 using the TS object data D1 is inputted into the system controller 520, as the user input 12 such as the title information, via the user interface 720. Then, the system controller 520 imports the user input 12 such as the title information via the user interface 720 (step S21: Yes, and step S22). In this case, the user interface 720, under control of the control signal Sc4 from the system controller 520, can perform the input operation in response to the contents to be recorded, such as the selection via the title menu screen. Incidentally, if the user input is already performed (step S21: No), these processings are omitted.

Next, the TS object data source 700 outputs the TS object data D1, under control of the control signal Sc8 to indicate the data reading from the system controller 520. Then, the system controller 520 imports the TS object data D1 from the TS object data source 700 (step S23). And the system controller 520 performs the data array analysis (e.g. a record data length and the like) of the TS object data D1, the analysis of each elementary stream structure (e.g. understanding of ES_PID (elementary stream packet identification number)) and the like, on the basis of the PAT, the PMT and the like packetized with the video data as mentioned above, due to the TS analysis function in the file system/logical structure data generator 521 (step S24).

Next, the system controller 520 makes the file system/logical structure data generator 521 generate the disc information file 110, the playlist information file 120, the object information file 130 and the file system 105 (see FIG. 3), as the logical information file data D4, on the basis of the analysis result of each elementary stream and the TS object data D1 data array, as well as the user input 12 such as the imported title information (step S25). The memory 530 is used to generate this logical information file data D4.

Incidentally, variations in which the data about each elementary stream structure information and the TS object data D1 data array may be prepared in advance are naturally understood or suggested, all of which are encompassed within a scope of the embodiment.

In FIG. 29, the formatter 608 is for formatting the data array to store both the TS object data D1 and the logical information file data D4 on the optical disc 100. More specifically, the formatter 608 is provided with a switch Sw1 and a switch Sw2 and is switching-controlled by a switch control signal Sc5 from the system controller 520. When formatting the TS object data D1, it connects the switch Sw1 to a ① side and the switch Sw2 to the ① side so as to output the TS object data D1 from the TS object data source 700. Incidentally, the transmission control of the TS object data D1 is performed by the control signal Sc8 from the system controller 520. On the other hand, when formatting the logical information file data D4, the formatter 608 is switching-controlled by the switch control signal Sc5 from the system controller 520, and connects the switch Sw2 to a ② side so as to output the logical information file data D4.

At step S26 in FIG. 30, (i) the logical information file data D4 from the file system/logical structure data generator 521 at the step S25 or (ii) the TS object data D1 from the TS object data source 700 is outputted through the formatter 608, under the switching-control by the formatter 608 as constructed above (step S26).

The selection output from the formatter 608 is transmitted to the modulator 606 as disc image data D5, and modulated by the modulator 606, and recorded onto the optical disc 100 through the optical pickup 502 (step S27). The system controller 520 also executes the disc record control in this case.

Then, if both the logical information file data D4 generated at the step S25 and the corresponding TS object data D2 have not been completely recorded yet, the operational flow returns to the step S26 to continue the recording (step S28: No). Incidentally, there is no preference in the record sequence of the logical information file data D4 and the corresponding TS object data D1.

On the other hand, if the both the logical information file data D4 generated at the step S25 and the corresponding TS object data D1 have been already recorded, a judgement is made whether or not the recording onto the optical disc 100 is to be ended, on the basis of the presence or absence of an end command (step S29). If it is not to be ended (step S29: No), the operational flow returns to the step S21 to continue the recording. On the other hand, if it is to be ended (step S29: Yes), a series of record processing ends.

As described above, the information record reproduction apparatus 500 performs the record processing in the case of using the already prepared TS object.

Particularly in this embodiment, at the steps S23 to S26, the ILVU is generated from the TS packet array by a statistical multiplexing method under control of the switch control signals (Sc5, Sc8 and the like) from the system controller 520. Furthermore, the ILVU table (see FIG. 20) 133 and the ES map table 134 (see FIG. 21, FIG. 16 and the like) including the ES address information and others having the ILVU head flag or the ILV group number are generated as parts of the object information file 130 (see FIG. 3 and the like).

Incidentally, the example in FIG. 30 shows that the logical information file data D4 and the corresponding TS object data D2 are outputted at the step S26, after preparing the logical information file data D4 at the step S25. However, it is also possible to output the TS object data D2 and/or record the TS object data D1 onto the optical disc 100 before the step S25, so that the logical information file data D4 is generated and/or recorded after or in parallel with this recording.

(i-2) The Case of Receiving and Recording the Transport Stream on Air

Figure 31:
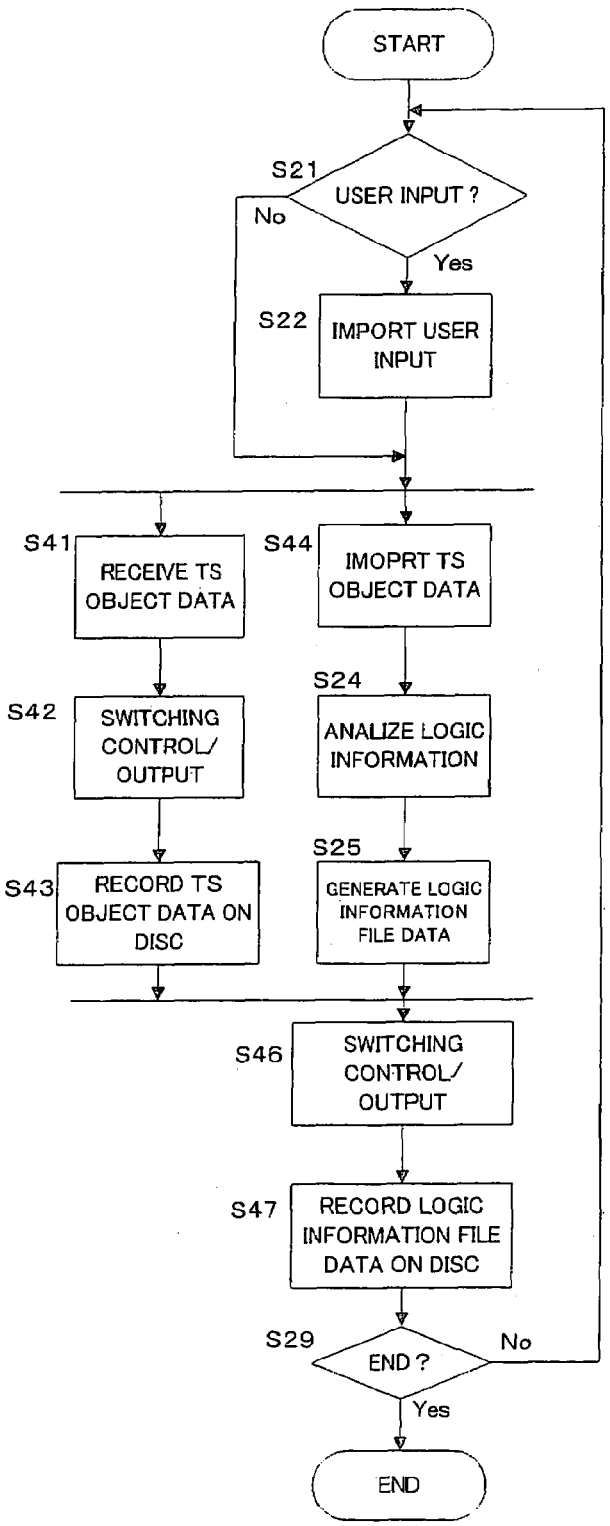
FIG. 31 is a flow chart indicating a recording operation (part 2) of the information record reproduction apparatus in the embodiment.

This case is explained with reference to FIG. 29 and FIG. 31. Incidentally, in FIG. 31, the same steps as those in FIG. 30 have the same step reference numbers, and their explanation is omitted as occasion demands.

Again, in this case, the similar processing is performed, as is "the case of using the already prepared object" described above. Therefore, the following explanation is focused on the differences from this case.

In the case of receiving and recording the transport stream on air, the TS object data source 700 is provided with a receiver (set top box) for receiving the digital broadcast on air, for example, receives the TS object data D1, and transmits it to the formatter 608 in real time (step S41). At the same time, reception information D3 (i.e. information corresponding to the data transmitted through the receiver and the interface of the system controller 520) including the program construction information and the belowmentioned ES_PID information, which are deciphered upon receiving, is imported into the system controller 520 and is stored into the memory 530 (step S44).

In the meantime, the TS object data D1 outputted to the formatter 608 is outputted to the modulator 606 under the switching-control by the formatter 608 (step S42), and is recorded onto the optical disc 100 (step S43).

Along with these operations, using the program construction information and the ES_PID information included in the reception information D3 imported upon receiving and stored in the memory 530, the file system/logical structure data generator 521 prepares the logical information file data D4 (step S24 and step S25). Then, after the completion of recording a series of the TS object data D1, this logical information file data D4 is additionally recorded onto the optical disc 100 (step S46 and step S47). Incidentally, these steps S24 and S25 may be performed after the step S43.

Moreover, as the occasion demands (e.g. in the case of editing one portion of the title, or the like), by adding the user input 12 of the title information and the like from the user interface 720 to the program construction information and the ES_PID information stored in the memory 530, it is possible to prepare the logical information file data D4 by the system controller 520 and additionally record this onto the optical disc 100.

As described above, the information record reproduction apparatus 500 performs the record processing in the case of receiving the transport stream on air and recording it in real time.

Particularly in this embodiment, at the steps S41 to S46, S24, S25 and the like, the ILVU is generated from the TS packet array by a statistical multiplexing method under control of the switch control signals (Sc5, Sc8 and others) from the system controller 520. Furthermore, the ILVU table 133 (see FIG. 20) and the ES map table 134 (see FIG. 21, FIG. 16 and the like) including the ES address information or the like having the ILVU head flag or the ILV group number are generated as parts of the object information file 130 (see FIG. 3 or the like).

Incidentally, if all the reception data obtained when broadcasting is once stored into an archive apparatus, and then, if this is used as the object source 700, the same processing as that in "the case of using the already prepared object" will do.

Figure 32:
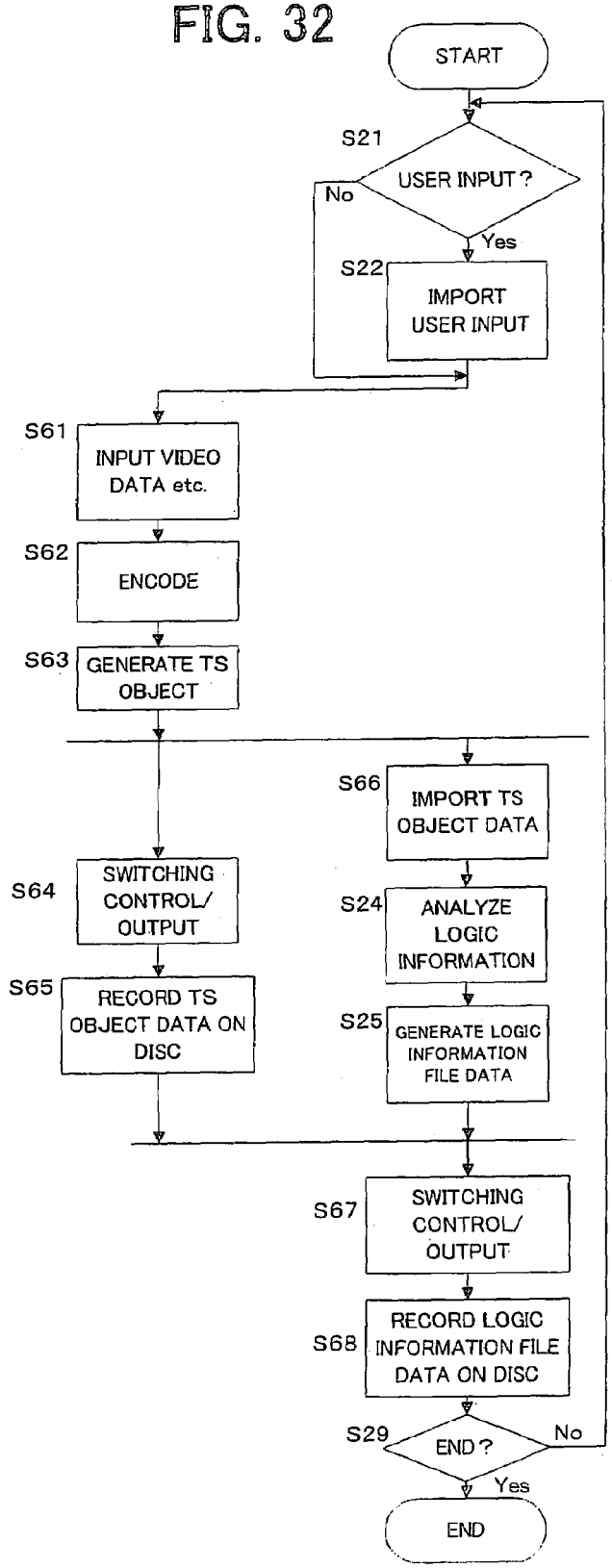
FIG. 32 is a flow chart indicating a recording operation (part 3) of the information record reproduction apparatus in the embodiment.

(i-3) The Case of Recording the Video Data, the Audio Data and the Sub-Picture Data This case is explained with reference to FIG. 29 and FIG. 32. Incidentally, in FIG. 32, the same steps as those in FIG. 30 have the same step reference numbers, and their explanation is omitted as occasion demands.

In the case of recording the video data, the audio data, and the sub-picture data, which are individually prepared in advance, the video data source 711, the audio data source 712, and the sub-picture data source 713 are individually provided with the memory storage, such as a video tape and a memory, and store a video data DV, an audio data DA, and a sub-picture data DS, respectively.

These data sources are controlled by the control signal Sc8 giving an instruction for reading out the data from the system controller 520, and they transmit the video data DV, the audio data DA, and the sub-picture data DS, to the video encoder 611, the audio encoder 612, and the sub-picture encoder 613, respectively (step S61). Then, the video encoder 611, the audio encoder 612, and the sub-picture encoder 613 execute a predetermined type of encode processing (step S62).

The TS object generator 610 is controlled by a control signal Sc6 from the system controller 520 and converts the data encoded in this manner to the TS object data constituting the transport stream (step S63). In this case, the data array information of each TS object data (e.g. a record data length and the like) and the construction information of each elementary stream (e.g. the ES_PID, as described later, and the like) are transmitted as information 16 from the TS object generator 610 to the system controller 520 and are stored into the memory 530 (step S66).

On the other hand, the TS object data generated by the TS object generator 610 is transmitted to the ② side of the switch Sw1 of the formatter 608. Namely, when formatting the TS object data from the TS object generator 610, the formatter 608 is switching-controlled by the switch control signal Sc5 from the system controller 520 to shift the switch Sw1 to the ② side and the switch Sw2 to the ① side, thereby outputting the TS object data (step S64). Then, this TS object data is recorded onto the optical disc 100 through the modulator 606 (step S65).

Along with these operations, using the data array information of each TS object data and the construction information of each elementary stream imported that are stored into the memory 530 as the information 16, the file system/logical structure data generator 521 prepares the logical information file data D4 (step S24 and step S25). Then, after the completion of recording a series of the TS object data D1, the logical information file data D4 is additionally recorded onto the optical disc 100 (step S67 and step S68). Incidentally, the step S24 and the step S25 may be processed after the step S65.

Moreover, as the occasion demands (e.g. in the case of editing one portion of the title), by adding the user input 12 such as the title information and the like from the user interface 720 to these information stored in the memory 530, it is possible to prepare the logical information file data D4 by the file system/logical structure generator 521 and additionally record this onto the optical disc 100.

As described above, the information record reproduction apparatus 500 performs the record processing in the case of recording the video data, the audio data, and the sub-picture data, which are individually prepared in advance.

Particularly in this embodiment, at the steps S64, S66, S24, S25 and the like, the ILVU is generated from the TS packet array by a statistical multiplexing method. Furthermore, the ILVU table 133 (see FIG. 20) and the ES map table 134 (see FIG. 21, FIG. 16 and the like) including the ES address information or the like having the ILVU head flag or the ILV group number are generated as parts of the object information file 130 (see FIG. 3 or the like).

Incidentally, this record processing is applicable even when recording an arbitrary content the user has.

(i-4) The Case of Recording the Data by Authoring

Figure 33:
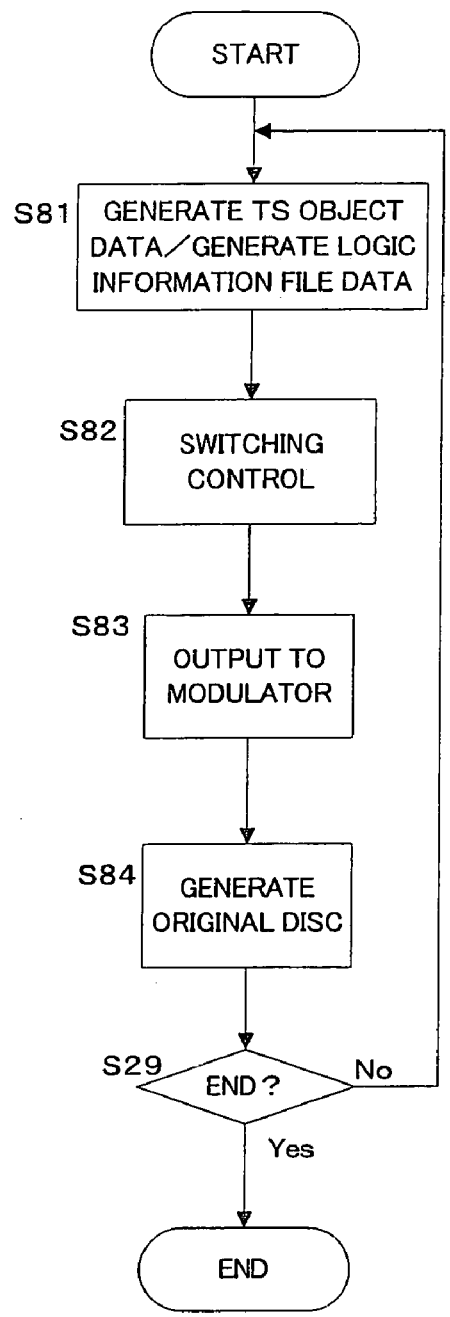
FIG. 33 is a flow chart indicating a recording operation (part 4) of the information record reproduction apparatus in the embodiment.

This case is explained with reference to FIG. 29 and FIG. 33. Incidentally, in FIG. 33, the same steps as those in FIG. 30 have the same step reference numbers, and their explanation is omitted as occasion demands.

In this case, by combining the above described record processing in the three cases, an authoring system generates the TS object, the logical information file data, and the like in advance (step S81), and then completes the processing until switching-control performed at the formatter 608 (step S82). Then, the information obtained by this operation is transmitted, as the disc image data D5, to the modulator 606 equipped in front of and/or behind an original disc cutting machine (step S83), and this cutting machine prepares the original disc (step S84).

(ii) Structure and Operation in Reproduction System

Next, the specific structure and operation of each constitutional element constituting the reproduction system of the information record reproduction apparatus 500 is explained with reference to FIG. 29 and FIG. 34 to FIG. 39.

Via the user interface 720, the title to be reproduced from the optical disc 100, its reproduction condition and the like are inputted to the system controller 520, as the user input 12 such as the title information and the like. In this case, under control of the control signal Sc4 from the system controller 520, the input processing suitable for the content to be reproduced, such as a selection on a title menu screen, can be achieved by the user interface 720.

Responding to this, the system controller 520 controls the disc reproduction with respect to the optical disc 100, and the optical pickup 502 transmits a reading signal S7 to the demodulator 506.

The demodulator 506 demodulates a recorded signal recorded onto the optical disc 100 from this reading signal S7, and outputs it as demodulated data D8. The logical information file data (i.e. the file system 105, the disc information file 110, the P list information file 120, and the object information file 130, shown in FIG. 3) included in this demodulated data D8 as being a not-multiplexed information part is supplied to the system controller 520. On the basis of this logical information file data, the system controller 520 executes various reproduction control, such as processing of determining a reproduction address and controlling the optical pickup 502.

On the other hand, as for the TS object data included as the multiplexed information part in the demodulated data D8, the demultiplexer 508 demultiplexes the TS object data, under control of the control signal Sc2 from the system controller 520. Here, when the access to the reproduction position address is terminated under the reproduction control by the system controller 520, the control signal Sc2 is transmitted to start the demultiplexing.

The video packet, the audio packet and the sub-picture packet are transmitted respectively from the demultiplexer 508 and supplied respectively to the video decoder 511, the audio decoder 512 and the sub-picture decoder 513. Then, the video data DV, the audio data DA and the sub-picture data DS are decoded, respectively.

Incidentally, although the packets obtained by packetizing the PAT or the PMT, included in the transport stream shown in FIG. 6, are included as a part of the demodulated data D8, respectively, they are discarded or abandoned at the demultiplexer 508.

The adder 514 is controlled by a control signal Sc3 giving an instruction of the mixing from the system controller 520, and mixes or superimposes in a predetermined timing the video data DV and the sub-picture data DS, which are respectively decoded at the video decoder 511 and the sub-picture decoder 513. The result is outputted as a video output from the information record reproduction apparatus 500 to a TV monitor, for example.

On the other hand, the audio data DA decoded at the audio decoder 512 is outputted as an audio output from the information record reproduction apparatus 500 to an external speaker, for example.

Here, the specific example of a reproduction processing routine of the system controller 520 will be explained with reference to FIG. 34 to FIG. 39.

Figure 34:
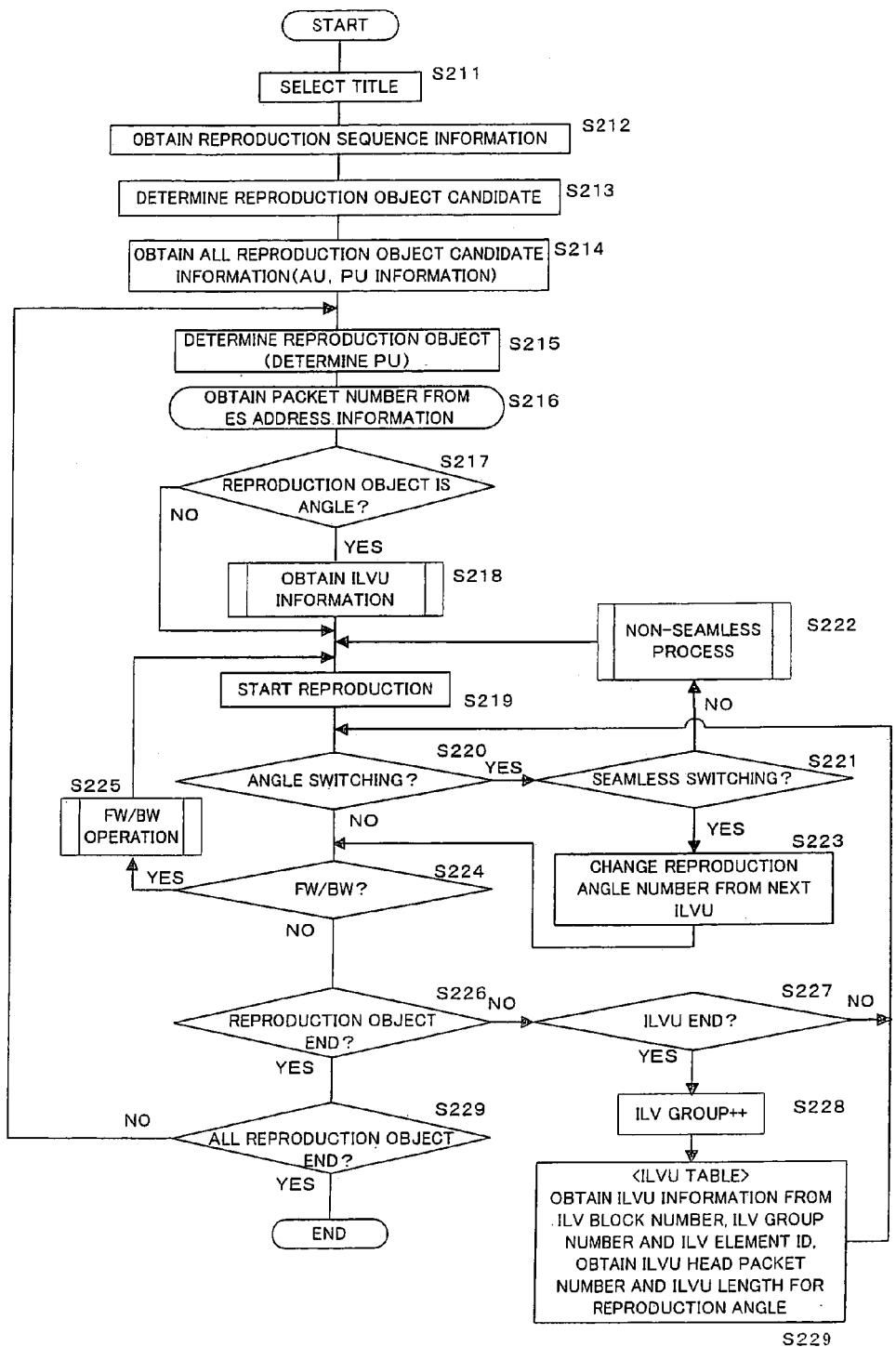
FIG. 34 is a flow chart showing a reproduction operation of the information record reproduction apparatus in the embodiment.

With reference to FIG. 34, a general flow of the reproduction processing will be explained.

In FIG. 34, it is assumed that, as an initial condition, the recognition of the optical disc 100 in the reproduction system and the recognition of a volume structure and a file structure by the file system 105 (see FIG. 3) have been already completed by the system controller 520 and the file system/logical structure data reader 522 inside the system controller 520. Here, it will be explained the operational flow after obtaining the total quantity of the total titles from the disc general information 112 in the disc information file 110 and then choosing or selecting one title from among them.

Firstly, the choice or selection of the title is performed at the user interface 720 (step S211), and the system controller 520 obtains the information about the reproduction sequence from a reading result of the file system/logical structure data 4 reader 522. More specifically, the processing of the logical hierarchy (i.e. obtaining the information for indicating a structure of a play list and the information about each of the Items constituting the play list (refer to FIG. 7)) is performed (step S212). By this, a reproduction object is determined (step S213).

Then, the object information file 130 related to the TS object as being the reproduction object is obtained. Especially in the embodiment, the AU table 131 (see FIG. 16 and so on) including, as mentioned above, the AU information 132I and PU information 302I is also obtained as the information stored in the object information file 130 (step S214). These obtained information allows the association or correlation of the above-described logical hierarchy and the object hierarchy (refer to FIG. 7).

Then, on the basis of the information obtained at the step S214, the object to be reproduced, i.e. the PU is determined (step S215), and then the packet number relating to the TS object to be reproduced is obtained from the ES address information included in the ES map table (see FIG. 16, FIG. 21 and the like) (step S216). Incidentally, this packet obtaining process at the step S216 will be explained more detail later with reference to FIG. 35.

At this stage, a judgement is made whether or not the TS object to be reproduced is for the angle reproduction, for example on the basis of the AU attribute information in the AU table 131 (see FIG. 16 and so on) (step S217).

As a result, if it is judged that it is for the angle reproduction (step S217: Yes), the ILVU information about the angle block to be reproduced (i.e. the information such as the ILVU address information composing the ILVU table 133 shown in FIG. 20) is obtained (step S218), by referring to the ILVU table 133 obtained with the AU table 131, the ES map table 134 and the like as parts of the object information file 130 at step S214. Then, the reproduction of the object data is started from the packet number obtained at step S216 (step S219). On the other hand, if it is not an object for the angle reproduction (step S217: No), the reproduction is immediately started without obtaining the ILVU information which is unnecessary for this case (step S219). Incidentally, the ILVU information obtaining process at step S218 will be explained more detail later, with reference to FIG. 36.

Then, during the reproduction of the object, a judgement is made whether or not the existence of the user input command for the angle switching in the information recording and reproducing apparatus (step S220).

If it is judged that the command for the angle switching exists (step S220: Yes), a judgement is made whether or not the seamless switching is set to perform the angle reproduction, on the basis of the user input or an initial setting in the information recording and reproducing apparatus (step S221).

As a result, if it is judged that the seamless switching is not set (step S221: No), for example if the aforementioned non-seamless switching is set, the non-seamless processing is executed (step S222) and then the reproduction is started (step S219). Incidentally, the non-seamless processing at step S222 will be explained more detail, with reference to FIG. 37. On the other hand, if the seamless switching is set (step S221: Yes), the object to be reproduced after switching the angle is determined. More specifically, the angle number corresponding to the user operation is determined (step S223). After the determination of the angle number, the reproduction of the object data after switching is continued.

On the other hand, at step S220, if it is judged that the command for the angle switching does not exist (step S220: No), a judgement is made whether or not a command is inputted for FW/BW (step S224).

As a result, if it is judged that the command for FW/BW is inputted (step S224: Yes), the FW/BW operation is executed (step S225) and then the reproduction is started (step S219).

On the other hand, if it is judged that the command for FW/BW is not inputted (step S224: No), a judgement is made whether or not the object to be reproduced completes (step S226).

As a result, if it is judged that the object to be reproduced does not complete (step S226: No), a judgement is made whether or not the interleaved unit completes (step S227).

As a result, if it is judged that the interleaved unit completes (step S227: Yes), the ILVU information (i.e. the information such as the ILVU address information composing the ILVU table 133 (see FIG. 20)) about the angle block to be reproduced nextly, from the ILVU block, the ILV group number and the ILV element ID, by referring to the ILVU table 133 (see FIG. 20) after the ILV group number is incremented (step S228). Particularly in this case, the head packet number and length of the ILVU corresponding to the angle to be reproduced are obtained, and then the reproduction of the object data is resumed from the head packet number (step S229). Obtaining the length of the ILVU will be discussed later with reference to FIG. 36(A).

On the other hand, if it is judged that the ILVU does not complete (including the case of the usual block) (step S227: No), the object data is continuously read and the reproduction is continued.

On the other hand, if it is judged that the object to be reproduced completes (step S226: Yes), a judgement is made whether or not all the objects to be reproduced complete (step S230).

As a result, if it is judged that all the objects to be reproduced do not complete (step S230: No), the operational flow goes back to step S215 to continue a series of reproduction processings. On the other hand, if it is judged that all the objects to be reproduced complete (step S230: Yes), a series of reproduction processings ends.

Next, with reference to FIG. 35, the packet number obtaining process at step S216 in FIG. 34 will be explained.

In FIG. 35, firstly, with reference to the AU table (see FIG. 16 and the like), the information about the elementary stream of the TS object to be reproduced is obtained. Namely, the index number and the like of the ES map table are obtained (step S301).

Next, with reference to the ES map table (see FIG. 16 and the like), the ES address information and the packet number (ES_PID) of the elementary stream corresponding to the index number obtained at step S301 are obtained (step S302).

Next, on the basis of the obtained ES address information (see FIG. 21 and the like), the corresponding packet number is obtained from the display time point (T) (step S303).

Thus, the packet number obtaining process completes.

Figure 36A:
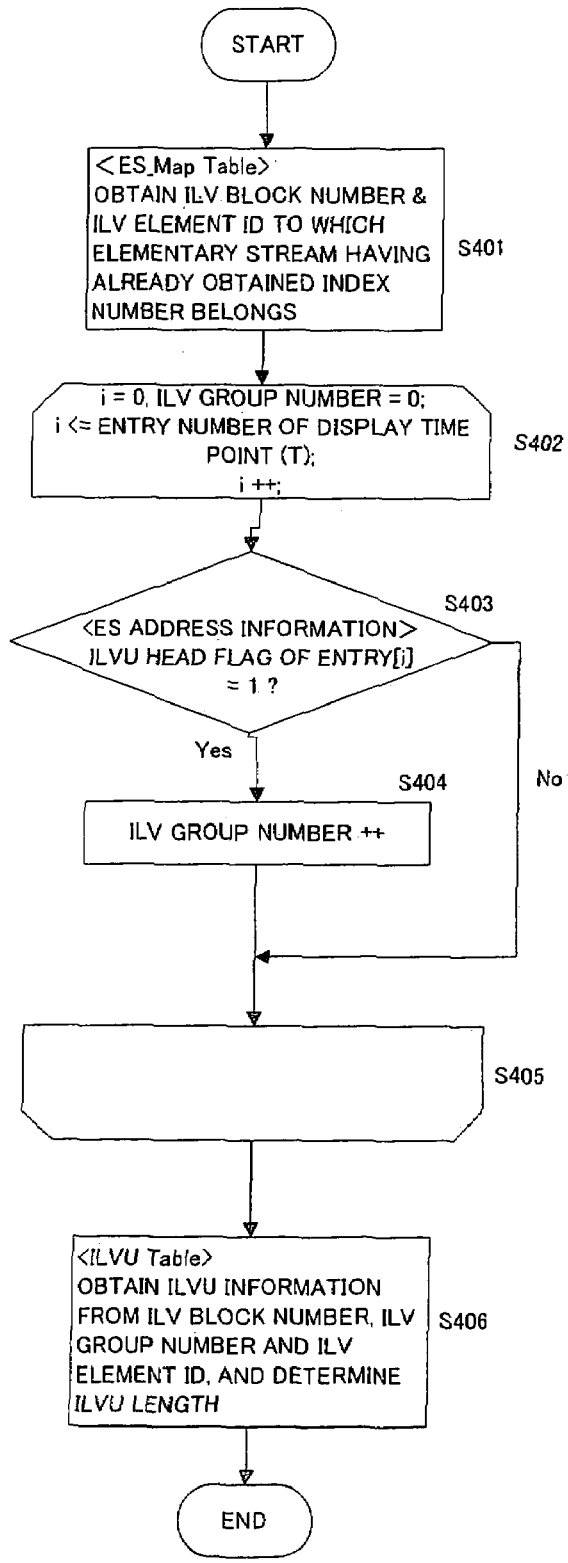
FIG. 36 is a flow chart showing an ILVU information obtaining process in FIG. 34.
Figure 36B:
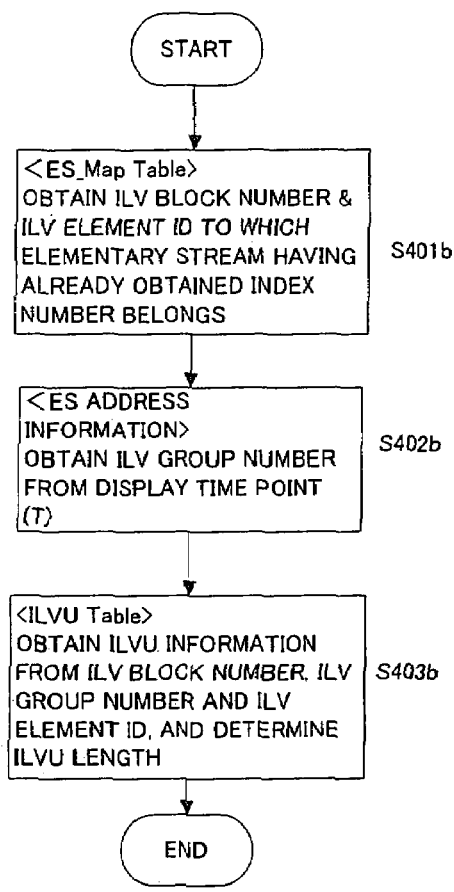

Next, with reference to FIG. 36(A) and FIG. 36(B), the ILVU information obtaining process at step S218 in FIG. 34 is explained.

Firstly, with reference to FIG. 36(A), an explanation is made on the ILVU information obtaining process by the first method using the "ILVU head flag" (see FIG. 21(A)) as an example of the ILV group judgement information.

Firstly in FIG. 36(A), the ILV block number and the ILV element ID, to which elementary streams corresponding to an index number obtained at step S301 belong, are obtained (step S401) by referring to the ES map table (see FIG. 16 and the like) already read into the memory at step S214 or the like.

Next, at steps S402 to S405, the processing for obtaining the ILV group number to which the ILVU belongs is performed. Initial values of both a parameter "i" to obtain the ILVU information and a parameter "ILV group number" are set to zero (step S402).

Then, a judgement is made whether or not the ILVU head flag (see FIG. 21(A) or the like) having the entry number "i" is "1" by referring to the ES address information (step S403). Then, if the head flag is "1" (step S403: Yes), the parameter "ILV group number" is incremented (step S404). On the other hand, if the ILVU head flag is not "1" (step S403: No), the step S404 is skipped. Then, in both cases, a loop from step S402 to step S405 is repeated, while the parameter "entry number i" is incremented under a continuation condition that i≦ "an entry number corresponding to a display time (T) (e.g. a line number of the ES address information in FIG. 21(A))". If the continuation condition becomes "false" finally, the process goes to step S406, escaped from the loop from step S402 to step S405.

Then, at step S406, the ILVU information is obtained from the ILV block number, the ILV group number and the ILV element ID by referring to the ILVU table 133 (see FIG. 20), so that the length of the ILVU is obtained.

Here, an explanation is made on obtaining the length of the ILVU.

A discussion is made on obtaining a length of an ILVU which belongs to ILV element ID #n which belongs to the ILV group #m, in one ILV block, in which m and n are any natural numbers, respectively. The following three cases (C1) to (C3) are presented:

(C1): ILV element ID#n<ILV element total quantity;

(C2): ILV element ID #n=ILV element total quantity, while ILV group #m<ILV group total quantity; and (C3): ILV element ID#n=ILV element total quantity, while ILV group #m=ILV group total quantity.

In the case of (C1), the length of the ILVU is calculated by subtracting the present address from an address of the next element ID in the same ILV group number.

That is, the length of the ILVU is calculated on the basis of the following formula:

"address of packet having ILV element ID #n+1 in
  ILV group #m"–"address of packet having ILV
  element ID #n in ILV group #m".

In the case of (C2), the length of the ILVU is calculated by subtracting the present address from an address having the ILV element ID #1 in the next ILV group number.

That is, the length of the ILVU is calculated on the basis of following formula:

"address of packet having ILV element ID #1 in ILV
  group #m+1"–"address of packet having ILV
  element #n in ILV group #m".

In the case of (C3), the length of the ILVU is calculated by subtracting the present address from the last address in the ILV block.

That is, the length of the ILVU is calculated on the basis of following formula:

"address of the last packet in ILV block"–"address of
  packet having ILV element ID #n in ILV group
  #m".

Incidentally, it is possible to pre-describe each ILVU length in an ILVU table (see FIG. 20) for example without using these calculations.

Thus, the process of obtaining the ILVU information and each ILVU length completes by the first method using the ILVU head flag (see FIG. 21(A)).

Next, with reference to FIG. 36(B), an explanation is made on obtaining the ILVU information by the second method using the "ILV group number" (see FIG. 21(B)) as an example of the ILV group judgement information.

Firstly in FIG. 36(B), the ILV block number and the ILV element ID, to which elementary streams corresponding to an index number obtained at step S301 belong, are obtained by referring to the ES map table (see FIG. 16) already read into the memory at step S214 for example (step S401).

Then, on the basis of the ES address information (see FIG. 21(B) and the like), the corresponding ILV group number is obtained from the display start time (T) (step S402*b*).

Then, the ILVU information is obtained form the ILV block number, the ILV group number and the ILV element ID by referring to the ILVU table 133 (see FIG. 20). Thereby, as in the specific example discussed with reference to FIG. 36(A), the ILVU length is obtained (step S403*b*).

Thus, the process of obtaining the ILVU information completes.

Figure 37:
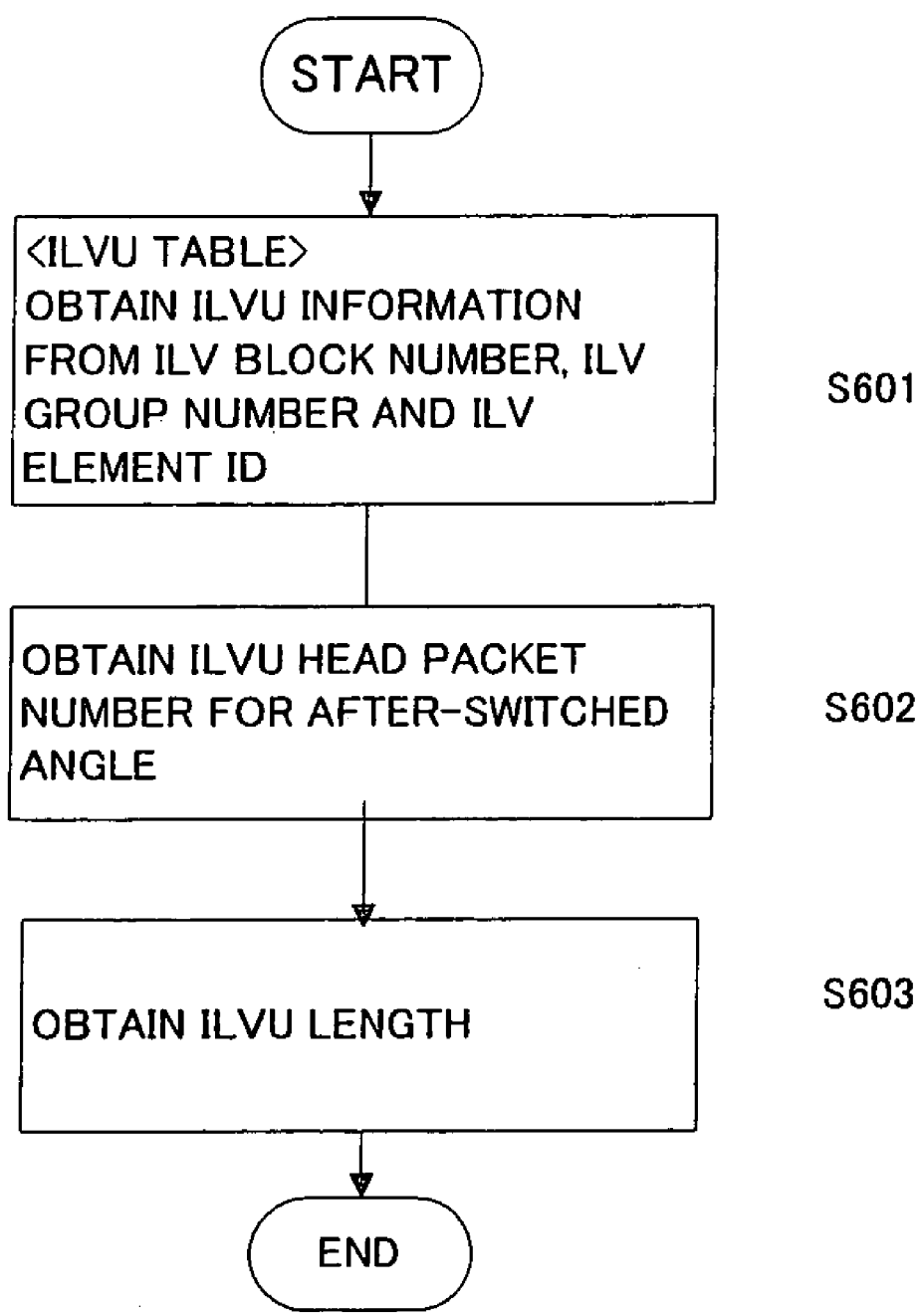
FIG. 37 is a flow chart showing a non-seamless process in FIG. 34.

Next, with reference to FIG. 37, a non-seamless process at step S222 in FIG. 34 is explained.

Firstly in FIG. 37, the ILVU information is obtained from the ILV block number, the ILV group number and the ILV element ID by referring to the ILVU table 133 (see FIG. 20) (step S601).

Then, the ILVU head packet number corresponding to the angle number after switching (i.e. the ILV element ID) is obtained (step S602).

Furthermore, as in the specific example discussed with reference to FIG. 36, the ILVU length is obtained (step S603).

Thus, the seamless processing completes.

Figure 38:
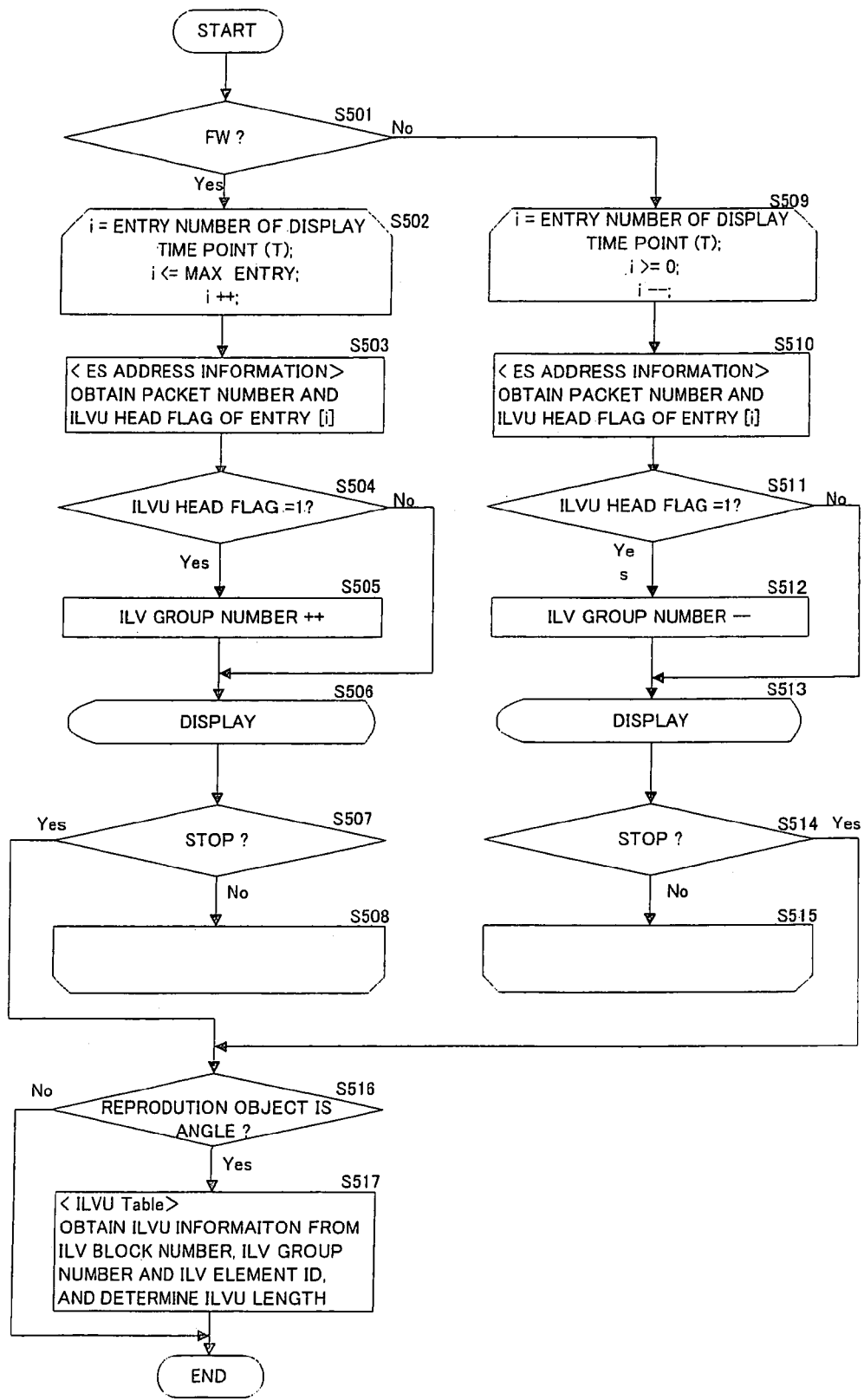
FIG. 38 is a flow chart showing a fast forward/rewind process using an "ILVU head flag" as an example of ILV group judgement information in FIG. 34.
Figure 39:
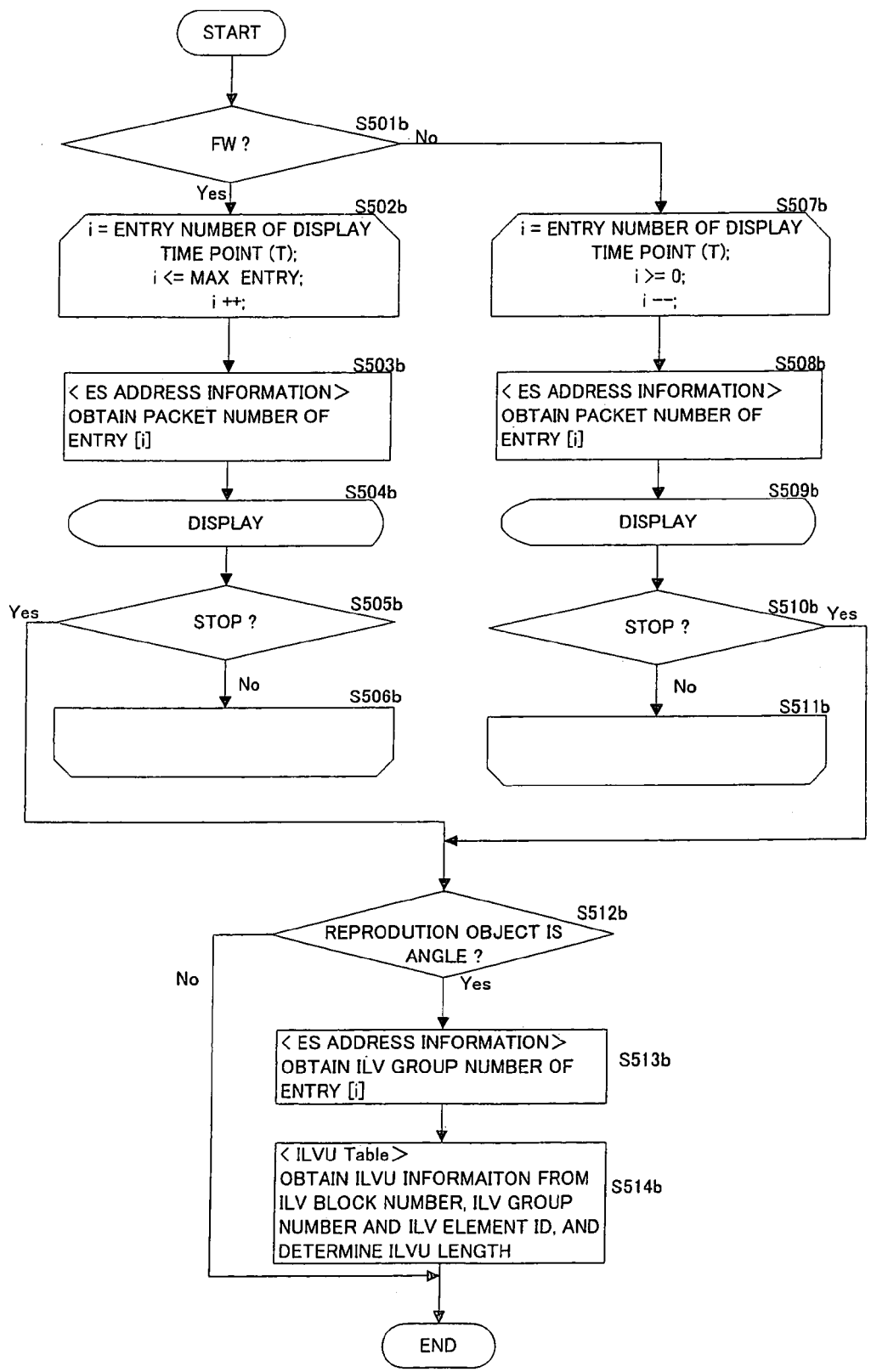
FIG. 39 is a flow chart showing a fast forward/rewind process using an "ILV group number" as an example of ILV group judgement information in FIG. 34.

Next, with reference to FIG. 38 and FIG. 39, the FW/BW operation at step S225 in FIG. 34 is explained.

Firstly, with reference to FIG. 38, an explanation is made on the FW/BW operation by the first method using the "ILVU head flag" (see FIG. 21(A)) as an example of the ILV group judgement information.

Firstly in FIG. 38, a judgement is made whether or not a command for FW (fast-forward) operation is inputted (step S501).

As a result, if it is judged that the command for FW operation is inputted (step S501: Yes), the initial value of the parameter "i" for the FW control is set to the entry number (e.g. a line number of the ES address information in FIG. 21(A)) corresponding to the display time point (T) (step S502).

Then, the packet number and the ILVU head flag having the entry number "i" are obtained form the ES address information (see FIG. 21(A)) (step S503). Then, a judgement is made whether or not the ILVU head flag (see FIG. 21(A) and the like) having the entry number "i" is "1" (step S504). Then, if the head flag is "1" (step S504: Yes), a parameter "ILV group number" is incremented (step S505). On the other hand, if the head flag is not "1" (step S504: No), the step S505 is skipped. In both cases, the FW mode display is achieved on the display device by reproducing the corresponding packets (step S506).

Then, a judgement is made whether or not a command to stop the FW operation is inputted (step S507). If the command to stop the FW operation is inputted (step S507: Yes), the operational flow escapes from the loop from step S502 to step S508 and a series of the FW operation ends. On the other hand, if the command to stop the FW operation is not inputted (step S507: No), the loop from step S502 to step S508 is repeated, while a parameter "i" is incremented (step S502), under a continuation condition that i≦max entry, in which "max entry" means a maximum line quantity available as entries in the ES address information. Finally, if the command to stop the FW operation is inputted (step S507: Yes), the operational flow escape from the loop from step S502 to step S508 and a series of the FW operation ends.

On the other hand, if the command for the FW operation is not inputted (step S501: No), it may be assumed that the BW operation is performed. In this assumption, the initial value of the parameter "i" for the BW control is set to the entry number (e.g. a line number of the ES address information in FIG. 21(A) or FIG. 28) corresponding to the display time point (T) (step S509).

Then, the packet number and the ILVU head flag having the entry number "i" are obtained by referring to the ES address information (FIG. 21(A)) (step S510). Then, a judgement is made whether or not the ILVU head flag having the entry number "i" (see FIG. 21(A) or FIG. 28(A)) is "1" (step S511). Then, if the head flag is "1" (step S511: Yes), the parameter "ILVU group number" is decremented (step S512). On the other hand, if the head flag is not "1" (step S511: No), step S512 is skipped. In both cases, the BW mode display is achieved on the display by reproducing the corresponding packet (step S513).

Then, a judgement is made on whether or not a command to stop the BW operation is inputted (step S514). If the command to stop the BW operation is inputted (step S514: Yes), the operational flow escapes from a loop from S509 to S515 and a series of BW operations ends. On the other hand, if the command to stop the BW operation is not inputted (step S514: No), the loop from S509 to S515 is repeated while "i" is decremented under a condition i≧0. Finally, if the command to stop the BW operation is inputted (step S514: Yes), the operational flow escapes from the loop from S509 to S515 and a series of the BW operations ends.

The process after the FW/BW operation varies depending on whether or not the TS object to be reproduced is for the angle reproduction (step S516). If it is for the angle reproduction (step S516: Yes), the ILVU information and the ILVU length are obtained from the ILV block number, the ILV table group and the ILV element ID, by referring to the ILVU table 133 (see FIG. 20) (step S517). On the other hand, if it is not for the angle reproduction (step S516: No), the ILVU information does not need to be obtained.

Then, with reference to FIG. 39, an explanation is made on the FW/BW operation by the second method using the "ILVU group number" (see FIG. 21(B)) as an example of the ILV group judgement information.

Firstly in FIG. 39, a judgement is made whether or not a command for FW (fast-forward) operation is inputted (step S501b).

As a result of this judgement, if the command for FW operation is inputted (step S501b: Yes), the initial value of the parameter "i" for the FW control is set to the entry number (e.g. a line number of the ES address information in FIG. 21(B)) corresponding to the display time point (T) (step S502b).

Then, the packet number having the entry number "i" by referring to the ES address information (step S503b). The FW mode display is achieved on the display by reproducing the corresponding packet (step S504b). Then, a judgement is made whether or not a command to stop the FW operation is inputted (step S505b). If the command to stop the FW operation is inputted (step S505b: Yes), the operational flow escapes from a loop from step S502b to step S506b and a series of the FW operations ends. On the other hand, if the command to stop the FW operation is not inputted (step S505b: No), the loop from step S502b to step S506b is repeated, while the parameter "i" is incremented (step S502b), under a continuation condition i≦max entry (in which, the max entry means the maximum line quantity available as entries in the ES address information). Finally, if the command to stop the FW operation is inputted (step S505b: Yes), the operational flow escapes from the loop from step S502b to step S506b and a series of the FW operations ends.

On the other hand, as a result of the judgement at step S501b, if the command for the FW operation is not inputted (step S501b: No), it may be assumed that the BW operation is performed. In this assumption, the initial value of the parameter "i" for the BW control is set to the entry number (e.g. a line number of the ES address information in FIG. 21(B) or FIG. 28(B)) corresponding to the display time point (T) (step S507b).

Then, the packet number having the entry number "i" is obtained by referring to the ES address information (step S508b). The BW mode display is achieved on the display, by reproducing the corresponding packet (step S509b). Then, a judgement is made whether or not a command to stop the BW operation is inputted (step S510b). If the command to stop the BW operation is inputted (step S510b: Yes), the operational flow escapes from a loop from S507b to S511b and a series of BW operations ends. On the other hand, if the command to stop the BW operation is not inputted (step S510b: No), the loop from S507b to S511b is repeated while "1" is decremented under a condition i≧0. Finally, if the command to stop the BW operation is inputted (step S510b: Yes), the operational flow escapes from the loop from S507b to S511b and a series of the BW operations ends.

The process after the FW/BW operation varies depending on whether or not the TS object to be reproduced is for the angle reproduction (step S512b). If it is for the angle reproduction (step S512b: Yes), the ILVU group number having the entry number "i" is obtained, by referring to the ES address information (step S513b). Then, the ILVU information and the ILVU length are obtained from the ILV block number, the ILV group number and the ILV element ID by referring to the ILVU table 133 (see FIG. 20). On the other hand, if it is not for the angle reproduction (step S512b: No), obtaining the ILVU group number (step S513b) or the ILVU information (step S514b) are not necessary.

Thus, the FW/BW operation ends.

(Access Flow for Reproduction)

Figure 40:
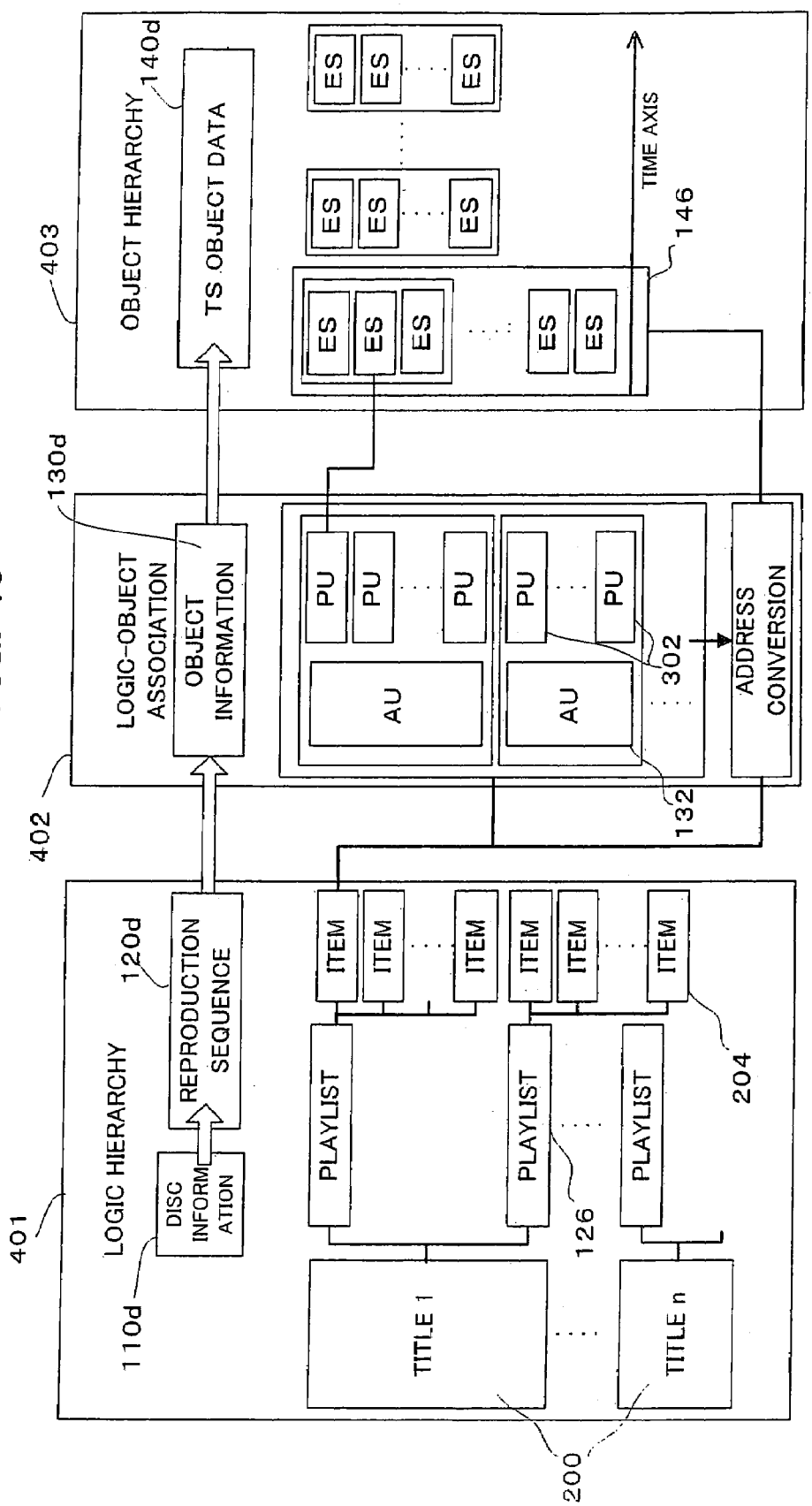
FIG. 40 is a conceptual diagram showing a general flow of an access in the reproduction, focusing on the relationship with the logical construction of the optical disc, in the embodiment.

Next, with reference to FIG. 40, the flow of the access for the reproduction at the information record reproduction apparatus 500, which uses the AU (Associate Unit) information 132I and the PU (Presentation Unit) information 302I, as one of the features of this embodiment, will be explained as well as the logical structure of the optical disc 100. FIG. 40 is a schematic diagram showing an entire flow of the access for the reproduction, in relation to the logical structure of the optical disc 100.

In FIG. 40, the logical structure of the optical disc 100 is categorized broadly into the following three hierarchies: a logical hierarchy 401; an object hierarchy 403; and a logic-object associating hierarchy 402 mutually associating those two hierarchies.

Among them, the logical hierarchy 401 is a hierarchy that logically specifies various logical information to reproduce the desired title when reproducing, as well as the play list to be reproduced and its construction content. In the logical hierarchy 401, disc information 110d indicating the entire titles 200 and the like on the optical disc 100 is written within the disc information file 110 (refer to FIG. 3), and further, reproduction sequence information 120d of the entire content on the optical disc 100 is written within the play list information file 120 (refer to FIG. 3). More specifically, the construction of one or a plurality of play lists 126 is written in each title 200 as the reproduction sequence information 120d. And the construction of one or a plurality of Items 204 is written in each play list 126 as the reproduction sequence. Then, in accessing at the time of the reproduction, the logical hierarchy 401 as described above specifies the title 200 to be reproduced, the play list 126 corresponding to this, and further the Item 204 corresponding to this.

Then, the logic-object associating hierarchy 402 is a hierarchy that specifies the attribute and the physical storing address of the TS object data 140d to be reproduced, so as to specify the combination and/or the construction of the TS object data 140d as being the entity data and perform an address conversion to the object hierarchy 403 from the logical hierarchy 401, on the basis of the information specified in the logical hierarchy 401 as described above. More specifically, in the logic-object associating hierarchy 402, the object information data 130d, which separates a group of the content constituting each Item 204 into units of the AU 132 and which finely separates each AU 132 into units of the PU 302, is written in the object information file 130 (refer to FIG. 3).

Here, the PU 302 corresponds to an assembly of one or more elementary streams constituting each content including the video information, the audio information and the sub-picture information, which relate to an angle from among a plurality of angles switchable to each other through the user operation during the reproduction. The AU 132 is made of an assembly of a plurality of PUs 302 having the switchable angles in the angle reproduction. Therefore, if the AU 132 to be reproduced is identified, and the PU is further identified, the elementary stream to be reproduced is identified. That is, it is possible to reproduce the desired elementary stream from the streams multi-recorded on the optical disc 100, without using the PAT and/or PMT shown in FIG. 6. In this manner, in the logic-object associating hierarchy 402, the address conversion to the physical address related to each PU 302 from the logical address related to each Item 204 is executed.

Then, the object hierarchy 403 is a physical hierarchy to reproduce the actual TS object data 140d. In the object hierarchy 403, the TS object data 140d is written within the object data file 140 (refer to FIG. 3). Then, the plurality of TS packets multiplexed at each time point are associated with the PU 302 identified at the logic-object associating hierarchy 402, for each elementary stream.

In this manner, in the object hierarchy 403, the actual object data is reproduced using the physical address obtained by the conversion at the logic-object associating hierarchy 402.

As described above, the three hierarchies shown in FIG. 40 allow the execution of the access with respect to the optical disc 100 in reproducing.

As explained with reference to FIG. 1 to FIG. 40, this embodiment makes it possible to set the angle without lowering the transfer rate at all or almost at all, by constructing the angle block in the interleaved structure. Furthermore, storing the address information for all the angles into the ILVU table (see FIG. 20) and pre-reading into the memory during the reproduction make it possible to perform the angle switching seamlessly or quickly. Especially, the ES address information is provided with the ILVU head flag or the ILV group number, and thereby the appropriate ILVU can be readily obtained even in the case that the reproduction is required immediately after the FW/BW operation in the angle block.

Additionally, in this embodiment, using the AU and the PU makes it possible to reproduce the TS object 142 even generated on the basis of a different PAT and PMT construction rule, such as a local rule depending on the nation or state, without problems even in the case that the entity of the TS object 142 is stored onto the optical disc 100 as it is, i.e. without the structure of the TS object 142 being changed.

Incidentally, the optical disc 100 as one example of the information recording medium and a recorder or a player related to the optical disc 100 as one example of the information record reproduction apparatus are explained in the above described embodiment; however, the present invention is not limited to the optical disc, and the recorder or the player. The present invention is available for the other various information recording/reproducing media corresponding to the high density recording, and their recorders or players. Furthermore, although the embodiments of the angle reproduction are explained in the above described embodiments, a "parental reproduction" or the like can be embodied, for reproducing scenes or cuts matched with a parental level defined in advance as for the contents, such as "AO (adults only)" or "R15 (rated 15)".

The present invention is not limited to the above-described embodiments, and changes may be made if desired without departing from the scope or spirit of the invention which can be read from the claims and the entire specification. An information recording medium, an apparatus for and a method of recording the information, an apparatus for and a method of reproducing the information, an apparatus for and a method of recording and reproducing the information, a computer program for controlling the record or the reproduction, and a data structure including a control signal that accompany such changes are also intended to be within the technical scope of the present invention.

INDUSTRIAL APPLICABILITY

An information record medium, a apparatus for and a method of recording the information, an apparatus for and a method of reproducing the information, an apparatus for and a method of recording and reproducing the information, a computer program for controlling the record or the reproduction, and a data structure including a control signal, all of which are according to the present invention, can be applied to a high-density optical disc for consumer or industrial use, such as a DVD, on which various information, such as the video information, the audio information and the sub-picture information, can be recorded at high density and further can be applied to a DVD player, a DVD recorder, and the like. Moreover, they can be applied to an information record medium, an information record reproduction apparatus, or the like, which are mounted on or can be connected to various computer equipment for consumer or industrial use, for example.

The invention claimed is:

1. An information record medium onto which a whole stream including a plurality of partial streams each composed of content information including a plurality of video information whose reproduction can be changed is recorded by a packet unit, said information record medium including:

an object data file for storing object data composed of a plurality of packets each storing pieces of the content information; and an object information file for storing, as reproduction control information to control a reproduction of the object data file, relationship definition information to define a relationship between a plurality of packets and the plurality of partial streams, wherein the object data is stored in said object data file and is interleaved in at least a part of a reproduction range by an interleaved unit composed of a plurality of packets, and the object information file collectively stores the reproduction control information which is not multiplexed by the packet unit and further stores, as the reproduction control information, address information to indicate a number, a reproduction time and changeable-position of the plurality of the packets which constitute the interleaved unit.

2. The information record medium according to claim 1, wherein the address information includes a head address of said each interleaved unit.

3. The information record medium according to claim 1, wherein the address information is stored in the object information file, as an interleaved unit table which is tabled for some of the interleaved units, and the relationship definition information is stored in the object information file, as a relationship definition information table which is tabled for some of the partial streams.

4. The information record medium according to claim 1, wherein the address information indicates angle-changeable-position for at least a part of packets in each partial stream.

5. The information record medium according to claim 1, wherein the address information comprises head flag information to indicate whether or not said each packet is a head packet in the interleaved unit.

6. The information record medium according to claim 1, wherein the relationship definition information includes:
partial stream packet identification information to identify the plurality of packets for each of said partial streams; and
partial stream address information to indicate each packet address of at least a part of packets in each of said partial streams.

7. The information record medium according to claim 1, wherein the relationship definition information includes:
partial stream packet identification information to identify each of the plurality of packets in each of said partial streams; and
partial stream address information to indicate each packet address of at least a part of packets in each of said partial streams, wherein
the address information is included in the partial stream address information.

8. The information record medium according to claim 6, wherein the partial stream address information includes packet address information to indicate each packet address of at least a part of packets in each of said partial streams, in a manner corresponding to each reproduction start time point.

9. The information record medium according to claim 5, wherein the plurality of video information is a plurality of angle video information corresponding to a plurality of view points, and the object data is interleaved in such a manner that a reproduction start time points of the interleaved units for the plurality of angle video information correspond in the same interleaved block and a reproduction end time points of the interleaved units for the plurality of angle video information correspond in the same interleaved block.

10. An information record apparatus for recording a whole stream including a plurality of partial streams each composed of content information including a plurality of video information whose reproduction can be changed onto an information record medium by a packet unit, said information record apparatus comprising:

a first record device for recording an object data file for storing object data composed of a plurality of packets each storing pieces of the content information; and a second record device for recording an object information file for storing, as reproduction control information to control a reproduction of the object data file, relationship definition information to define a relationship between a plurality of packets and the plurality of partial streams, wherein the object data is stored in said object data files and is interleaved in at least a part of a reproduction range by an interleaved unit composed of a plurality of packets, and the object information file collectively stores the reproduction control information which is not multiplexed by the packet unit and further stores, as the reproduction control information, address information to indicate a number, a reproduction time and changeable-position of the plurality of the packets which constitute the interleaved unit.

11. An information record method of recording a whole stream including a plurality of partial streams each composed of content information including a plurality of video information whose reproduction can be changed onto an information record medium by a packet unit, said information record method comprising:

a first record process of recording an object data file for storing object data composed of a plurality of packets each storing pieces of the content information; and a second record process of recording an object information file for storing, as reproduction control information to control a reproduction of the object data file, relationship definition information to define a relationship between a plurality of packets and the plurality of partial streams, wherein the object data is stored in said object data file and is interleaved in at least a part of a reproduction range by an interleaved unit composed of a plurality of packets, and the object information collectively stores the reproduction control information which is not multiplexed by the packet unit and file further stores, as the reproduction control information, address information to indicate a number, a reproduction time and changeable-position of the plurality of the packets which constitute the interleaved unit.

12. An information reproduction apparatus for reproducing a recorded content information from a information record medium onto which a whole stream including a plurality of partial streams each composed of the content information including a plurality of video information whose reproduction can be changed is recorded by a packet unit, said information record medium including: an object data file for storing object data composed of a plurality of packets each storing pieces of the content information; and an object information file for storing, as reproduction control information to control a reproduction of the object data file, relationship definition information to define a relationship between a plurality of packets and the plurality of partial streams, wherein the object data is stored in said object data file and is interleaved in at least a part of a reproduction range by an interleaved unit composed of a plurality of packets, and the object information file collectively stores the reproduction control information which is not mutiplexed by the packet unit and further stores, as the reproduction control information, address information to indicate a number, a reproduction time and changeable-position of the plurality of the packets which constitute the interleaved unit, said information reproduction apparatus comprising:

a read device for reading information physically from the information record medium; and a reproduction device for reproducing the object data for each of said partial streams, while de-interleaving the interleaved unit, on the basis of the relationship definition information and the address information included in the information read by the read device.

13. An information reproduction method of reproducing a recorded content information from a information record medium onto which a whole stream including a plurality of partial streams each composed of the content information including a plurality of video information whose reproduction can be changed is recorded by a packet unit, said information record medium including: an object data file for storing object data composed of a plurality of packets each storing pieces of the content information; and an object information file for storing, as reproduction control information to control a reproduction of the object data file, relationship definition information to define a relationship between a plurality of packets and the plurality of partial streams, wherein the object data is stored in said object data file and is interleaved in at least a part of a reproduction range by an interleaved unit composed of a plurality of packets, and the object information file collectively stores the reproduction control information which is not mutiplexed by the packet unit and further stores, as the reproduction control information, address information to indicate a number, a reproduction time and changeable-position of the plurality of the packets which constitute the interleaved unit, said information reproduction method comprising:

a read process of reading information physically from the information record medium; and a reproduction process of reproducing the object data for each of said partial streams, while de-interleaving the interleaved unit, on the basis of the relationship definition information and the address information included in the information read at the read process.

14. An information record reproduction apparatus for recording a content information onto a information record medium onto which a whole stream including a plurality of partial streams each composed of the content information including a plurality of video information whose reproduction can be changed is recorded by a packet unit, said information record medium including: an object data file for storing object data composed of a plurality of packets each storing pieces of the content information; and an object information file for storing, as reproduction control information to control a reproduction of the object data file, relationship definition information to define a relationship between a plurality of packets and the plurality of partial streams, wherein the object data is stored in said object data file and is interleaved in at least a part of a reproduction range by an interleaved unit composed of a plurality of packets, and the object information file collectively stores the reproduction control information which is not mutiplexed by the packet unit and further stores, as the reproduction control information, address information to indicate a number, a reproduction time and changeable-position of the plurality of the packets which constitute the interleaved unit and reproducing the recorded content information, said information record reproduction apparatus comprising:

a first record device for recording the object data file;

a second record device for recording the object information file;

a read device for reading information physically from the information record medium; and a reproduction device for reproducing the object data for each of said partial streams, while de-interleaving the interleaved unit, on the basis of the relationship definition information and the address information included in the information read by the read device.

15. An information record reproduction method of recording a content information onto a information record medium onto which a whole stream including a plurality of partial streams each composed the content information including a plurality of video information whose reproduction can be changed is recorded by a packet unit, said information record medium including: an object data file for storing object data composed of a plurality of packets each storing pieces of the content information; and an object information file for storing, as reproduction control information to control a reproduction of the object data file, relationship definition information to define a relationship between a plurality of packets and the plurality of partial streams, wherein the object data is stored in said object data file and is interleaved in at least a part of a reproduction range by an interleaved unit composed of a plurality of packets, and the object information file collectively stores the reproduction control information which is not multiplexed by the packet unit and further stores, as the reproduction control information, address information to indicate a number, a reproduction time and changeable-position of the plurality of the packets which constitute the interleaved unit and reproducing the recorded content information, said information record reproduction method comprising:

a first record process of recording the object data file;

a second record process of recording the object information file;

a read process of reading information physically from the information record medium; and a reproduction process of reproducing the object data for each of said partial streams, while de-interleaving the interleaved unit, on the basis of the relationship definition information and the address information included in the information read at the read process.

16. A computer readable medium with a computer program recorded thereon for a record control to control a computer disposed at a information record apparatus for recording a whole stream including a plurality of partial streams each composed of content information including a plurality of video information whose reproduction can be changed onto an information record medium by a packet unit, said information record apparatus comprising: a first record device for recording an object data file for storing object data composed of a plurality of packets each storing pieces of the content information; and a second record device for recording an object information file for storing, as reproduction control information to control a reproduction of the object data file, relationship definition information to define a relationship between a plurality of packets and the plurality of partial streams, wherein the object data is stored in said object data file interleaved in at least a part of a reproduction range by an interleaved unit composed of a plurality of packets, and the object information file collectively stores the reproduction control information which is not multiplexed by the packet unit and further stores, as the reproduction control information, address information to indicate a number, a reproduction time and changeable-position of the plurality of the packets which constitute the interleaved unit, said computer readable medium making the computer function as at least a part of the first record device and the second record device.

17. A computer readable medium with a computer program recorded thereon for a reproduction control to control a computer disposed at a information reproduction apparatus for reproducing the recorded content information from the information record medium onto which a whole stream including a plurality of partial streams each composed of the content information including a plurality of video information whose reproduction can be changed is recorded by a packet unit, said information record medium including: an object data file for storing object data composed of a plurality of packets each storing pieces of the content information; and an object information file for storing, as reproduction control information to control a reproduction of the object data file, relationship definition information to define a relationship between a plurality of packets and the plurality of partial streams, wherein the object data is stored in said object data file and is interleaved in at least a part of a reproduction range by an interleaved unit composed of a plurality of packets, and the object information file collectively stores the reproduction control information which is not multiplexed by the packet unit and further stores, as the reproduction control information, address information to indicate a number, a reproduction time and changeable-position of the plurality of the packets which constitute the interleaved unit, said information reproduction apparatus comprising: a read device for reading information physically from the information record medium; and a reproduction device for reproducing the object data for each of said partial streams, while de-interleaving the interleaved unit, on the basis of the relationship definition information and the unit address information included in the information read by the read device, said computer readable medium making the computer function as at least a part of the read device and the reproduction device.

18. A computer readable medium with a computer program recorded thereon for a record reproduction control to control a computer disposed at a information record reproduction apparatus for recording the content information onto the information record medium onto which a whole stream including a plurality of partial streams each composed of the content information including a plurality of video information whose reproduction can be changed is recorded by a packet unit, said information record medium including: an object data file for storing object data composed of a plurality of packets each storing pieces of the content information; and an object information file for storing, as reproduction control information to control a reproduction of the object data file, relationship definition information to define a relationship between a plurality of packets and the plurality of partial streams, wherein the object data is stored in said object data file and is interleaved in at least a part of a reproduction range by an interleaved unit composed of a plurality of packets, and the object information file collectively stores the reproduction control information which is not multiplexed by the packet unit and further stores, as the reproduction control information, address information to indicate a number, a reproduction time and changeable-position of the plurality of the packets which constitute the interleaved unit and reproducing the recorded content information, said information record reproduction apparatus comprising: a first record device for recording the object data file; a second record device for recording the object information file; a read device for reading information physically from the information record medium; and a reproduction device for reproducing the object data for each of said partial streams, while de-interleaving the interleaved unit, on the basis of the relationship definition information and the address information included in the information read by the read device, said computer readable medium making the computer function as at least a part of the first record device, the second record device, the read device and the reproduction device.

19. A computer readable medium with a data structure including a control signal in which a whole stream including a plurality of partial streams each composed of content information including a plurality of video information whose reproduction can be changed is recorded by a packet unit, said computer readable medium comprising:
  an object data file stored by a computer for storing object data composed of a plurality of packets each storing pieces of the content information; and
  an object information file for storing, as reproduction control information to control a reproduction of the object data file, relationship definition information to define a relationship between a plurality of packets and the plurality of partial streams, wherein
  the object data is stored in said object data file and is interleaved in at least a part of a reproduction range by an interleaved unit composed of a plurality of packets, and
  the object information file collectively stores the reproduction control information which is not multiplexed by the packet unit and further stores, as the reproduction control information, address information to indicate a number, a reproduction time and changeable-position of the plurality of the packets which constitute the interleaved unit.

* * * * *

UNITED STATES PATENT AND TRADEMARK OFFICE
CERTIFICATE OF CORRECTION

PATENT NO. : 7,606,474 B2  Page 1 of 1
APPLICATION NO. : 10/542752
DATED : October 20, 2009
INVENTOR(S) : Fukuda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 869 days.

Signed and Sealed this

Twelfth Day of October, 2010

David J. Kappos
*Director of the United States Patent and Trademark Office*